United States Patent
Tsukuba

(10) Patent No.: US 12,155,847 B2
(45) Date of Patent: Nov. 26, 2024

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 188 days.

(21) Appl. No.: 17/604,997

(22) PCT Filed: May 1, 2020

(86) PCT No.: PCT/JP2020/018432
§ 371 (c)(1),
(2) Date: Apr. 6, 2022

(87) PCT Pub. No.: WO2020/250599
PCT Pub. Date: Dec. 17, 2020

(65) Prior Publication Data
US 2023/0179779 A1    Jun. 8, 2023

Related U.S. Application Data

(60) Provisional application No. 62/860,606, filed on Jun. 12, 2019.

(51) Int. Cl.
*H04N 19/00* (2014.01)
*H04N 19/122* (2014.01)
(Continued)

(52) U.S. Cl.
CPC ......... *H04N 19/184* (2014.11); *H04N 19/122* (2014.11); *H04N 19/176* (2014.11)

(58) Field of Classification Search
CPC .. H04N 19/184; H04N 19/122; H04N 19/176; H04N 19/157; H04N 19/12; H04N 19/70
See application file for complete search history.

(56) References Cited

U.S. PATENT DOCUMENTS

| | | | | |
|---|---|---|---|---|
| 5,790,839 A | * | 8/1998 | Luk | G11C 5/025 713/300 |
| 5,901,304 A | * | 5/1999 | Hwang | G11C 7/22 365/230.06 |

(Continued)

FOREIGN PATENT DOCUMENTS

| | | |
|---|---|---|
| CN | 109076222 A | 12/2018 |
| CN | 109076243 A | 12/2018 |

(Continued)

OTHER PUBLICATIONS

Bross et al. JCT-VC, Suggested bugifixed for HEVC text specification draft 6. 2012.*

(Continued)

*Primary Examiner* — Frank F Huang
(74) *Attorney, Agent, or Firm* — XSENSUS LLP

(57) ABSTRACT

The present disclosure relates to an image processing device and method capable of suppressing an increase in load of decoding processing.
A secondary transform identifier is set such that secondary transform is performed only in a case where information regarding a block size is equal to or less than a predetermined threshold value, secondary transform is performed on coefficient data derived from image data on the basis of the secondary transform identifier set, and the secondary transform identifier set is encoded and a bitstream is generated. The present disclosure can be applied, for example, to an image processing device, an image encoding device, an image decoding device, an information processing device, an electronic device, an image processing method, an information processing method, and the like.

5 Claims, 60 Drawing Sheets

(51) Int. Cl.
*H04N 19/176* (2014.01)
*H04N 19/184* (2014.01)

(56) References Cited

U.S. PATENT DOCUMENTS

| | | | | |
|---|---|---|---|---|
| 6,072,834 | A * | 6/2000 | Kim | H04N 19/176 382/250 |
| 6,097,756 | A * | 8/2000 | Han | H04N 19/537 375/240 |
| 6,580,754 | B1 * | 6/2003 | Wan | H04N 19/33 375/E7.079 |
| 6,728,317 | B1 * | 4/2004 | Demos | H04N 19/36 348/E7.015 |
| 6,765,962 | B1 * | 7/2004 | Lee | H04N 19/124 375/240.03 |
| 6,771,703 | B1 * | 8/2004 | Oguz | H04N 19/59 375/240.03 |
| 6,826,232 | B2 * | 11/2004 | Chen | H04N 19/14 375/240.18 |
| 7,016,412 | B1 * | 3/2006 | van Zon | H04N 19/156 375/240.1 |
| 7,095,782 | B1 * | 8/2006 | Cohen | H04N 21/2404 375/E7.02 |
| 7,245,662 | B2 * | 7/2007 | Piche | H04N 19/46 382/250 |
| 7,263,124 | B2 * | 8/2007 | Peng | H04N 19/34 375/240.03 |
| 7,369,610 | B2 * | 5/2008 | Xu | H04N 21/234327 375/E7.091 |
| 7,391,807 | B2 * | 6/2008 | Lin | H04N 19/124 375/240.03 |
| 7,477,688 | B1 * | 1/2009 | Zhang | H04N 19/40 375/240 |
| 7,627,034 | B2 * | 12/2009 | Park | H04N 19/46 375/240.08 |
| 7,697,608 | B2 * | 4/2010 | Lee | H04N 19/14 375/240.03 |
| 7,729,421 | B2 * | 6/2010 | Campisano | H04N 19/577 375/240.01 |
| 8,040,952 | B2 * | 10/2011 | Park | H04N 21/4347 375/240.01 |
| 8,189,659 | B2 * | 5/2012 | Han | H04N 21/43637 375/240.02 |
| 8,494,042 | B2 * | 7/2013 | Park | H04N 19/513 375/240 |
| 2007/0064791 | A1 * | 3/2007 | Okada | H04N 19/63 375/E7.125 |
| 2009/0028245 | A1 * | 1/2009 | Vieron | H04N 19/109 375/E7.123 |
| 2011/0243231 | A1 * | 10/2011 | Li | H04N 19/433 375/E7.256 |
| 2011/0268175 | A1 * | 11/2011 | Tan | H04N 19/895 375/E7.026 |
| 2013/0028324 | A1 * | 1/2013 | Chang | H04N 19/433 375/E7.125 |
| 2014/0092970 | A1 * | 4/2014 | Misra | H04N 19/52 375/240.16 |
| 2019/0149822 | A1 | 5/2019 | Kim et al. | |

FOREIGN PATENT DOCUMENTS

| | | |
|---|---|---|
| CN | 109792522 A | 5/2019 |
| CN | 113728636 A | 11/2021 |
| WO | 2019/022099 A1 | 1/2019 |

OTHER PUBLICATIONS

International Search Report and Written Opinion mailed on Jul. 21, 2020, received for PCT Application PCT/JP2020/018432, Filed on May 1, 2020, 14 pages including English Translation.
Tsukuba et al., "Non-CE6: TU/TB-level LFNST Index Coding", Joint Video Experts Team (JVET) of ITU-T SG 16 WP 3 and ISO/IEC JTC 1/SC 29/WG 11, JVET-O0352 v2, Jul. 3-12, 2019, 10 pages.
Koo et al., "Non-CE6: Block Size Restriction of LFNST", Joint Video Experts Team (JVET) of ITU-T SG 16 WP 3 and ISO/IEC JTC 1/SC 29/WG 11, JVET-O0213, Jul. 3-12, 2019, 7 pages.
Koo et al., "CE6: Reduced Secondary Transform (RST) (test 6. 5 .1)", Joint Video Experts Team (JVET) of ITU-T SG 16 WP 3 and ISO/IEC JTC 1/SC 29/WG 11, JVET-M029, Jan. 12, 2019, 6 pages.
Minezawa et al., "HEVC Real-Time Hardware Encoder for HDTV signal", Joint Collaborative Team on Video Coding (JCT-VC) of ITU-T SG 16 WP 3 and ISO/IEC JTC 1/SC 29/WG 11, JCTVC-L0379, Jan. 14-23, 2013, 7 pages.
Benjamin Bross et al., "Versatile Video Coding (Draft 5)", JVET-N1001v8, Joint Video Experts Team (JVET) of ITU-T SG 16 WP 3 and ISO/IEC JTC 1/SC 29/WG 11, 14th Meeting: Geneva, CH, Mar. 19-27, 2019.
Moonmo Koo et al., "CE6: Reduced Secondary Transform (RST) (CE6-3.1)", JVET-N0193, Joint Video Experts Team (JVET) of ITU-T SG 16 WP 3 and ISO/IEC JTC 1/SC 29/WG 11, 14th Meeting: Geneva, CH, 19-27, Mar. 2019.
Recommendation ITU-T H.264 (Aug. 2021) "Advanced video coding for generic audiovisual services", Aug. 2021, Printed in Switzerland, Geneva, 2021.
Recommendation ITU-T H.265 (Dec. 2016) "High efficiency video coding", Dec. 2016, Printed in Switzerland, Geneva, 2017.
Jianle Chen et al., "Algorithm Description of Joint Exploration Test Model (JETM7) ", JVET-G1001-v1, Joint Video Exploration Team (JVET) of ITU-T SG 16 WP 3 and ISO/IEC JTC 1/SC 29/WG 11, 7th Meeting: Torino, IT, 13-21, Jul. 2017.
Benjamin Bross et al., "Versatile Video Coding (Draft 3)," JVET-L1001-v9, Joint Video Experts Team (JVET) of ITU-T SG 16 WP 3 and ISO/IEC JTC 1/SC 29/WG 11, 12th Meeting: Macau, CN, 3-12, Oct. 2018.
Jianle Chen et al., "Algorithm description for Versatile Video Coding and Test Model 3 (VTM 3)", JVET-L1002-v1, Joint Video Experts Team (JVET) of ITU-T SG 16 WP 3 and ISO/IEC Jtc 1/SC 29/WG 11, 12th Meeting: Macau, CN, Oct. 3-12, 2018.
Jianle Chen et al., "Algorithm description for Versatile Video Coding and Test Model 5 (VTM 5)", JVET-N1002-v2, Joint Video Experts Team (JVET) of ITU-T SG 16 WP 3 and ISO/IEC JTC 1/SC 29/WG 11, 14th Meeting: Geneva, CH, 19-27, Mar. 2019.
Mischa Siekmann et al., "CE6—related: Simplification of the Reduced Secondary Transform", JVET-N0555-v3, Joint Video Experts Team (JVET) of ITU-T SG 16 WP 3 and ISO/IEC JTC 1/SC 29/WG 11, 14th Meeting: Geneva, CH, 19-27, Mar. 2019.
C. Rosewarne et al., "CE6-related:RST binarization", JVET-N0105-v2, Joint Video Experts Team (JVET) of ITU-T SG 16 WP 3 and ISO/IEC JTC 1/SC 29/WG 11, 14th Meeting: Geneva, CH, 19-27, Mar. 2019.

* cited by examiner

FIG. 1

| | Descriptor |
|---|---|
| cu_residual(x0, y0, cbWidth, cbHeight, treeType) { | |
|   if(!pcm_flag[x0][y0]) { | |
|     if(CuPredMode[x0][y0] != MODE_INTRA && general_merge_flag[x0][y0] == 0) { | |
|       cu_cbf | ae(v) |
|     } | |
|     if(cu_cbf) { | |
|       sbt_mode() | |
|     } | |
|     transform_tree(x0, y0, cbWidth, cbHeight, treeType) | |
|     st_mode() //decode nsst mode parameters | |
|   } | |
| } | |

*FIG. 2*

| | Descriptor |
|---|---|
| transform_tree(x0, y0, tbWidth, tbHeight, treeType) { | |
|   InferTuCbfLuma = 1 | |
|   if(IntraSubPartitionsSplitType == NO_ISP_SPLIT && !cu_sbt_flag) { | |
|     if(tbWidth > MaxTbSizeY || tbHeight > MaxTbSizeY) { | |
|       trafoWidth = (tbWidth > MaxTbSizeY) ? (tbWidth/2) : tbWidth | |
|       trafoHeight = (tbHeight > MaxTbSizeY) ? (tbHeight/2) : tbHeight | |
|       transform_tree(x0, y0, trafoWidth, trafoHeight ) | |
|       if (tbWidth > MaxTbSizeY) | |
|         transform_tree(x0 + trafoWidth, y0, trafoWidth, trafoHeight, treeType) | |
|       if (tbHeight > MaxTbSizeY) | |
|         transform_tree(x0, y0 + trafoHeight, trafoWidth, trafoHeight, treeType) | |
|       if (tbWidth > MaxTbSizeY && tbHeight > MaxTbSizeY) | |
|         transform_tree(x0 + trafoWidth, y0 + trafoHeight, trafoWidth, trafoHeight, treeType) | |
|     } else { | |
|       transform_unit(x0, y0, tbWidth, tbHeight, treeType, 0) | |
|     } | |
|   } else if(cu_sbt_flag) { | |
|     ... // tbWidth<=MaxTbSize && tbHeight<=MaxTbSize | |
| } | |

FIG. 3

| | Descriptor |
|---|---|
| st_mode (x0, y0, cbWidth, cbHeight, treeType) { <br>   stAllowed = (sps_st_enabled_flag && min(cbWidth, cbWidth) >= minStSize) <br>     && (CuPredMode[x0][y0] == MODE_INTRA ) <br>     && (IntraSubPartitionsSplit[x0][y0] == ISP_NO_SPLIT) <br>     && (mip_flag[x0][y0] == 0) <br>     && ((numSigCoeff > ((treeType == SINGLE_TREE) ? 2:1)) <br>     && (numZeroOutSigCoeff == 0) | |
| if(stAllowed) { | |
|   st_idx[x0][y0] | ae(v) |
| } | |
| } | |

A sps_st_enabled_flag equal to 1 specifies that st_idx may be present in the residual coding syntax for intra coding units. sps_st_enabled_flag equal to 0 specifies that st_idx is not present in the residual coding syntax for intra coding units.

st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture.

```
if(sig_coeff_flag[xC][yC]) {
    if(!transform_skip_flag[x0][y0]) {
        numSigCoeff++
        if((((log2TbWidth == 2 && log2TbHeight == 2) || (log2TbWidth == 3 && log2TbHeight == 3) && n >= 8 && i == 0) ||
            ((log2TbWidth >= 3 && log2TbHeight >= 3 && (i == 1 || i == 2)))) {
            numZeroOutSigCoeff++
        }
    }
}
```

FIG. 8

Inputs to this process are the colour component index cIdx, the luma or chroma location ( x0, y0 ) specifying the top-left sample of the current luma or chroma coding block relative to the top-left sample of the current picture depending on cIdx, the tree type treeType, and the multiple transform selection index tu_mts_idx[ x0 ][ y0 ].

Output of this process is the variable ctxInc.

The variable mtsCtx is derived as follows:

mtsCtx = ( tu_mts_idx[ x0 ][ y0 ] > 0 && treeType != SINGLE_TREE ) ? 1 : 0

The variable ctxInc is derived as follows:

ctxInc = mtsCtx

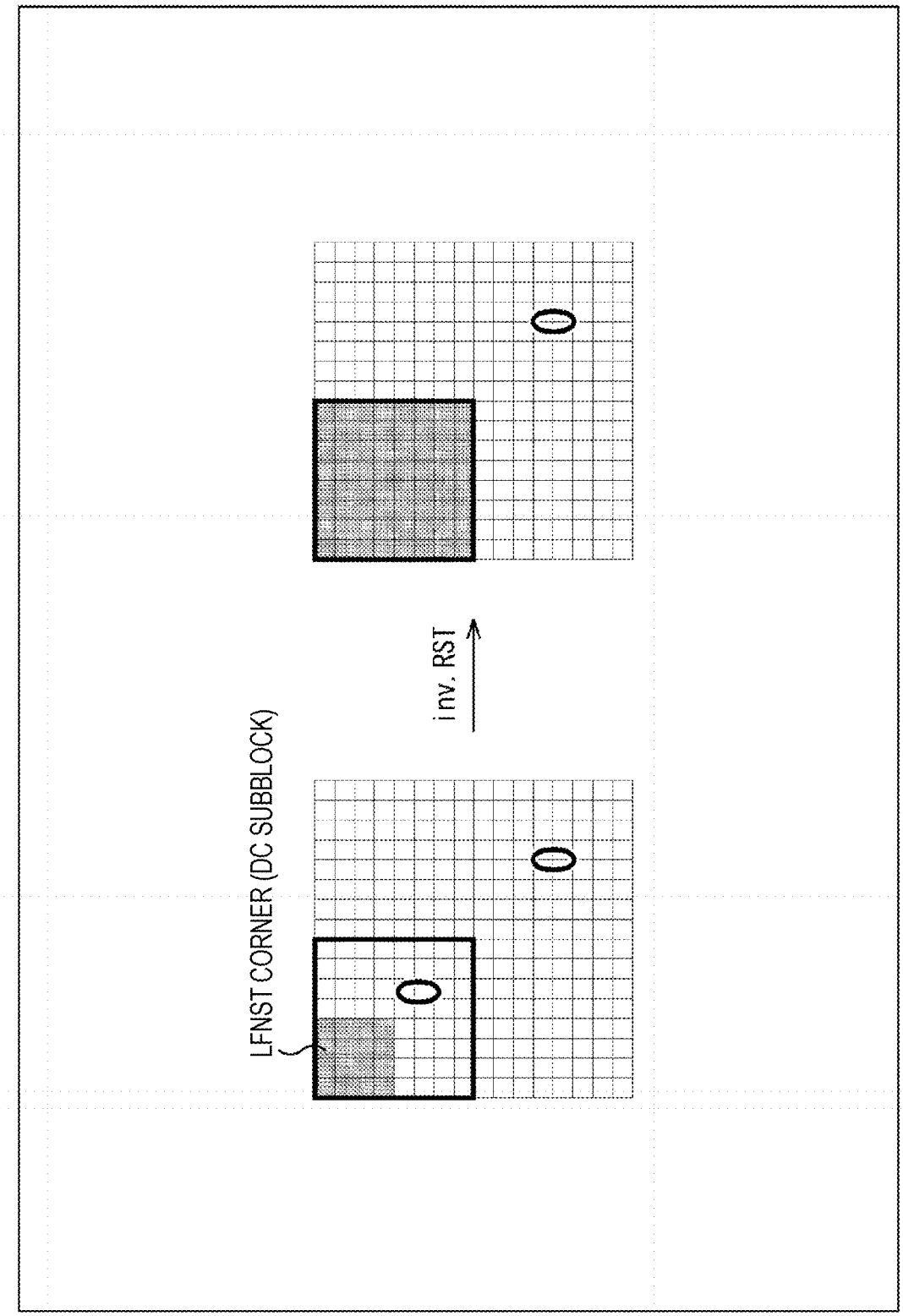

FIG. 10

```
if((tu_mts_idx[x0][y0] > 0 ||
    (cu_sbt_flag && log2TbWidth < 6 && log2TbHeight < 6))
    && cIdx == 0 && log2TbWidth > 4)
    log2ZoTbWidth = 4
else
    log2ZoTbWidth = Min(log2TbWidth, 5)
if((tu_mts_idx[x0][y0] > 0 ||
    (cu_sbt_flag && log2TbWidth < 6 && log2TbHeight < 6))
    && cIdx == 0 && log2TbHeight > 4)
    log2ZoTbHeight = 4
else
    log2ZoTbHeight = Min(log2TbHeight, 5)
```

FIG. 11

| Syntax element | Binarization | |
|---|---|---|
| | Process | Input Parameters |
| last_sig_coeff_x_prefix | TR | cMax = (log2ZoTbWidth << 1)-1, cRiceParam=0 |
| last_sig_coeff_y_prefix | TR | cMax = (log2ZoTbHeight << 1)-1, cRiceParam=0 |
| last_sig_coeff_x_suffix | FL | cMax = (1 << (((last_sig_coeff_x_prefix >> 1)-1)-1) |
| last_sig_coeff_y_suffix | FL | cMax = (1 << (((last_sig_coeff_y_prefix >> 1)-1)-1) |

FIG. 12

| log2TbX (X=Width, Height) | 2 | | 4 | |
|---|---|---|---|---|
| cMax=(log2ZoTbX<<1)−1 | 3 | | 7 | |
| INPUT VALUE | BIN SEQUENCE | | BIN SEQUENCE | |
| 0 | 1 | | 1 | |
| 1 | 10 | | 10 | |
| 2 | 110 | | 110 | |
| 3 | 111 | | 1110 | |
| 4 | | | 11110 | |
| 5 | | | 111110 | |
| 6 | | | 1111110 | |
| 7 | | | 1111111 | |

FIG. 13

| | Descriptor |
|---|---|
| cu_residual(x0, y0, cbWidth, cbHeight, treeType) { | |
|   if(!pcm_flag[x0][y0]) { | |
|     if(CuPredMode[x0][y0] != MODE_INTRA && general_merge_flag[x0][y0] == 0) { | |
|       cu_cbf | ae(v) |
|     } | |
|     if(cu_cbf) { | |
|       sbt_mode() | |
|       st_mode() // decode nsst mode parameters | |
|       transform_tree(x0, y0, cbWidth, cbHeight, treeType) | |
|     } | |
| } | |

FIG. 14

| | Descriptor |
|---|---|
| st_mode(x0, y0, cbWidth, cbHeight, treeType) { | |
|   stAllowed = (sps_st_enabled_flag && min(cbWidth,cbHeight) >= minStSize) | |
|   && (CuPredMode[x0][y0] == MODE_INTRA) | |
|   && (IntraSubPartitionsSplit[x0][y0] == ISP_NO_SPLIT) | |
|   && (mip_flag[x0][y0] == 0) | |
|   && (bdpcm_flag[x0][y0] == 0) | |
|   if(stAllowed) { | |
|     st_idx[x0][y0] | ae(v) |
|   } | |
| } | |

FIG. 15

| | Descriptor |
|---|---|
| transform_mode(x0, y0, tbWidth, tbHeight, cIdx) { | |
|   tsAllowed = (cIdx == 0) | |
|     && (IntraSubPartitionsSplit[x0][y0] == ISP_NO_SPLIT) | |
|     && (!cu_sbt_flag)) | |
|     && (transform_skip_enabled_flag && tbHeight <= maxTsSize && tbHeight <= MaxTsSize)) | |
|     && (st_idx[x0][y0] == 0) | |
|   mtsAllowed = (cIdx == 0) | |
|     && ((CuPredMode[x0][y0] != MODE_INTRA && sps_explicit_mts_inter_enabled_flag) \|\| | |
|     (CuPredMode[x0][y0] == MODE_INTRA && sps_explicit_mts_intra_enabled_flag)) | |
|     && (tbWidth <= MaxMtsSize) && (tbHeight <= MaxMtsSize) | |
|     && (IntraSubPartitionsSplit[x0][y0] == ISP_NO_SPLIT) && (!cu_sbt_flag) | |
|     && !transform_skip_flag | |
|   if (tsAllowed) { | |
|     transform_skip_flag[x0][y0] | ae(v) |
|   } | |
|   if (mtsAllowed) { | |
|     tu_mts_idx[x0][y0] | ae(v) |
|   } | |
| } | |

FIG. 16

Inputs to this process are the colour component index cIdx, the luma or chroma location ( x0, y0 ) specifying the top-left sample of the current luma or chroma coding block relative to the top-left sample of the current picture depending on cIdx, the tree type treeType, and the multiple transform selection index tu_mts_idx[ x0 ][ y0 ].

Output of this process is the variable ctxInc.

The variable mtsCtx is derived as follows:

$$mtsCtx = ( \text{treeType} != \textbf{SINGLE\_TREE} ) ? 1 : 0$$

The variable ctxInc is derived as follows:

$$ctxInc = mtsCtx$$

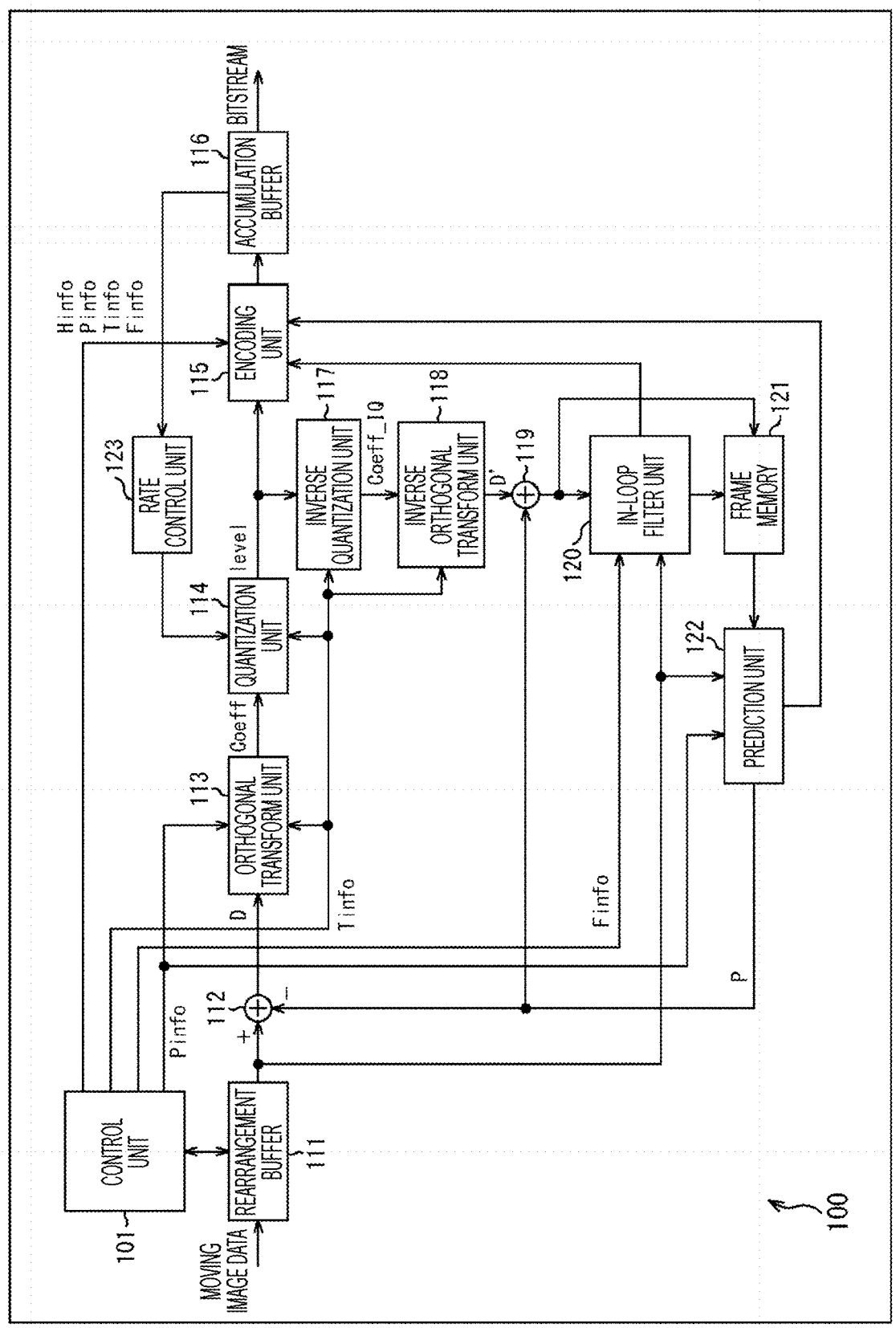

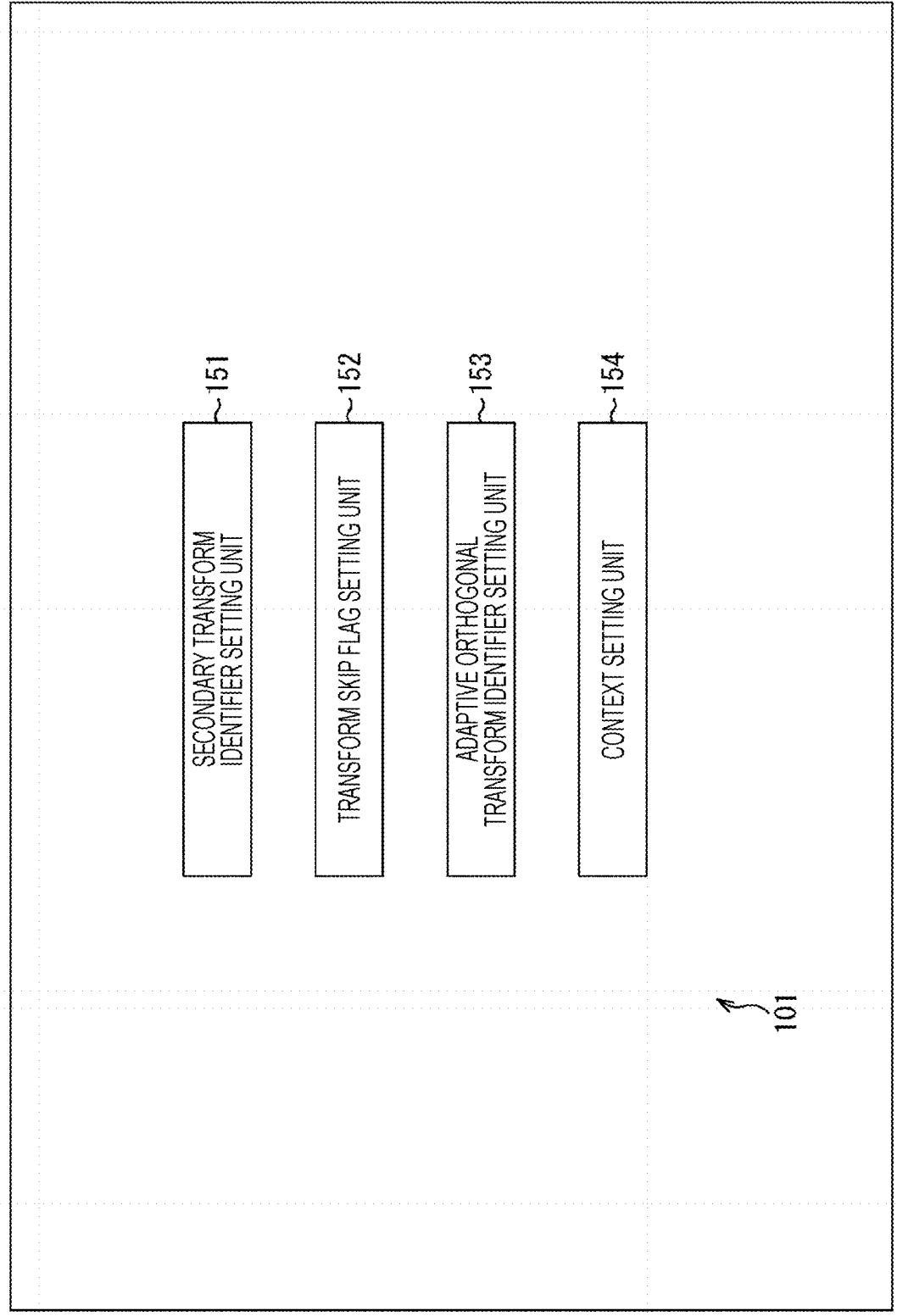

| | Descriptor |
|---|---|
| st_mode(x0,y0,tbWidth,tbHeight,treeType) { | |
| stAllowed = (sps_st_enabled_flag && min(tbWidth, tbHeight) >= minStSize) | |
| && (CuPredMode[x0][y0] == MODE_INTRA) | |
| && (IntraSubPartitionsSplit[x0][y0] == ISP_NO_SPLIT) | |
| && (mip_flag[x0][y0] == 0) | |
| && ((numSigCoeff > ((treeType == SINGLE_TREE) ? 2 : 1)) | |
| && (numZeroOutSigCoeff == 0) | |
| if (stAllowed) { | |
| st_idx[x0][y0] | ae(v) |
| } | |
| } | |

| | Descriptor |
|---|---|
| st_mode(x0,y0,tbWidth,tbHeight) { | |
|   stAllowed = (sps_st_enabled_flag && min(tbWidth,tbHeight) >= minStSize) | |
|   && (CuPredMode[x0][y0] == MODE_INTRA) | |
|   && (IntraSubPartitionsSplit[x0][y0] == ISP_NO_SPLIT) | |
|   && (mip_flag[x0][y0] == 0) | |
|   && (bdpcm_flag[x0][y0] == 0). | |
|   if(stAllowed) { | |
|     st_idx[x0][y0] | ae(v) |
|   } | |
| } | |

| | Descriptor |
|---|---|
| st_mode(x0, y0, tbWidth, tbHeight, cIdx) { <br>   stAllowed = (sps_st_enabled_flag && min(tbWidth, tbHeight) >= minStSize) <br>   && (CuPredMode[x0][y0] == MODE_INTRA) <br>   && (IntraSubPartitionsSplit[x0][y0] == ISP_NO_SPLIT) <br>   && (mip_flag[x0][y0] == 0) <br>   && ((numSigCoeff > TH)) <br>   && (numZeroOutSigCoeff == 0) <br>   if (stAllowed) { | |
|     st_idx[x0][y0][cIdx] | ae(v) |
|   } | |
| } | |

FIG. 39

Inputs to this process are the colour component index cIdx, the luma or chroma location ( x0, y0 ) specifying the top-left sample of the current luma or chroma coding block relative to the top-left sample of the current picture depending on cIdx, the tree type treeType, and the multiple transform selection index tu_mts_idx[ x0 ][ y0 ].

Output of this process is the variable ctxInc.

The variable ctxInc is derived as follows:

$$ctxInc = (cIdx == COMPONENT\_Y) ? 0 : 1$$

A

Inputs to this process are the colour component index cIdx, the luma or chroma location ( x0, y0 ) specifying the top-left sample of the current luma or chroma coding block relative to the top-left sample of the current picture depending on cIdx, the tree type treeType, and the multiple transform selection index tu_mts_idx[ x0 ][ y0 ].

Output of this process is the variable ctxInc.

The variable ctxInc is derived as follows:

$$ctxInc = cIdx$$

| | Descriptor |
|---|---|
| residual_coding(x0, y0, log2TbWidth, log2TbHeight, cIdx) { | |
|   st_mode(x0, y0, tbWidth, tbHeight, cIdx) // SIGNAL st_idx FOR EACH COMPONENT | ae(v) |
|   ... | |
|   for(i = lastSubBlock; i >= 0; i--) { | |
|     startQStateSb = Qstate | |
|     xS = DiagScanOrder[log2TbWidth - log2SbW][log2TbHeight - log2SbH] | |
|       [lastSubBlock][0] | |
|     yS = DiagScanOrder[log2TbWidth - log2SbW][log2TbHeight - log2SbH] | |
|       [lastSubBlock][1] | |
|     inferSbDcSigCoeffFlag = 0 | |
|     if((i < lastSubBlock) && (i > 0)) { | |
|       coded_sub_block_flag[xS][yS] | |
|       inferSbDcSigCoeffFlag = 1 | |
|     } | |
|     ... | |
|     for(n = firstPosMode0; n >= 0 && remBinsPass1 >= 4; n--) { | |
|       xC = (xS << log2SbW) + DiagScanOrder[log2SbW][log2SbH][n][0] | |
|       yC = (yS << log2SbH) + DiagScanOrder[log2SbW][log2SbH][n][1] | |
|       if(coded_sub_block_flag[xS][yS] && (n > 0 \|\| !inferSbDcSigCoeffFlag) && | |
|         (xC != LastSignificantCoeffX \|\| yC != LastSignificantCoeffY)) { | |
|         sig_coeff_flag[xC][yC] | ae(v) |
|         remBinsPass1-- | |
|         if(sig_coeff_flag[xC][yC]) | |
|           inferSbDcSigCoeffFlag = 0 | |
|       } | |
|       ... | |
|       if(sig_coeff_flag[xC][yC]) { | ae(v) |
|         ... | |
|       } | |
|       ... | |
|     } | |

FIG. 44

| st_mode(x0,y0,tbWidth,tbHeight,cIdx) { | Descriptor |
|---|---|
| stAllowed = (sps_st_enabled_flag && min(tbWidth,tbHeight) >= minStSize) | |
| && (CuPredMode[x0][y0] == MODE_INTRA) | |
| && (IntraSubPartitionsSplit[x0][y0] == ISP_NO_SPLIT) | |
| && (mip_flag[x0][y0] == 0) | |
| && (!transform_skip_flag[x0][y0][cIdx]) | |
| if(stAllowed) { | |
|   st_idx[x0][y0][cIdx] | ae(v) |
| } | |
| } | |

FIG. 47

| | Descriptor |
|---|---|
| st_mode (x0, y0, cbWidth, cbHeight, treeType) { | |
|   stAllowed = (sps_st_enabled_flag && min(cbWidth, cbHeight) >= minStSize) | |
|   && (CuPredMode[x0][y0] == MODE_INTRA) | |
|   && (IntraSubPartitionsSplit[x0][y0] == ISP_NO_SPLIT) | |
|   && (mip_flag[x0][y0] == 0) | |
|   && (cbWidth<=maxTbSize && cbHeight <= maxTbSize) | |
|   if (stAllowed) { | |
|     st_idx[x0][y0] | ae(v) |
|   } | |
| } | |

FIG. 50

| | Descriptor |
|---|---|
| residual_coding(x0, y0, log2TbWidth, log2TbHeight, cIdx) { | |
|   if( ( ( tu_mts_idx[x0][y0] > 0 \|\| (cu_sbt_flag && log2TbWidth < 6 && log2TbHeight < 6) ) && cIdx == 0 && log2TbWidth > 4) ) | |
|     log2ZoTbWidth = 4 | |
|   else if( st_idx[x0][y0] > 0 && log2TbWidth>2 && log2TbHeight>2) | |
|     log2ZoTbWidth = 2 | |
|   else | |
|     log2ZoTbWidth = Min(log2TbWidth, 5) | |
|   if( ( ( tu_mts_idx[x0][y0] > 0 \|\| (cu_sbt_flag && log2TbWidth < 6 && log2TbHeight < 6) ) && cIdx == 0 && log2TbHeight > 4) ) | |
|   else if( st_idx[x0][y0] > 0 && log2TbWidth>2 && log2TbHeight>2) | |
|     log2ZoTbHeight = 2 | |
|   else | |
|     log2ZoTbHeight = Min(log2TbHeight, 5) | |
|   if( log2ZoTbWidth > 0 ) | |
|     last_sig_coeff_x_prefix | ae(v) |
|   if( log2ZoTbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   ... | |
| } | |

FIG. 57

| | Descriptor |
|---|---|
| residual_coding(x0, y0, log2TbWidth, log2TbHeight, cIdx) { | |
|   if(((tu_mts_idx[x0][y0] > 0 || (cu_sbt_flag && log2TbWidth < 6 && log2TbHeight < 6)) && cIdx == 0 && log2TbWidth > 4) | |
|     log2ZoTbWidth = 4 | |
|   else if((st_idx[x0][y0][cIdx] > 0 && log2TbWidth>2 && log2TbHeight>2) | |
|     log2ZoTbWidth = 2 | |
|   else | |
|     log2ZoTbWidth = Min(log2TbWidth, 5) | |
|   if(((tu_mts_idx[x0][y0] > 0 || (cu_sbt_flag && log2TbWidth < 6 && log2TbHeight < 6)) && cIdx == 0 && log2TbHeight > 4) | |
|     log2ZoTbHeight = 4 | |
|   else if((st_idx[x0][y0][cIdx] > 0 && log2TbWidth>2 && log2TbHeight>2) | |
|     log2ZoTbHeight = 2 | |
|   else | |
|     log2ZoTbHeight = Min(log2TbHeight, 5) | |
|   if(log2ZoTbWidth > 0) | |
|     last_sig_coeff_x_prefix | ae(v) |
|   if(log2ZoTbHeight > 0) | |
|     last_sig_coeff_y_prefix | ae(v) |
|   if(last_sig_coeff_x_prefix > 3) | |
|     last_sig_coeff_x_suffix | ae(v) |
|   if(last_sig_coeff_y_prefix > 3) | |
|     last_sig_coeff_y_suffix | ae(v) |
|   ... | |
| } | |

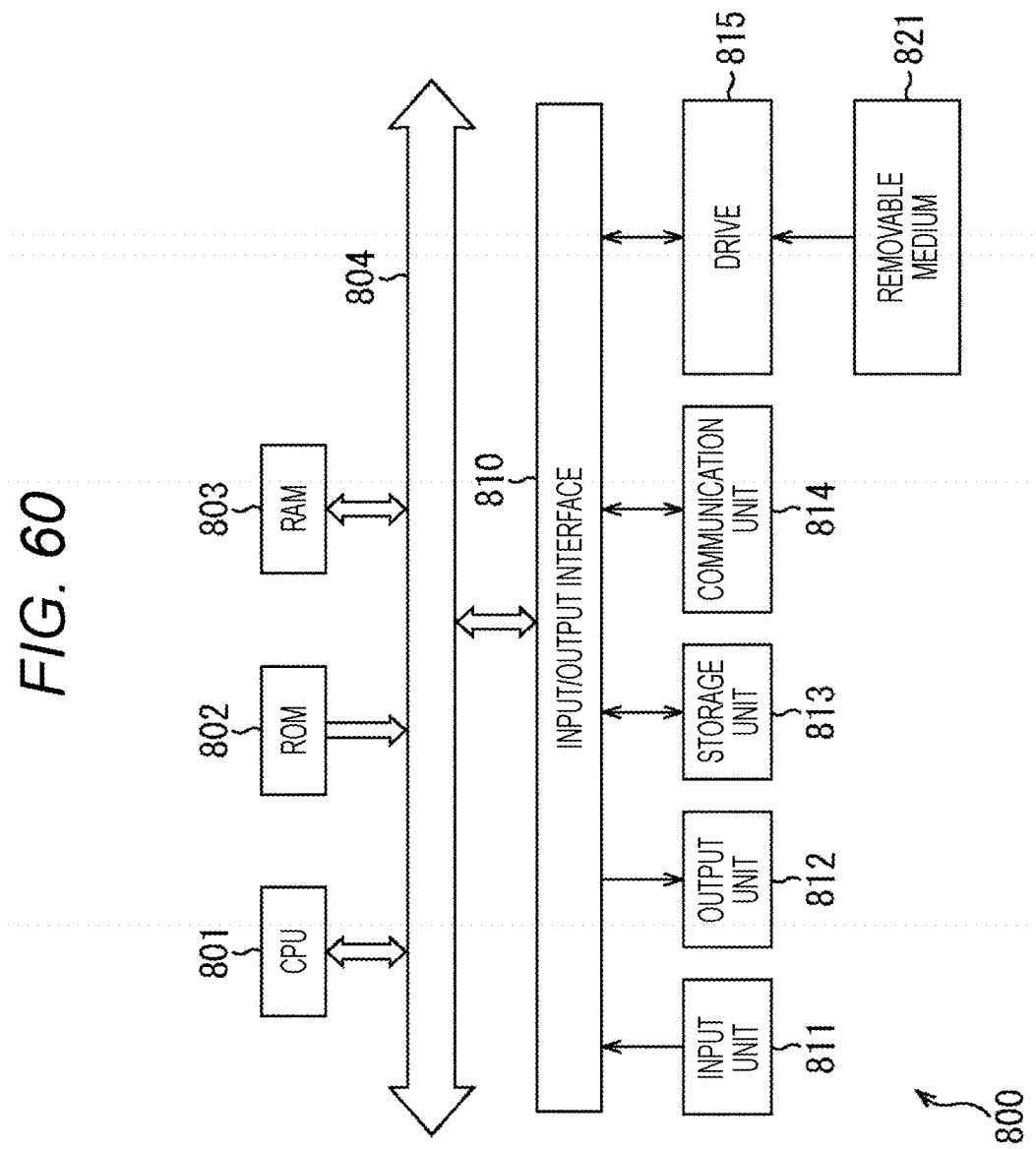

IMAGE PROCESSING DEVICE AND METHOD

CROSS-REFERENCE TO RELATED APPLICATIONS

The present application is based on PCT filing PCT/JP2020/018432, filed May 1, 2020, which claims priority to U.S. Provisional Patent Application No. 62/860,606, filed Jun. 12, 2019, the entire contents of each are incorporated herein by reference.

TECHNICAL FIELD

The present disclosure relates to an image processing device and method, and particularly to an image processing device and method capable of suppressing an increase in load of decoding processing.

BACKGROUND ART

Conventionally, in image encoding, there has been an encoding tool that performs low frequency secondary transform (LFST) on a transform coefficient after primary transform and further improves energy compaction (see, for example, Non-Patent Document 1 and Non-Patent Document 2). In the low frequency secondary transform, only the coefficient data of a low-frequency portion in a processing target block is subjected to secondary transform. There is a secondary transform identifier st_idx as the mode information regarding the low frequency secondary transform.

CITATION LIST

Non-Patent Document

Non-Patent Document 1: Benjamin Bross, Jianle Chen, Shan Liu, "Versatile Video Coding (Draft 5)", JVET-N1001v8, Joint Video Experts Team (JVET) of ITU-T SG 16 WP 3 and ISO/IEC JTC 1/SC 29/WG 11 14th Meeting: Geneva, CH, 19-27 Mar. 2019

Non-Patent Document 2: Moonmo Koo, Jaehyun Lim, Mehdi Salehifar, Seung Hwan Kim, "CE6: Reduced Secondary Transform (RST) (CE6-3.1)", JVET-N0193, Joint Video Experts Team (JVET) of ITU-T SG 16 WP 3 and ISO/IEC JTC 1/SC 29/WG 11 14th Meeting: Geneva, CH, 19-27 Mar. 2019

SUMMARY OF THE INVENTION

Problems to be Solved by the Invention

However, this secondary transform identifier is signaled after each TU in a CU is signaled because it is determined depending on the total number of nonzero transform coefficients in the CU. Therefore, inverse quantization and inverse transform processing of each transform block in the CU cannot be started until decoding of all TUs in the CU is completed and furthermore decoding of the secondary transform identifier is completed. Therefore, there is a possibility that a load of decoding processing increases.

The present disclosure has been made in view of such circumstances and can suppress an increase in load of decoding processing.

Solutions to Problems

An image processing device of an aspect of the present technology is an image processing device including: a setting unit configured to set a secondary transform identifier such that secondary transform is performed only in a case where information regarding a block size is equal to or less than a predetermined threshold value; a transform unit configured to perform secondary transform on coefficient data derived from image data on the basis of the secondary transform identifier set by the setting unit; and an encoding unit configured to encode the secondary transform identifier set by the setting unit and generate a bitstream.

An image processing method of an aspect of the present technology is an image processing method including: setting a secondary transform identifier such that secondary transform is performed only in a case where information regarding a block size is equal to or less than a predetermined threshold value; performing secondary transform on coefficient data derived from image data on the basis of the secondary transform identifier set; and encoding the secondary transform identifier set and generating a bitstream.

An image processing device according to another aspect of the present technology is an image processing device including: a secondary transform identifier setting unit configured to set a secondary transform identifier stored in a portion other than a footer of an encoded block; a transform unit configured to perform secondary transform on coefficient data derived from image data on the basis of the secondary transform identifier set by the secondary transform identifier setting unit; and an encoding unit configured to encode the secondary transform identifier set by the secondary transform identifier setting unit and generate a bitstream.

An image processing method according to another aspect of the present technology is an image processing method including: setting a secondary transform identifier stored in a portion other than a footer of an encoded block; performing secondary transform on coefficient data derived from image data on the basis of the secondary transform identifier set; and encoding the secondary transform identifier set and generating a bitstream.

In image processing device and method of an aspect of the present technology, a secondary transform identifier is set such that secondary transform is performed only in a case where information regarding a block size is equal to or less than a predetermined threshold value; secondary transform is performed on coefficient data derived from image data on the basis of the secondary transform identifier set; and the secondary transform identifier set is encoded and a bitstream is generated.

In image processing device and method of another aspect of the present technology, a secondary transform identifier stored in a portion other than a footer of an encoded block is set; secondary transform is performed on coefficient data derived from image data on the basis of the secondary transform identifier set; and the secondary transform identifier set is encoded and a bitstream is generated.

BRIEF DESCRIPTION OF DRAWINGS

FIG. 1 is a diagram illustrating an example of syntax regarding residual data in a CU.

FIG. 2 is a diagram illustrating an example of syntax regarding a transform tree.

FIG. 3 is a diagram illustrating an example of syntax regarding st_mode.

FIG. 4 is a diagram illustrating an example of syntax regarding counting of a nonzero transform coefficient.

FIG. 8 is a diagram illustrating an example of syntax regarding context setting.

FIG. 9 is a diagram explaining simplification of secondary transform.

FIG. 10 is a diagram illustrating an example of syntax regarding derivation of an effective transform area size.

FIG. 11 is a diagram illustrating an example of binarization of a last coefficient position.

FIG. 12 is a diagram illustrating an example of a bin sequence of a last coefficient position.

FIG. 13 is a diagram illustrating an example of syntax regarding residual data in a CU.

FIG. 14 is a diagram illustrating an example of syntax regarding st_mode.

FIG. 15 is a diagram illustrating an example of syntax regarding transform mode.

FIG. 16 is a diagram illustrating an example of syntax regarding context setting.

FIG. 17 is a block diagram illustrating a main configuration example of an image encoding device.

FIG. 18 is a block diagram illustrating a main configuration example of a control unit.

FIG. 29 is a diagram illustrating an example of syntax regarding a transform unit.

FIG. 30 is a diagram illustrating an example of syntax regarding st_mode.

FIG. 33 is a diagram illustrating an example of syntax regarding a transform unit.

FIG. 34 is a diagram illustrating an example of syntax regarding st_mode.

FIG. 37 is a diagram illustrating an example of syntax regarding residual data in a CU.

FIG. 38 is a diagram illustrating an example of syntax regarding st_mode.

FIG. 39 is a diagram illustrating an example of syntax regarding context setting.

FIG. 43 is a diagram illustrating an example of syntax regarding residual data in a CU.

FIG. 44 is a diagram illustrating an example of syntax regarding st_mode.

FIG. 47 is a diagram illustrating an example of syntax regarding st_mode.

FIG. 50 is a diagram illustrating an example of syntax regarding residual data in a CU.

FIG. 57 is a diagram illustrating an example of syntax regarding residual data in a CU.

FIG. 60 is a block diagram illustrating a main configuration example of a computer.

MODE FOR CARRYING OUT THE INVENTION

Figure 5:
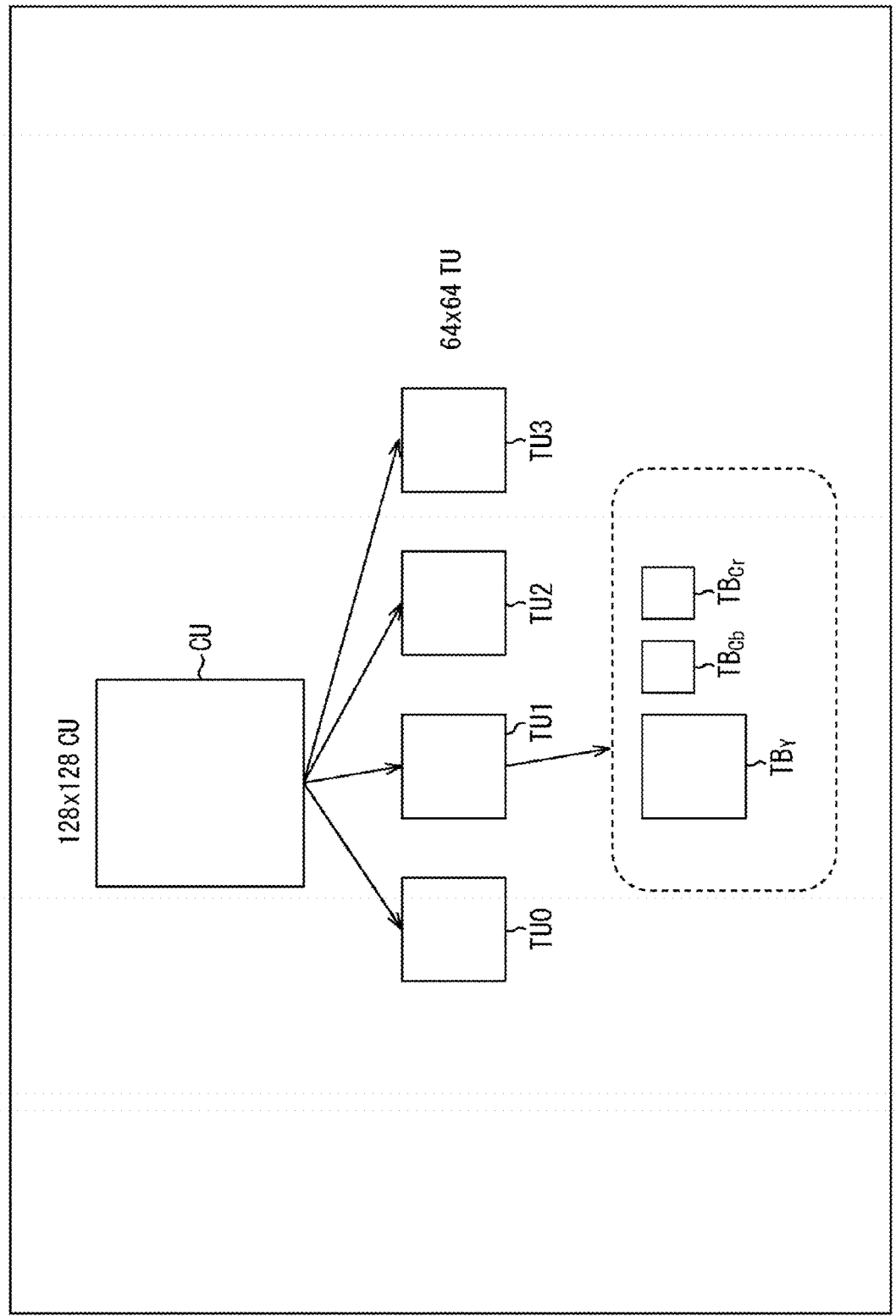
FIG. 5 is a diagram illustrating an example of a quad-tree structure of a CU.

Modes for carrying out the present disclosure (hereinafter, the embodiments) are described below. Note that description will be presented in the following order.

1. Secondary transform
2. First Embodiment
3. Second Embodiment
4. Third Embodiment
5. Fourth Embodiment
6. Fifth Embodiment
7. Sixth Embodiment
8. Seventh Embodiment
9. Eighth Embodiment
10. Ninth Embodiment
11. Appendix

1. Secondary Transform

<1-1. Documents and the Like that Support Technical Contents and Technical Terms>

The scope disclosed in the present technology is not limited to the contents described in the embodiments, but covers the contents described in the following non-patent documents and the like known at the time of filing and the contents of other documents that are referred to in the following non-patent documents.

Non-Patent Document 1: (described above)
Non-Patent Document 2: (described above)
Non-Patent Document 3: Recommendation ITU-T H.264 (04/2017) "Advanced video coding for generic audiovisual services", April 2017
Non-Patent Document 4: Recommendation ITU-T H.265 (12/2016) "High efficiency video coding", December 2016
Non-Patent Document 5: J. Chen, E. Alshina, G. J. Sullivan, J.-R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017
Non-Patent Document 6: B. Bross, J. Chen, S. Liu, "Versatile Video Coding (Draft 3)," JVET-L1001, Joint Video Experts Team (JVET) of ITU-T SG 16 WP 3 and ISO/IEC JTC 1/SC 29/WG 11 12th Meeting: Macau, CN, 3-12 Oct. 2018
Non-Patent Document 7: J. J. Chen, Y. Ye, S. Kim, "Algorithm description for Versatile Video Coding and Test Model 3 (VTM 3)", JVET-L1002, Joint Video Experts Team (JVET) of ITU-T SG 16 WP 3 and ISO/IEC JTC 1/SC 29/WG 11 12th Meeting: Macau, CN, 3-12 Oct. 2018
Non-Patent Document 8: Jianle Chen, Yan Ye, Seung Hwan Kim, "Algorithm description for Versatile Video Coding and Test Model 5 (VTM 5)", JVET-N1002-v2, Joint Video Experts Team (JVET) of ITU-T SG 16 WP 3 and ISO/IEC JTC 1/SC 29/WG 11 14th Meeting: Geneva, CH, 19-27 Mar. 2019
Non-Patent Document 9: Mischa Siekmann, Martin Winken, Heiko Schwarz, Detlev Marpe "CE6—related: Simplification of the Reduced Secondary Transform", JVET-N0555-v3, Joint Video Experts Team (JVET) of ITU-T SG 16 WP 3 and ISO/IEC JTC 1/SC 29/WG 11 14th Meeting: Geneva, CH, 19-27 Mar. 2019
Non-Patent Document 10: C. Rosewarne, J. Gan, "CE6-related: RST binarization", JVET-N0105-v2, Joint Video Experts Team (JVET) of ITU-T SG 16 WP 3 and ISO/IEC JTC 1/SC 29/WG 11 14th Meeting: Geneva, CH, 19-27 Mar. 2019

That is, the contents described in the above-mentioned non-patent documents are also the basis for determining the support requirements. For example, even in a case where a Quad-Tree Block Structure and a Quad Tree Plus Binary Tree (QTBT) Block Structure described in the above-mentioned non-patent documents are not directly described in the examples, they are within the scope of the disclosure of the present technology, and the support requirements of the claims are fulfilled. Furthermore, for example, technical terms such as Parsing, Syntax, and Semantics are similarly within the scope of the disclosure of the present technology even in a case where they are not directly described in the examples, and the support requirements of the claims are fulfilled.

Furthermore, in the present specification, a "block" (not a block indicating a processing unit) used in the description as a partial area of an image (picture) or a unit of processing indicates any partial area in the picture unless otherwise specified, and its size, shape, characteristics, and the like are not limited. For example, the "block" includes any partial area (unit of processing) such as Transform Block (TB), Transform Unit (TU), Prediction Block (PB), Prediction Unit (PU), Smallest Coding Unit (SCU), Coding Unit (CU), Largest Coding Unit (LCU), Coding Tree Block (CTB), Coding Tree Unit (CTU), transform block, subblock, macro block, tile, slice, and the like described in the above-mentioned non-patent documents.

Furthermore, when specifying the size of such block, not only the block size may be directly specified, but also the block size may be indirectly specified. For example, the block size may be specified using identification information that identifies the size. Furthermore, for example, the block size may be specified by the ratio or difference with respect to the size of a reference block (for example, LCU or SCU). For example, in a case where information for specifying a block size is transmitted as a syntax element or the like, the information for indirectly specifying the size as described above may be used as the information. By doing so, the amount of information of the information can be reduced, and the encoding efficiency may be improved. Furthermore, specifying the block size also includes specifying the range of a block size (for example, specifying the range of an allowable block size).

Furthermore, in the present specification, the encoding includes not only the entire processing of converting an image into a bitstream but also a part of the processing. For example, it not only includes processing that includes prediction processing, orthogonal transform, quantization, arithmetic encoding, and the like, but also includes processing that collectively refers to quantization and arithmetic encoding, and processing including prediction processing, quantization, and arithmetic encoding. Similarly, decoding includes not only the entire processing of converting a bitstream into an image, but also a part of the processing. For example, it not only includes processing that includes inverse arithmetic decoding, inverse quantization, inverse orthogonal transform, prediction processing, and the like, but also processing including inverse arithmetic decoding and inverse quantization, processing including inverse arithmetic decoding, inverse quantization, and prediction processing.

<1-2. Low Frequency Secondary Transform>
<Derivation of Secondary Transform Identifier>

In image encoding, there is an encoding tool that performs low frequency secondary transform (LFST) on a transform coefficient after primary transform and further improves energy compaction. In the low frequency secondary transform, only the coefficient data of a low-frequency portion in a processing target block is subjected to secondary transform. There is a secondary transform identifier st_idx as the mode information regarding the low frequency secondary transform.

FIG. 1 illustrates an example of syntax regarding residual data (cu_residual) in a CU (coding unit). As illustrated in this syntax, the secondary transform identifier st_idx is located at the end of the data structure of the CU. That is, after each TU (transform_tree) in the CU is signaled, st_idx (st_mode) is signaled.

An example of syntax regarding a transform tree (transform_tree) included in the syntax of FIG. 1 is illustrated in FIG. 2. As illustrated in this syntax, each TU (transform unit)

in the processing target CU is signaled. Furthermore, an example of syntax regarding st_mode included in the syntax of FIG. 1 is illustrated in A of FIG. 3. An example of semantics of sps_st_enabled_flag and st_idx included in this syntax is illustrated in B of FIG. 3. As illustrated in the syntax of A of FIG. 3, the secondary transform identifier st_idx is signaled. Furthermore, as illustrated in the semantics of B of FIG. 3, the secondary transform identifier st_idx specifies a secondary transform kernel to be applied between two candidate kernels in a selected transform set. st_idx=0 indicates that the secondary transform is not applied.

As described above, the reason why the secondary transform identifier st_idx is signaled after each TU (transform_tree) in the CU is that the condition for determining whether or not to signal (encode/decode) the secondary transform identifier depends on the total number of nonzero transform coefficients of each of the areas (also referred to as LFNST corners (or DC subblocks)) to which low frequency non-separable transform (LFNST) is applied and the areas (also referred to as non-LFNST corners) to which the LFNST is not applied in all the transform blocks in all the TUs included in the CU. That is, the value of the secondary transform identifier is determined by the number of nonzero transform coefficients of the block subjected to the low frequency secondary transform and the number of nonzero transform coefficients of the block not subjected to the low frequency secondary transform. FIG. 4 illustrates an example of syntax regarding derivation of a nonzero transform coefficient.

Meanwhile, in such image encoding and decoding, a concept of a virtual pipeline decoding unit (VPDU) is applied in order to enable processing in units of TUs in units of 64×64. Thus, a 128×128 CU is divided into four 64×64 TUs by implicit TU division (quad tree) as in the example illustrated in FIG. 5. In the case of a single tree, the TU further includes a TB (transform block) corresponding to component ID=0 . . . 2 (Y, Cb, Cr). In the case of a luminance dual tree, a transform block corresponding to component ID=0 (Y) is included, and in the case of a chrominance dual tree, two transform blocks corresponding to component ID=1 . . . 2 (Cb, Cr) are included.

For such a configuration, the secondary transform identifier is signaled after each TU in the CU is signaled. Therefore, inverse quantization and inverse transform processing of a first transform block in the CU cannot be started until decoding of all TUs in the CU is completed and furthermore decoding of the secondary transform identifier is completed.

Figure 6:
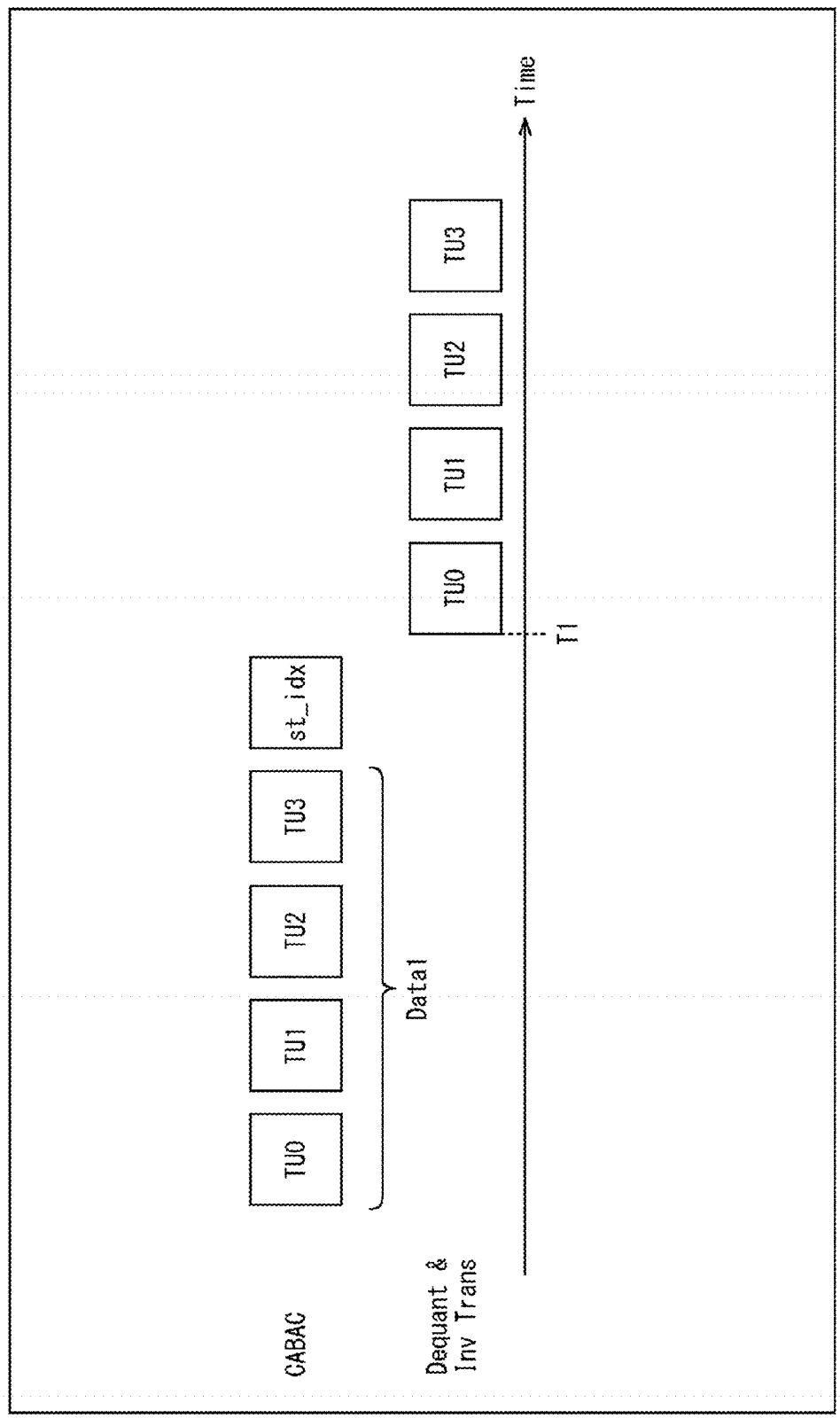
FIG. 6 is a diagram explaining an example of a flow of decoding of a CU.

For example, as illustrated in FIG. 6, in the case of a 128×128 CU including TU0 to TU3, the inverse quantization and the inverse transform processing of each transform block in TU0 cannot be started until decoding of TU0 to TU3 is completed in CABAC and decoding of the secondary transform identifier st_idx is completed (that is, until time T1). That is, there is a possibility that a processing delay increases.

Furthermore, as in the example of FIG. 6, in the case of a 128×128 CU, in order to decode the secondary transform identifier st_idx, in the case of a single tree, it is necessary to buffer (hold on the memory) information (Data 1) of transform blocks corresponding to four TUs×3 components. That is, there is a possibility that a necessary memory capacity (that is, hardware cost) increases.

As described above, there is a possibility that a load of decoding processing increases.

<Restrictions on Block Size>

Therefore, the secondary transform identifier is signaled only in a case where the information regarding the block size is equal to or less than a threshold value. In other words, the secondary transform identifier is set such that the secondary transform is performed only in a case where the information regarding the block size is equal to or less than a predetermined threshold value. That is, the secondary transform is performed only on a block having a predetermined size or less.

Thus, the secondary transform for an encoded block having a block size larger than a predetermined size can be skipped (omitted). That is, only an encoded block having a small delay time and a small memory use amount (that is, an encoded block having a small block size) waits for decoding of the secondary transform identifier and then starts inverse quantization and inverse transform processing of the transform block is started, and in a case of an encoded block having a large delay time and a large memory use amount (that is, an encoded block having a large block size), inverse quantization and inverse transform processing of the transform block can be started without waiting for decoding of the secondary transform identifier.

Therefore, it is possible to suppress an increase in delay and memory use amount. That is, an increase in load of decoding can be suppressed.

<st_idx Signaling Position>

Furthermore, the secondary transform identifier may be signaled in a portion other than the footer of the CU. In other words, a secondary transform identifier for setting a secondary transform identifier stored in a portion other than the footer of the encoded block may be set.

For example, the secondary transform identifier may be signaled at a position before the footer. For example, the secondary transform identifier may be signaled in the header of the CU.

Furthermore, for example, the secondary transform identifier may be signaled in units of data smaller than the encoded block. For example, the secondary transform identifier may be signaled in units of transform units (that is, commonly for components). Furthermore, the secondary transform identifier may be signaled in units of transform blocks (that is, for each component). Moreover, the secondary transform identifier for luminance (Y) and the secondary transform identifier for chrominance (Cb, Cr) may be signaled in units of transform units.

Thus, the period of buffering of the information necessary for starting the inverse quantization and the inverse transform processing of the transform block can be made shorter than the case of signaling in the footer of the CU. Therefore, it is possible to suppress an increase in delay and memory use amount. That is, an increase in load of decoding can be suppressed.

<Counting of Nonzero Transform Coefficient>

Figure 7:
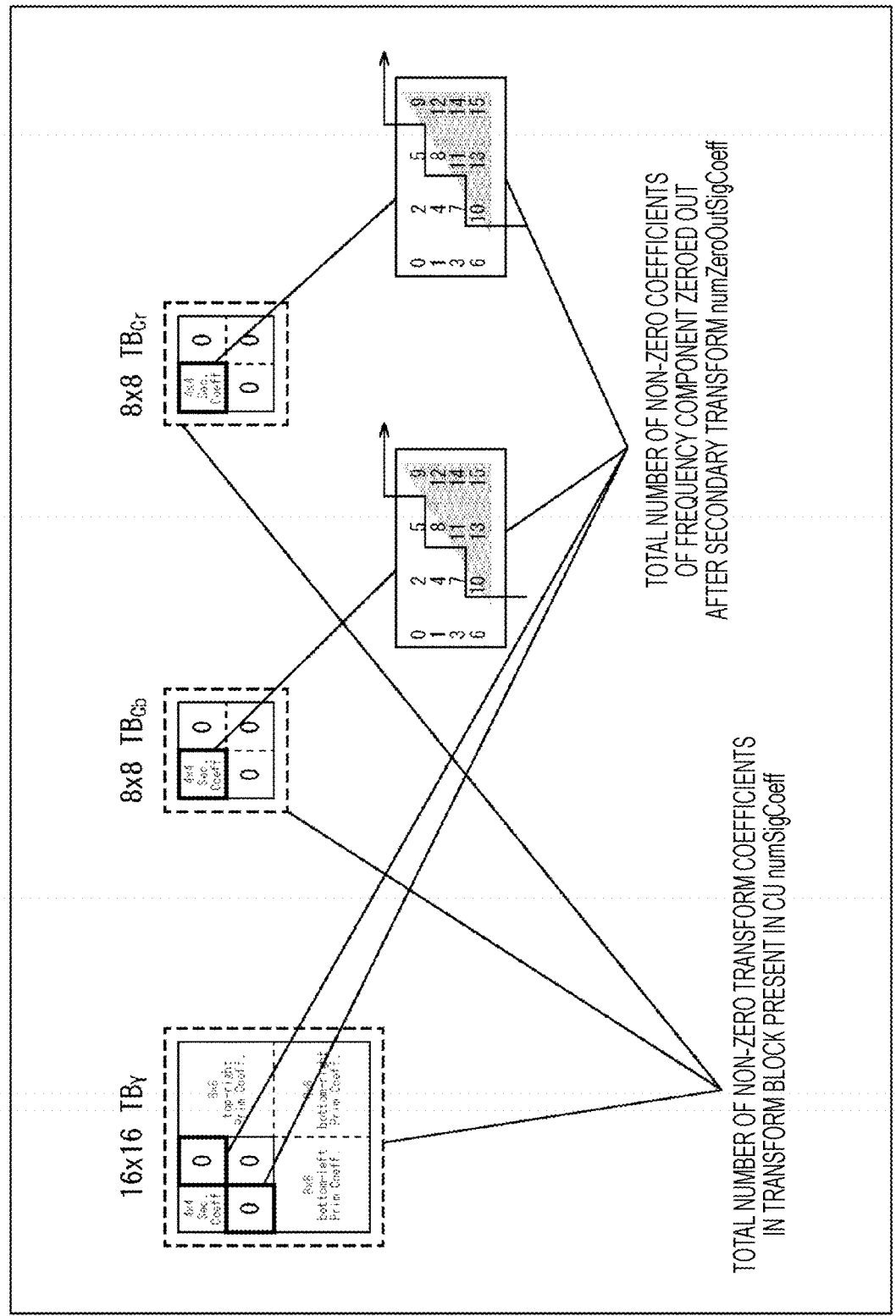
FIG. 7 is a diagram explaining an example of a state of counting of a nonzero transform coefficient.

Moreover, as illustrated in FIG. 7, in order to decode the secondary transform identifier st_idx, it is necessary to count the number of nonzero transform coefficients within a zero-out area of the LFNST corner numZeroOutSigCoef within all transform blocks included in the CU and the number of nonzero transform coefficients numSigCoef within all transform blocks included in the CU (FIG. 4). This counting of the nonzero transform coefficients requires complicated processing, which can increase the hardware cost. As described above, there is a possibility that a load of decoding processing increases.

<Omission of Counting of Nonzero Transform Coefficient>

Therefore, a conditional expression referring to the number of nonzero transform coefficients is deleted from a decoding/encoding condition of the secondary transform identifier. Thus, the secondary transform identifier can be derived without requiring complicated processing. Furthermore, when the secondary transform identifier is analyzed in the decoding processing, the complicated counting of the nonzero transform coefficients can be omitted, so that an increase in load of the decoding processing can be suppressed.

<1-3. Derivation of Context>
<ctxInc>

Furthermore, a context initial value (offset) ctxInc is derived as in the syntax of FIG. 8. That is, ctxInc (mtsCtx) is derived on the basis of the identifier of multiple transform selection (MTS), that is, an adaptive orthogonal transform identifier tu_mts_idx of the transform unit and a tree type (treeType). Therefore, complicated processing is required to derive the context index of the first bin of the secondary transform identifier st_idx, and there is a possibility that a load of decoding processing increases.

<Simplification of Derivation>

Therefore, this context is derived without using the adaptive orthogonal transform identifier. Thus, derivation of the context can be simplified, and an increase in load of the decoding processing can be suppressed.

<1-4. Simplification of Secondary Transform>
<Derivation of Effective Transform Area Size>

Furthermore, in the case of the secondary transform described in Non-Patent Document 9, as illustrated in FIG. 9, a primary transform coefficient that is not changed by an RST transform matrix, that is, the primary transform coefficient other than the LFNST corner is zeroed (the value is set to zero). Therefore, the encoding efficiency can be improved.

For example, an area in which an effective nonzero transform coefficient can exist in a TB to which 64×16 RST matrix is applied (that is, a transform block to which secondary transform is applied) is an area of an LFNST corner (DC subblock) of a size of 4×4.

For example, in a case where the last coefficient position (lastX, lastY) of the DC subblock is (3, 3), an effective transform area size (log2ZoTbWidth, log2ZoHeight), which is an area where a nonzero transform coefficient remains even after zeroing, is derived by a method such as the syntax illustrated in FIG. 10. Then, using the value, each prefix portion (last_sig_coeff_x_prefix, last_sig_coeff_y_prefix) of the last coefficient position (lastX, lastY) is binarized according to the table illustrated in FIG. 11. Then, the bin sequence is generated according to the table illustrated in FIG. 12.

In the case of a 16×16 TB illustrated in FIG. 9, a bin sequence bins of the prefix portion of the last coefficient position (lastX, lastY) is code "1110" in the first column from the right in the seventh row from the top in the table illustrated in FIG. 12. That is, 4 bits.

When binarization is performed with the effective transform area size set to 4×4, the bin sequence bins of the prefix portion becomes code "111" in the second column from the right in the seventh row from the top in the table illustrated in FIG. 12. That is, four bins. That is, it can be shorter by one bin than in the above example.

Considering the X direction and the Y direction, there is room for reduction of up to two bins. That is, in the method described in Non-Patent Document 9, there is a possibility that the code amount is unnecessarily increased and the encoding efficiency is reduced. Furthermore, since the code amount subjected to decoding processing increases, there is a possibility that the load of the decoding processing increases.

<Derivation Method Control Based on Secondary Transform Identifier>

Therefore, the effective transform area size is derived on the basis of the value of the secondary transform identifier. Thus, the effective transform area size can be derived by a method corresponding to the secondary transform, and the prefix portion of the last coefficient can be obtained using the effective transform area size. Therefore, an increase in code length can be suppressed. That is, an increase in bin length of the last coefficient can be suppressed (typically, the bin length can be reduced). That is, it is possible to suppress an increase in code amount (suppress a reduction in encoding efficiency). Therefore, an increase in load of the decoding processing can be suppressed.

2. First Embodiment

<2-1. Signaling of Secondary Transform Identifier>
<Signaling in CU Header>

The secondary transform identifier st_idx is signaled in the CU header. That is, the secondary transform identifier is signaled before each TU in the CU. For example, at the time of encoding, the secondary transform identifier is set so as to be stored in the header of the encoded block. In other words, the secondary transform identifier is set to be signaled before each transform block. Furthermore, for example, at the time of decoding, the secondary transform identifier stored in the header of the encoded block is analyzed. In other words, the secondary transform identifier signaled before each transform block is analyzed.

FIG. 13 illustrates an example of syntax regarding residual data (cu_residual) in the CU in that case. In the case of the example of FIG. 13, st_mode (that is, st_idx) is signaled in the eighth row (gray row) from the top. That is, the secondary transform identifier is signaled before each TU (transform_tree) (tenth row from the top) in the CU.

Thus, the secondary transform identifier can be decoded before all TUs in the CU are decoded. That is, inverse quantization and inverse transform processing of each TU can be started before all the TUs in the CU are decoded. That is, the period of buffering of the information necessary for starting the inverse quantization and the inverse transform processing of the transform block can be made shorter than the case of signaling in the footer of the CU. Therefore, it is possible to suppress an increase in delay and memory use amount. That is, an increase in load of decoding can be suppressed.

<Omission of Counting of Nonzero Transform Coefficient>

Note that in this case, a conditional expression referring to the number of nonzero transform coefficients may be deleted from a decoding/encoding condition of the secondary transform identifier. For example, the secondary transform identifier may be set regardless of the number of nonzero transform coefficients in the encoded block. Further, for example, the secondary transform identifier may be analyzed regardless of the number of nonzero transform coefficients in the encoded block.

Thus, when the secondary transform identifier is derived in the encoding processing, the complicated counting of the nonzero transform coefficients can be omitted, so that an increase in load of the encoding processing can be suppressed. Furthermore, when the secondary transform identifier is analyzed in the decoding processing, the complicated counting of the nonzero transform coefficients can be omitted, so that an increase in load of the decoding processing can be suppressed.

<Setting of Secondary Transform Identifier Based on Residual PCM Mode>

By the way, there is a residual PCM coding mode (block-based delta pulse code modulation (BDPCM)). In the case of the residual PCM coding mode, a difference between the residual of the block in which the secondary transform is skipped and the residual of an adjacent block is derived, and the difference of the residual for each block is encoded. bdpcm_flag is flag information for determining whether or not such residual PCM coding mode is applied. The residual PCM coding mode is applied in a case where bdpcm_flag=1, and the residual PCM coding mode is not applied in a case where bdpcm_flag=0.

The secondary transform identifier may be signaled only in such a case where the residual PCM coding mode is not applied (that is, the secondary transform identifier may not be signaled in a case where the residual PCM coding mode is applied).

Thus, the secondary transform identifier can be easily set according to the residual PCM coding mode. Furthermore, at the time of decoding, the secondary transform identifier can be easily analyzed according to the residual PCM coding mode. Thus, an increase in load of the decoding processing can be suppressed.

An example of syntax regarding st_mode in that case is illustrated in FIG. 14. In this case, as illustrated in the second row (gray row) from the top, bdpcm_flag=0 needs to be set in order for stAllowed to be true. That is, in a case where the residual PCM coding mode is applied, the secondary transform identifier is not signaled. As described above, instead of setting the secondary transform identifier on the basis of the number of nonzero transform coefficients, the secondary transform identifier may be set on the basis of a flag indicating whether or not to apply the residual PCM coding mode.

Of course, the condition when this bdpcm_flag is not applied (bdpcm_flag==0) may be excluded from the determination as to whether or not to perform secondary transform (derivation of stAllowed).

<Setting of Transform Skip and Adaptive Orthogonal Transform>

Moreover, in this case, whether or not to perform transform skip may be set on the basis of whether or not to perform secondary transform. That is, the transform skip may be performed only in a case where the secondary transform is not performed.

An example of syntax regarding transform mode in that case is illustrated in FIG. 15. As illustrated in FIG. 15, a value of tsAllowed is set in the second row (gray row) from the top. In order for this tsAllowed to be true, st_idx=0 needs to be set. That is, tsAllowed can be true only in a case where the secondary transform is skipped. tsAllowed is a parameter for setting a value of a transform skip flag transform_skip_flag indicating whether or not transform skip for skipping (omitting) the orthogonal transform processing is performed. As illustrated in the fourth to sixth rows from the top, in a case where tsAllowed is true, the transform skip flag transform_skip_flag is signaled. In other words, in a case where tsAllowed is false, the transform skip flag transform_skip_flag is not signaled. In that case, on the decoding side, transform_skip_flag=0 is estimated, and transform skip is not performed. That is, the transform skip can be performed only in a case where the secondary transform is skipped.

Thus, the transform skip flag can be easily set according to the secondary transform identifier.

Furthermore, at the time of decoding, the transform skip flag can be easily analyzed according to the secondary transform identifier. Thus, an increase in load of the decoding processing can be suppressed.

Of course, skip of the secondary transform may not be added to the condition of whether or not to perform transform skip.

Note that, similarly to the case of the transform skip flag transform_skip_flag, the skip of the secondary transform may be added to the condition of whether or not to apply the adaptive orthogonal transform.

A value of mtsAllowed is set in the third row from the top in FIG. 15. Similarly to the case of the transform skip flag transform_skip_flag of FIG. 15, st_idx=0 (&& (st_idx [x0] [y0]==0)) may be added to the setting condition of mtsAllowed. That is, mtsAllowed may be true only in a case where the secondary transform is skipped. mtsAllowed is a parameter for setting a value of the adaptive orthogonal transform identifier tu_mts_idx indicating whether or not to apply the adaptive orthogonal transform processing for each TU. As illustrated in the seventh to ninth rows from the top, in a case where mtsAllowed is true, the adaptive orthogonal transform identifier tu_mts_idx is signaled. In other words, in a case where mtsAllowed is false, the adaptive orthogonal transform identifier tu_mts_idx is not signaled. In this case, on the decoding side, tu_mts_idx=0 is estimated, and the adaptive orthogonal transform is not applied. That is, the adaptive orthogonal transform can be performed only in a case where the secondary transform is skipped.

Thus, the adaptive orthogonal transform identifier can be easily set according to the secondary transform identifier. Furthermore, at the time of decoding, the adaptive orthogonal transform identifier can be easily analyzed according to the secondary transform identifier. Thus, an increase in load of the decoding processing can be suppressed.

Of course, skip of the secondary transform may not be added to the condition of whether or not to apply the adaptive orthogonal transform. That is, in the syntax of FIG. 15, st_idx=0 (&& (st_idx [x0] [y0]==0)) may be added only to the second row from the top, may be added only to the third row from the top, may be added to both of the second row and the third row from the top, or may not be added to both of the rows.

<Derivation of Context>

Furthermore, in this case, for example, as illustrated in FIG. 16, the context initial value (offset) ctxInc may be derived on the basis of only the tree type (treeType) without depending on the adaptive orthogonal transform identifier tu_mts_idx.

In FIG. 16, mtsCtx is set only on the basis of whether or not the tree type is a single tree. Therefore, it is possible to derive the context index of the first bin of the secondary transform identifier st_idx without requiring complicated processing (more easily). Similarly, at the time of decoding, it is possible to derive the context index of the first bin of the secondary transform identifier st_idx more easily. Thus, an increase in load of the decoding processing can be suppressed.

<2-2. Encoding Side>

<Image Encoding Device>

Next, the encoding side will be described. FIG. 17 is a block diagram illustrating an example of the configuration of an image encoding device, which is an aspect of an image processing device to which the present technology is applied. An image encoding device 100 illustrated in FIG.

17 is a device that encodes image data of a moving image. For example, the image encoding device 100 encodes the image data of a moving image by the encoding method described in any of Non-Patent Documents 1 to 10.

Note that FIG. 17 illustrates the main things such as the processing unit (block) and the data flow, and not all of them are illustrated in FIG. 17. That is, in the image encoding device 100, there may be a processing unit that is not illustrated as a block in FIG. 17, or there may be a processing or data flow that is not illustrated as an arrow or the like in FIG. 17.

As illustrated in FIG. 17, the image encoding device 100 includes a control unit 101, a rearrangement buffer 111, a calculation unit 112, an orthogonal transform unit 113, a quantization unit 114, an encoding unit 115, an accumulation buffer 116, and an inverse quantization unit 117, an inverse orthogonal transform unit 118, a calculation unit 119, an in-loop filter unit 120, a frame memory 121, a prediction unit 122, and a rate control unit 123.

<Control Unit>

The control unit 101 divides moving image data held by the rearrangement buffer 111 into blocks (CU, PU, transform block, and the like) in units of processing on the basis of the block size in external or predetermined units of processing. Furthermore, the control unit 101 determines encoding parameters (header information Hinfo, prediction mode information Pinfo, transform information Tinfo, filter information Finfo, and the like) supplied to each block on the basis of, for example, rate-distortion optimization (RDO).

Details of these encoding parameters will be described later. When the control unit 101 determines the encoding parameters described above, the control unit 101 supplies them to each block. Specifically, it is as described below.

The header information Hinfo is supplied to each block.

The prediction mode information Pinfo is supplied to the encoding unit 115 and the prediction unit 122.

The transform information Tinfo is supplied to the encoding unit 115, the orthogonal transform unit 113, the quantization unit 114, the inverse quantization unit 117, and the inverse orthogonal transform unit 118.

The filter information Finfo is supplied to the in-loop filter unit 120.

<Rearrangement Buffer>

Each field (input image) of moving image data is input to the image encoding device 100 in the reproduction order (display order). The rearrangement buffer 111 acquires and holds (stores) each input image in the reproduction order (display order). The rearrangement buffer 111 rearranges the input images in the encoding order (decoding order) or divides the input images into blocks in units of processing on the basis of the control of the control unit 101. The rearrangement buffer 111 supplies each processed input image to the calculation unit 112. Furthermore, the rearrangement buffer 111 also supplies each input image (original image) to the prediction unit 122 and the in-loop filter unit 120.

<Calculation Unit>

The calculation unit 112 takes an image I corresponding to the block in units of processing and a prediction image P supplied from the prediction unit 122 as inputs, subtracts the prediction image P from the image I as illustrated in the formula described below, derives a prediction residual D and supplies it to the orthogonal transform unit 113.

$$D=I-P$$

<Orthogonal Transform Unit>

The orthogonal transform unit 113 takes the prediction residual D supplied from the calculation unit 112 and the transform information Tinfo supplied from the control unit 101 as inputs, and performs orthogonal transform with respect to the prediction residual D on the basis of the transform information Tinfo to derive transform coefficient Coeff. Note that the orthogonal transform unit 113 can perform adaptive orthogonal transform for adaptively selecting the type of orthogonal transform (transform coefficient). The orthogonal transform unit 113 supplies the obtained transform coefficient Coeff to the quantization unit 114.

<Quantization Unit>

The quantization unit 114 takes the transform coefficient Coeff supplied from the orthogonal transform unit 113 and the transform information Tinfo supplied from the control unit 101 as inputs, and scales (quantizes) the transform coefficient Coeff on the basis of the transform information Tinfo. Note that the rate of the quantization is controlled by the rate control unit 123. The quantization unit 114 supplies the transform coefficient after quantization obtained by such quantization, i.e., the quantized transform coefficient level "level", to the encoding unit 115 and the inverse quantization unit 117.

<Encoding Unit>

The encoding unit 115 takes the quantized transform coefficient level "level" supplied from the quantization unit 114, the various encoding parameters (header information Hinfo, prediction mode information Pinfo, transform information Tinfo, filter information Finfo, and the like) supplied from the control unit 101, information regarding a filter such as a filter coefficient supplied from the in-loop filter unit 120, and information regarding an optimum prediction mode supplied from the prediction unit 122 as inputs. The encoding unit 115 performs variable length coding (for example, arithmetic encoding) of the quantized transform coefficient level "level" to generate a bit string (coded data).

Furthermore, the encoding unit 115 derives residual information Rinfo from the quantized transform coefficient level "level", encodes the residual information Rinfo, and generates a bit string.

Moreover, the encoding unit 115 includes the information regarding the filter supplied from the in-loop filter unit 120 in the filter information Finfo, and includes the information regarding the optimum prediction mode supplied from the prediction unit 122 in the prediction mode information Pinfo. Then, the encoding unit 115 encodes the aforementioned various encoding parameters (header information Hinfo, prediction mode information Pinfo, transform information Tinfo, filter information Finfo, and the like) to generate a bit string.

Furthermore, the encoding unit 115 multiplexes the bit strings of the various information generated as described above to generate the coded data. The encoding unit 115 supplies the coded data to the accumulation buffer 116.

<Accumulation Buffer>

The accumulation buffer 116 temporarily holds the coded data obtained by the encoding unit 115. The accumulation buffer 116 outputs the held coded data as, for example, a bitstream or the like to the outside of the image encoding device 100 at a predetermined timing. For example, this coded data is transmitted to the decoding side via an arbitrary recording medium, an arbitrary transmission medium, an arbitrary information processing device, or the like. That is, the accumulation buffer 116 is also a transmission unit that transmits the coded data (bitstream).

<Inverse Quantization Unit>

The inverse quantization unit 117 performs processing related to inverse quantization. For example, the inverse quantization unit 117 takes the quantized transform coefficient level "level" supplied from the quantization unit 114 and the transform information Tinfo supplied from the control unit 101 as inputs, and scales (inversely quantizes) the value of the quantized transform coefficient level "level" on the basis of the transform information Tinfo. Note that this inverse quantization is inverse processing of the quantization performed in the quantization unit 114. The inverse quantization unit 117 supplies transform coefficient Coeff_IQ obtained by such inverse quantization to the inverse orthogonal transform unit 118.

<Inverse Orthogonal Transform Unit>

The inverse orthogonal transform unit 118 performs processing related to the inverse orthogonal transform. For example, the inverse orthogonal transform unit 118 takes the transform coefficient Coeff_IQ supplied from the inverse quantization unit 117 and the transform information Tinfo supplied from the control unit 101 as inputs, and performs inverse orthogonal transform with respect to the transform coefficient Coeff_IQ on the basis of the transform information Tinfo to derive prediction residual D'. Note that this inverse orthogonal transform is inverse processing of the orthogonal transform performed in the orthogonal transform unit 113. That is, the inverse orthogonal transform unit 118 can perform adaptive inverse orthogonal transform for adaptively selecting the type of inverse orthogonal transform (transform coefficient).

The inverse orthogonal transform unit 118 supplies the prediction residual D' obtained by such inverse orthogonal transform to the calculation unit 119. Note that since the inverse orthogonal transform unit 118 is similar to an inverse orthogonal transform unit (described later) on the decoding side, the description (described later) given on the decoding side can be applied to the inverse orthogonal transform unit 118.

<Calculation Unit>

The calculation unit 119 takes the prediction residual D' supplied from the inverse orthogonal transform unit 118 and the prediction image P supplied from the prediction unit 122 as inputs. The calculation unit 119 adds the prediction residual D' and the prediction image P corresponding to the prediction residual D' to derive a locally decoded image Rlocal. The calculation unit 119 supplies the derived locally decoded image Rlocal to the in-loop filter unit 120 and the frame memory 121.

<In-Loop Filter Unit>

The in-loop filter unit 120 performs processing related to in-loop filter processing. For example, the in-loop filter unit 120 takes the locally decoded image Rlocal supplied from the calculation unit 119, the filter information Finfo supplied from the control unit 101, and the input image (original image) supplied from the rearrangement buffer 111 as inputs. Note that the information input to the in-loop filter unit 120 is arbitrary, and information other than such information may be input. For example, the prediction mode, motion information, code amount target value, quantization parameters QP, picture type, the information of blocks (CU, CTU, and the like) and the like may be input to the in-loop filter unit 120 as necessary.

The in-loop filter unit 120 appropriately performs filter processing with respect to the locally decoded image Rlocal on the basis of the filter information Finfo. The in-loop filter unit 120 also uses the input image (original image) and other input information for the filter processing as necessary.

For example, the in-loop filter unit 120 applies four in-loop filters: a bilateral filter, a deblocking filter (DBF), an adaptive offset filter (sample adaptive offset (SAO)), and an adaptive loop filter (ALF) in this order. Note that which filter to apply and in what order to apply are arbitrary and can be appropriately selected.

Of course, the filter processing performed by the in-loop filter unit 120 is arbitrary and is not limited to the above example. For example, the in-loop filter unit 120 may apply a Wiener filter or the like.

The in-loop filter unit 120 supplies the locally decoded image Rlocal that has been subjected to the filter processing to the frame memory 121. Note that in a case where the information regarding the filter such as a filter coefficient to the decoding side, the in-loop filter unit 120 supplies the information regarding the filter to the encoding unit 115.

<Frame Memory>

The frame memory 121 performs processing related to storage of data related to images. For example, the frame memory 121 takes the locally decoded image Rlocal supplied from the calculation unit 119 or the locally decoded image Rlocal, which has been subjected to the filter processing, supplied from the in-loop filter unit 120 as an input, and holds (stores) it. Furthermore, the frame memory 121 reconstructs a decoded image R for each picture unit using the locally decoded image Rlocal and holds it (stores it in the buffer in the frame memory 121). The frame memory 121 supplies the decoded image R (or a part thereof) to the prediction unit 122 in response to a request of the prediction unit 122.

<Prediction Unit>

The prediction unit 122 performs processing related to the generation of a prediction image. For example, the prediction unit 122 takes the prediction mode information Pinfo supplied from the control unit 101, the input image (original image) supplied from the rearrangement buffer 111, and the decoded image R (or a part thereof) read from the frame memory 121 as inputs. The prediction unit 122 performs prediction processing such as inter-prediction and intra-prediction using the prediction mode information Pinfo or the input image (original image), makes a prediction by referring to the decoded image R as a reference image, performs motion compensation processing on the basis of the prediction result, and generates the prediction image P. The prediction unit 122 supplies the generated prediction image P to the calculation unit 112 and the calculation unit 119. Furthermore, the prediction unit 122 supplies information regarding the prediction mode selected by the above processing, i.e., the optimum prediction mode, to the encoding unit 115 as necessary.

<Rate Control Unit>

The rate control unit 123 performs processing related to rate control. For example, the rate control unit 123 controls the rate of the quantization operation of the quantization unit 114 on the basis of the code amount of the coded data accumulated in the accumulation buffer 116 so that overflow or underflow does not occur.

Note that these processing units (control unit 101 and rearrangement buffer 111 to rate control unit 123) have an arbitrary configuration. For example, each processing unit may include a logic circuit that realizes the above-mentioned processing. Furthermore, each processing unit may include, for example, a central processing unit (CPU), a read only memory (ROM), a random access memory (RAM), and the like, and execute a program using them to realize the above-mentioned processing. Of course, each processing unit may have both configurations, and a part of the above-mentioned processing may be realized by the logic circuit, and the rest may be realized by executing the program. The configurations of the respective processing units may be independent of each other. For example, some processing units may realize a part of the above-mentioned processing by the logic circuit, and some other processing units may execute the program to realize the above-mentioned processing, and yet other processing units may realize the above-mentioned processing by both the logic circuit and execution of the program.

The image encoding device 100 encodes an image by applying the various methods described in <2-1. Signaling of secondary transform identifier>. Thus, as described above, an increase in load of the decoding processing can be suppressed.

<Control Unit>

FIG. 18 is a block diagram illustrating a main configuration example of the control unit 101. As illustrated in FIG. 18, the control unit 101 includes a secondary transform identifier setting unit 151, a transform skip flag setting unit 152, an adaptive orthogonal transform identifier setting unit 153, and a context setting unit 154.

The secondary transform identifier setting unit 151 performs processing related to setting of the secondary transform identifier st_idx. For example, the secondary transform identifier setting unit 151 sets a secondary transform identifier for a processing target CU of a frame image held in the rearrangement buffer 111 as an encoding parameter. At that time, the secondary transform identifier setting unit 151 applies the various methods described in <2-1. Signaling of secondary transform identifier>.

For example, the secondary transform identifier setting unit 151 sets a secondary transform identifier to be stored in a CU header (that is, signaled before each TU). Therefore, as described above, it is possible to suppress an increase in delay and memory use amount in the decoding processing, and it is possible to suppress an increase in load of the decoding processing.

Furthermore, the secondary transform identifier setting unit 151 can set a secondary transform identifier regardless of the number of nonzero transform coefficients in the CU. Thus, the complicated counting of the nonzero transform coefficients can be omitted, and an increase in load of the encoding processing can be suppressed. Furthermore, in the decoding processing also, the complicated counting of the nonzero transform coefficients can be omitted, and an increase in load of the decoding processing can be suppressed.

Moreover, the secondary transform identifier setting unit 151 can signal the secondary transform identifier only in a case where the residual PCM coding mode is not applied. Thus, at the time of decoding, the secondary transform identifier can be easily analyzed according to the residual PCM coding mode, and an increase in load of the decoding processing can be suppressed.

The secondary transform identifier st_idx set by the secondary transform identifier setting unit 151 as described above is supplied to the orthogonal transform unit 113, the encoding unit 115, and the inverse orthogonal transform unit 118 as Tinfo.

The transform skip flag setting unit 152 performs processing related to setting of the transform skip flag transform_skip_flag. For example, the transform skip flag setting unit 152 sets a transform skip flag for a processing target TU of a frame image held in the rearrangement buffer 111 as an encoding parameter. At that time, the transform skip flag setting unit 152 can apply the methods described in <2-1. Signaling of secondary transform identifier>.

For example, the transform skip flag setting unit 152 may set a transform skip flag on the basis of whether or not to perform secondary transform. That is, st_idx=0 (&& (st_idx [x0] [y0]==0)) may be added to the setting condition of tsAllowed. Thus, the transform skip flag can be easily set according to the secondary transform identifier. Furthermore, at the time of decoding, the transform skip flag can be easily analyzed according to the secondary transform identifier. Thus, an increase in load of the decoding processing can be suppressed.

The transform skip flag transform skip flag set by the transform skip flag setting unit 152 as described above is supplied to the orthogonal transform unit 113, the encoding unit 115, and the inverse orthogonal transform unit 118 as Tinfo.

The adaptive orthogonal transform identifier setting unit 153 performs processing related to setting of the adaptive orthogonal transform identifier tu_mts_idx. For example, the adaptive orthogonal transform identifier setting unit 153 sets an adaptive orthogonal transform identifier for a processing target TU of a frame image held in the rearrangement buffer 111 as an encoding parameter. At that time, the adaptive orthogonal transform identifier setting unit 153 can apply the methods described in <2-1. Signaling of secondary transform identifier>.

For example, the adaptive orthogonal transform identifier setting unit 153 may set an adaptive orthogonal transform identifier on the basis of whether or not to perform secondary transform. That is, st_idx=0 (&& (st_idx [x0] [y0]==0)) may be added to the setting condition of mtsAllowed. Thus, the adaptive orthogonal transform identifier can be easily set according to the secondary transform identifier. Furthermore, at the time of decoding, the adaptive orthogonal transform identifier can be easily analyzed according to the secondary transform identifier. Thus, an increase in load of the decoding processing can be suppressed.

The adaptive orthogonal transform identifier tu_mts_idx set by the adaptive orthogonal transform identifier setting unit 153 as described above is supplied to the orthogonal transform unit 113, the encoding unit 115, and the inverse orthogonal transform unit 118 as Tinfo.

The context setting unit 154 performs processing related to context setting. For example, the context setting unit 154 derives the context initial value (offset) ctxInc used for setting a secondary transform identifier for a processing target CU of a frame image held in the rearrangement buffer 111 as an encoding parameter. At that time, the context setting unit 154 can apply the methods described in <2-1. Signaling of secondary transform identifier>.

For example, the context setting unit 154 may derive the context ctxInc on the basis of only the tree type (treeType) without depending on the adaptive orthogonal transform identifier tu_mts_idx. Thus, it is possible to derive the context index of the first bin of the secondary transform identifier st_idx without requiring complicated processing (more easily).

Note that the control unit 101 can also generate other encoding parameters. Furthermore, the control unit 101 can also perform arbitrary processing other than generation of encoding parameters. Description thereof will be omitted.

<Orthogonal Transform Unit>

Figure 19:
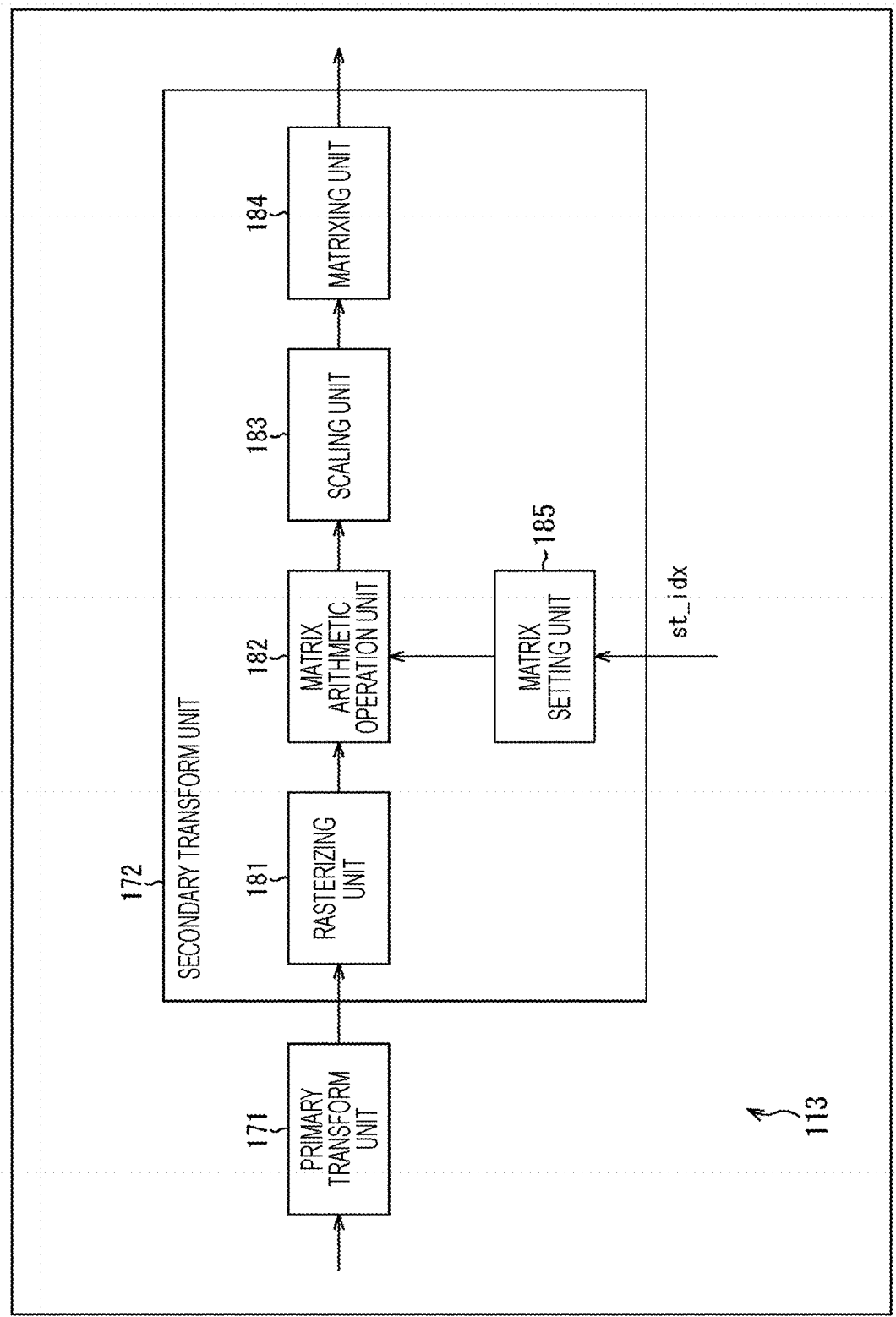
FIG. 19 is a block diagram illustrating a main configuration example of an orthogonal transform unit.

FIG. 19 is a block diagram illustrating a main configuration example of the orthogonal transform unit 113. In FIG. 19, the orthogonal transform unit 1123 includes a primary transform unit 171 and a secondary transform unit 172.

The primary transform unit 171 performs processing related to primary transform. For example, the primary transform unit 171 acquires the prediction residual D supplied from the calculation unit 112. Furthermore, the primary transform unit 171 performs predetermined matrix arithmetic operation or the like on the prediction residual D, and derives the transform coefficient Coeff_P (also referred to as a primary transform coefficient) after primary transform. That is, the primary transform unit 171 performs primary transform on the prediction residual D.

Note that the primary transform unit 171 performs this primary transform on the basis of an encoding parameter such as Tinfo supplied from the control unit 101. That is, the primary transform unit 171 performs primary transform under the control of the control unit 101. The primary transform unit 171 supplies the primary transform coefficient Coeff_P derived in this manner to the secondary transform unit 172.

Note that the primary transform unit 171 can skip (omit) the primary transform under the control of the control unit 101 (according to the encoding parameter supplied from the control unit 101). In that case, the primary transform unit 171 supplies the prediction residual D to the secondary transform unit 172 as the primary transform coefficient Coeff_P.

The secondary transform unit 172 performs processing related to secondary transform. For example, the secondary transform unit 172 acquires the primary transform coefficient Coeff_P supplied from the primary transform unit 171. The secondary transform unit 172 performs a predetermined matrix arithmetic operation or the like on the primary transform coefficient Coeff_P to derive a transform coefficient Coeff (also referred to as a secondary transform coefficient) after secondary transform. That is, the secondary transform unit 172 performs secondary transform on the primary transform coefficient Coeff_P.

Note that the secondary transform unit 172 performs this secondary transform on the basis of an encoding parameter such as Tinfo supplied from the control unit 101. That is, the secondary transform unit 172 performs secondary transform under the control of the control unit 101. The secondary transform unit 172 supplies the secondary transform coefficient Coeff (that is, the transform coefficient Coeff) derived in this manner to the quantization unit 114.

Note that the secondary transform unit 172 can skip (omit) the secondary transform under the control of the control unit 101 (according to the encoding parameter supplied from the control unit 101). In that case, the secondary transform unit 172 supplies the primary transform coefficient Coeff_P as the secondary transform coefficient Coeff (that is, the transform coefficient Coeff) to the quantization unit 114.

The secondary transform unit 172 includes a rasterizing unit 181, a matrix arithmetic operation unit 182, a scaling unit 183, a matrixing unit 184, and a matrix setting unit 185.

The rasterizing unit 181 transforms the primary transform coefficient Coeff_P supplied from the primary transform unit 171 into a one-dimensional vector (coefficient group of 1×16) for each subblock unit (4×4 subblocks). The rasterizing unit 181 supplies the obtained one-dimensional vector to the matrix arithmetic operation unit 182.

The matrix arithmetic operation unit 182 performs processing related to a matrix arithmetic operation. For example, the matrix arithmetic operation unit 182 acquires the one-dimensional vector supplied from the rasterizing unit 181. Furthermore, the matrix arithmetic operation unit 182 acquires a secondary transform matrix R supplied from the matrix setting unit 185. The matrix arithmetic operation unit 182 performs a matrix arithmetic operation (matrix multiplication) using the one-dimensional vector and the secondary transform matrix R. The matrix arithmetic operation unit 182 supplies the matrix arithmetic operation result (coefficient data obtained by the matrix arithmetic operation) to the scaling unit 183.

The scaling unit 183 performs processing related to scaling of coefficient data. For example, the scaling unit 183 acquires coefficient data (matrix arithmetic operation result) supplied from the matrix arithmetic operation unit 182. The scaling unit 183 performs clip processing or the like on the coefficient data. The scaling unit 183 supplies the processed coefficient data to the matrixing unit 184.

The matrixing unit 184 performs processing related to matrixing of the one-dimensional vector. For example, the matrixing unit 184 acquires scaled 1×16 coefficient data (one-dimensional vector) supplied from the scaling unit. Furthermore, the matrixing unit 184 transforms the one-dimensional vector into a 4×4 matrix by a method corresponding to the method of the rasterizing unit 181. The matrixing unit 184 supplies the matrix (coefficient data group) obtained in this manner to the quantization unit 114 as the transform coefficient Coeff.

The matrix setting unit 185 performs processing related to setting of the secondary transform matrix R used in the matrix arithmetic operation unit 182. For example, the matrix setting unit 185 acquires the secondary transform identifier st_idx set by the control unit 101. Furthermore, the matrix setting unit 185 sets the secondary transform matrix R on the basis of the secondary transform identifier st_idx. For example, the matrix setting unit 185 reads a candidate corresponding to the secondary transform identifier st_idx from candidates stored in an internal memory (not illustrated), and supplies the candidate to the matrix arithmetic operation unit 182.

That is, the secondary transform unit 172 performs the secondary transform according to the secondary transform identifier st_idx set by the control unit 101 (that is, under the control of the control unit 101).

<Encoding Unit>

The encoding unit 115 in FIG. 17 encodes the encoding parameter set by the control unit 101, and generates coded data (bitstream) including the encoding parameter. At that time, the encoding unit 115 can apply the methods described in <2-1. Signaling of secondary transform identifier>.

That is, the encoding unit 115 signals the secondary transform identifier st_idx in the CU header (before each TU in the CU). Thus, as described above, an increase in load of decoding can be suppressed.

<Flow of Image Encoding Processing>

Next, an example of the flow of image encoding processing executed by the image encoding device 100 having the above configuration will be described with reference to the flowchart of FIG. 20.

When the image encoding processing is started, in step S101, the rearrangement buffer 111 is controlled by the control unit 101 to rearrange the frame order of the input moving image data from the display order to the encoding order.

In step S102, the control unit 101 sets the unit of processing (performs block division) for the input image held by the rearrangement buffer 111.

In step S103, the control unit 101 determines (sets) the encoding parameters for the input image held by the rearrangement buffer 111.

In step S104, the prediction unit 122 performs prediction processing and generates a prediction image or the like of the optimum prediction mode. For example, in this prediction processing, the prediction unit 122 performs intra-prediction to generate a prediction image or the like of the optimum intra-prediction mode, performs inter-prediction to generate a prediction image or the like of the optimum inter-prediction mode, and selects the optimum prediction mode from among them on the basis of a cost function value and the like.

In step S105, the calculation unit 112 calculates the difference between the input image and the prediction image of the optimum mode selected by the prediction processing in step S104. That is, the calculation unit 112 generates the prediction residual D between the input image and the prediction image. The amount of data of the prediction residual D obtained in this way is smaller than that of the original image data. Therefore, the amount of data can be compressed as compared with the case where the image is encoded as it is.

In step S106, the orthogonal transform unit 113 performs orthogonal transform processing on the prediction residual D generated by the processing of step S105, and derives the transform coefficient Coeff.

In step S107, the quantization unit 114 quantizes the transform coefficient Coeff obtained by the processing of step S106, for example, by using quantization parameters calculated by the control unit 101, and derives the quantized transform coefficient level "level".

In step S108, the inverse quantization unit 117 inversely quantizes the quantized transform coefficient level "level" generated by the processing of step S107 with the characteristics corresponding to the characteristics of the quantization of step S107, and derives the transform coefficient Coeff_IQ.

In step S109, the inverse orthogonal transform unit 118 performs inverse orthogonal transform of the transform coefficient Coeff_IQ obtained by the processing of step S108 using a method corresponding to the orthogonal transform processing of step S106, and derives the prediction residual D'. Note that since the inverse orthogonal transform processing is similar to inverse orthogonal transform processing (described later) performed on the decoding side, the description (described later) given on the decoding side can be applied to the inverse orthogonal transform processing of step S109.

In step S110, the calculation unit 119 adds the prediction image obtained by the prediction processing of step S104 to the prediction residual D' derived by the processing of step S109 to generate a locally decoded image.

In step S111, the in-loop filter unit 120 performs the in-loop filter processing on the locally decoded image derived by the processing of step S110.

In step S112, the frame memory 121 stores the locally decoded image derived by the processing of step S110 or the locally decoded image subjected to the filter processing in step S111.

In step S113, the encoding unit 115 encodes the quantized transform coefficient level "level" obtained by the processing of step S107. For example, the encoding unit 115 encodes the quantized transform coefficient level "level", which is information regarding an image, by arithmetic encoding or the like to generate the coded data. Furthermore, at this time, the encoding unit 115 encodes the various encoding parameters (header information Hinfo, prediction mode information Pinfo, transform information Tinfo). Moreover, the encoding unit 115 derives the residual information RInfo from the quantized transform coefficient level "level", and encodes the residual information RInfo.

In step S114, the accumulation buffer 116 accumulates the resulting coded data and outputs it, for example, as a bitstream to the outside of the image encoding device 100. This bitstream is transmitted to the decoding side via, for example, a transmission path or a recording medium. Furthermore, the rate control unit 123 performs the rate control as necessary.

When the processing of step S114 ends, the image encoding processing ends.

<Flow of Encoding Parameter Setting Processing>

An example of the flow of encoding parameter setting processing executed in step S103 of FIG. 20 will be described with reference to the flowchart of FIG. 21. The control unit 101 executes this encoding parameter setting processing by applying the various methods described in <2-1. Signaling of secondary transform identifier>.

When the encoding parameter setting processing is started, the secondary transform identifier setting unit 151 of the control unit 101 sets the secondary transform identifier st_idx to be stored in the CU header in step S131. That is, the secondary transform identifier setting unit 151 sets the secondary transform identifier to be signaled before each TU. Therefore, as described above, it is possible to suppress an increase in delay and memory use amount in the decoding processing, and it is possible to suppress an increase in load of the decoding processing.

Note that, in that case, the secondary transform identifier setting unit 151 can set the secondary transform identifier regardless of the number of nonzero transform coefficients in the CU. Thus, the complicated counting of the nonzero transform coefficients can be omitted, and an increase in load of the encoding processing can be suppressed. Furthermore, in the decoding processing also, the complicated counting of the nonzero transform coefficients can be omitted, and an increase in load of the decoding processing can be suppressed.

Moreover, the secondary transform identifier setting unit 151 can signal the secondary transform identifier only in a case where the residual PCM coding mode is not applied. Thus, at the time of decoding, the secondary transform identifier can be easily analyzed according to the residual PCM coding mode, and an increase in load of the decoding processing can be suppressed.

In step S132, the transform_skip_flag setting unit 152 sets the transform_skip_flag on the basis of the secondary transform identifier set in step S131. That is, the transform_skip_flag setting unit 152 sets a transform_skip_flag on the basis of whether or not to perform secondary transform. Thus, the transform skip flag can be easily set according to the secondary transform identifier. Furthermore, at the time of decoding, the transform_skip_flag can be easily analyzed according to the secondary transform identifier. Thus, an increase in load of the decoding processing can be suppressed.

In step S133, the adaptive orthogonal transform identifier setting unit 153 sets the adaptive orthogonal transform identifier on the basis of the secondary transform identifier set in step S131. That is, the adaptive orthogonal transform identifier setting unit 153 sets the adaptive orthogonal transform identifier on the basis of whether or not to perform secondary transform. Thus, the adaptive orthogonal transform identifier can be easily set according to the secondary transform identifier. Furthermore, at the time of decoding, the adaptive orthogonal transform identifier can be easily analyzed according to the secondary transform identifier. Thus, an increase in load of the decoding processing can be suppressed.

In step S134, the context setting unit 154 sets the context without using the adaptive orthogonal transform identifier. That is, the context setting unit 154 derives the context ctxInc on the basis of only the tree type (treeType) without depending on the adaptive orthogonal transform identifier tu_mts_idx. Thus, it is possible to derive the context index of the first bin of the secondary transform identifier st_idx without requiring complicated processing (more easily).

Figure 20:
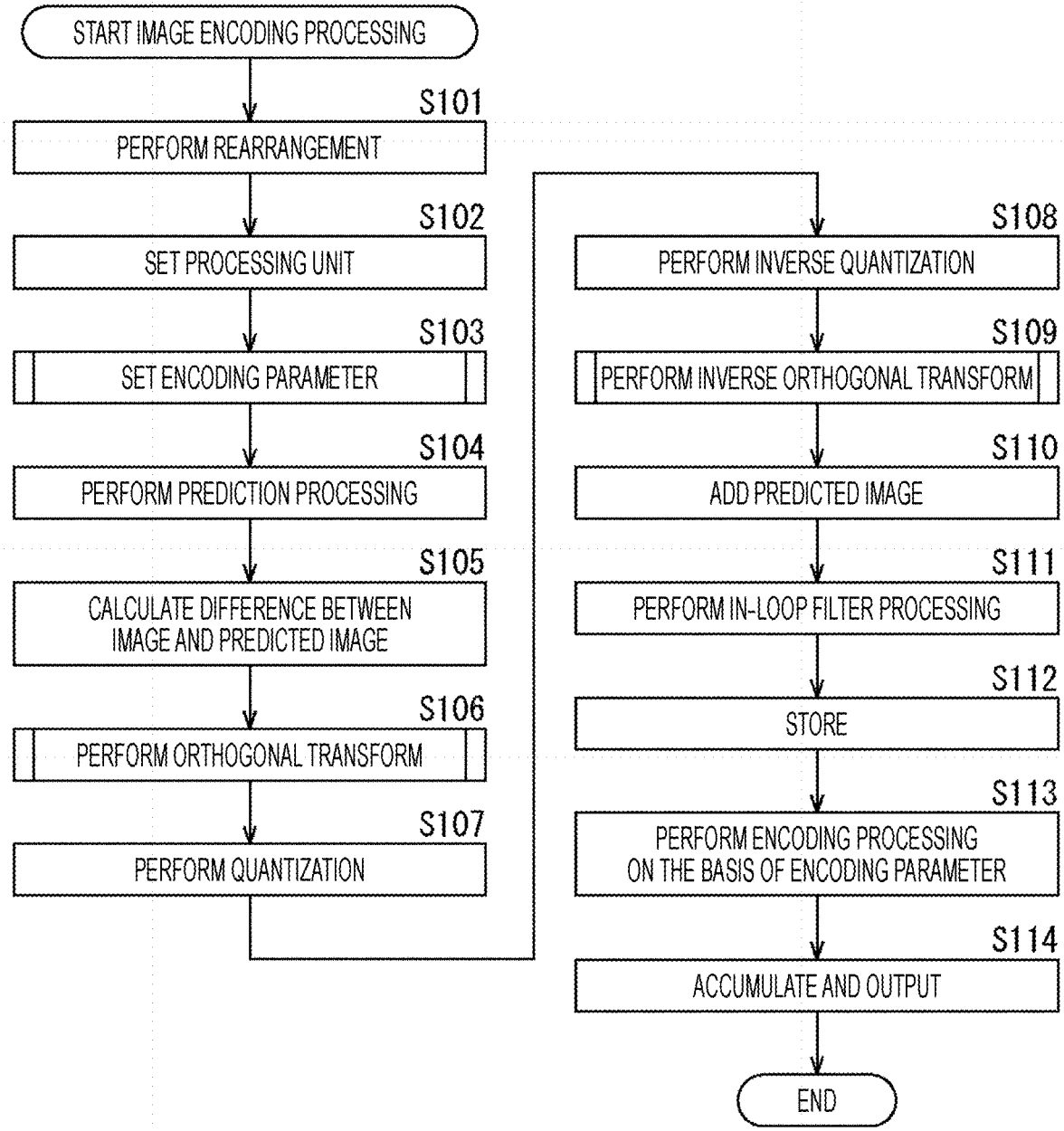
FIG. 20 is a flowchart illustrating an example of a flow of image encoding processing.
Figure 21:
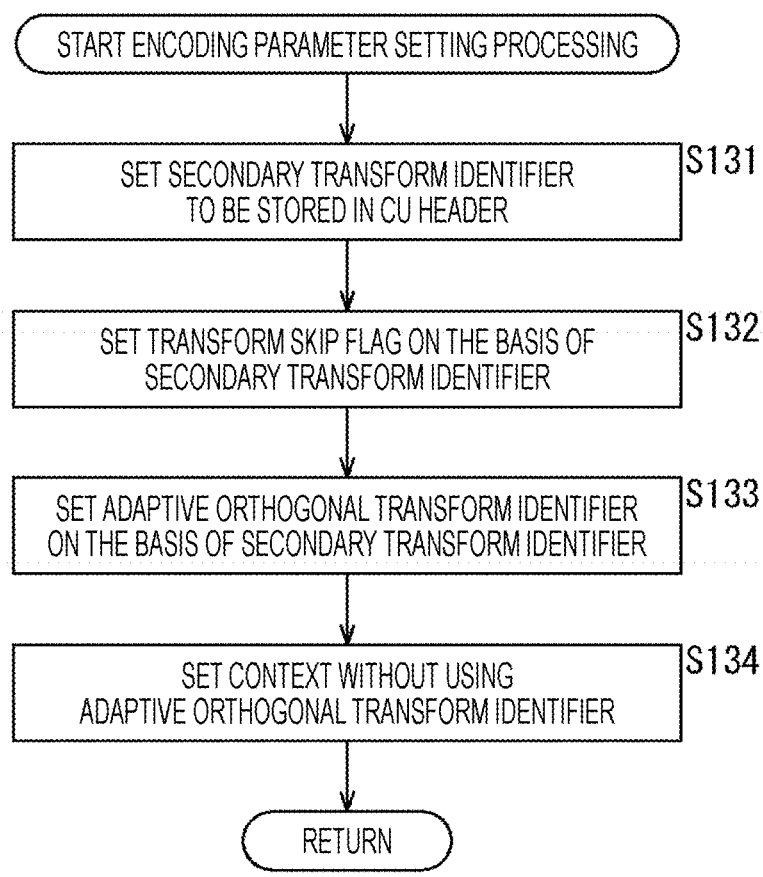
FIG. 21 is a flowchart illustrating an example of a flow of encoding parameter setting processing.

When the processing of step S134 ends, the encoding parameter setting processing ends, and the processing returns to FIG. 20.

Note that, in step S132, the transform skip flag setting unit 152 may set the transform skip flag without using the secondary transform identifier. Furthermore, in step S133, the adaptive orthogonal transform identifier setting unit 153 may set the adaptive orthogonal transform identifier without using the secondary transform identifier. Moreover, in step S134, the context setting unit 154 may set the context on the basis of the adaptive orthogonal transform identifier and the tree type. Furthermore, in this encoding parameter setting processing, a step of generating another arbitrary encoding parameter may be added.

<Flow of Orthogonal Transform Processing>

Figure 22:
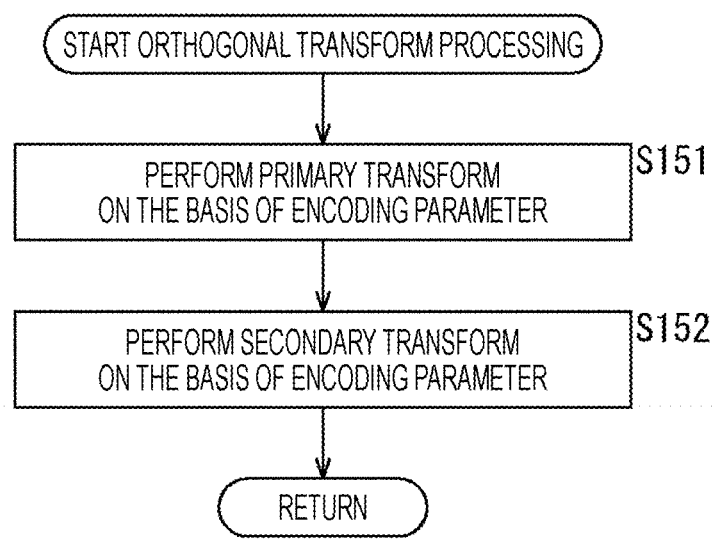
FIG. 22 is a flowchart illustrating an example of a flow of orthogonal transform processing.

An example of the flow of orthogonal transform processing executed in step S106 of FIG. 20 will be described with reference to the flowchart of FIG. 22.

When the orthogonal transform processing is started, in step S151, the primary transform unit 171 of the orthogonal transform unit 113 performs primary transform on the basis of the encoding parameter set in the processing in step S103 in FIG. 20. For example, the primary transform unit 171 performs primary transform by a method specified by an encoding parameter. Furthermore, in a case where skip of primary transform is specified by the encoding parameter, the primary transform unit 171 skips the primary transform.

In step S152, the secondary transform unit 172 performs secondary transform on the basis of the encoding parameter set in the processing in step S103 in FIG. 20. For example, the secondary transform unit 172 performs secondary transform using various parameters set as described with reference to the flowchart of FIG. 21. Note that, in a case where the skip of the secondary transform is specified by the secondary transform identifier or the like, the secondary transform unit 172 skips the secondary transform.

When the processing in step S152 ends, the orthogonal transform processing ends, and the processing returns to FIG. 20.

<Encoding Processing>

In step S113 of the image encoding processing of FIG. 20, the encoding unit 115 encodes the encoding parameter set in step S103. At that time, the encoding unit 115 can apply the methods described in <2-1. Signaling of secondary transform identifier>.

That is, the encoding unit 115 signals the secondary transform identifier st_idx in the CU header (before each TU in the CU). Thus, as described above, an increase in load of decoding can be suppressed.

<2-3. Decoding Side>
<Image Decoding Device>

Figure 23:
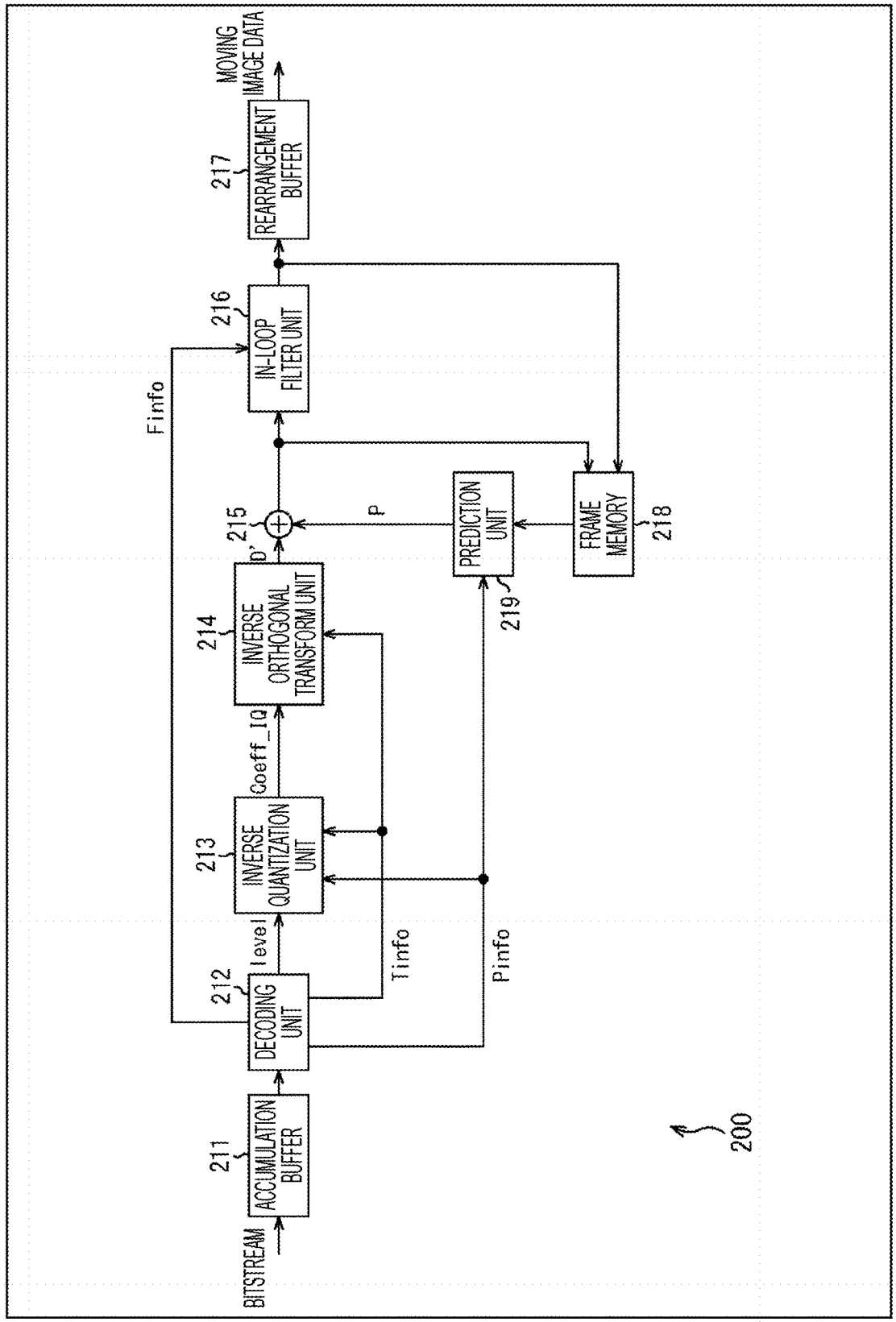
FIG. 23 is a block diagram illustrating a main configuration example of an image decoding device.

Next, the decoding side will be described. FIG. 23 is a block diagram illustrating an example of the configuration of an image decoding device, which is an aspect of an image processing device to which the present technology is applied. An image decoding device 200 illustrated in FIG. 23 is a device that decodes the coded data of a moving image. For example, the image decoding device 200 decodes the coded data using the decoding method described in any of Non-Patent Documents 1 to 10 and generates moving image data. For example, the image decoding device 200 decodes the coded data (bitstream) generated by the image encoding device 100 described above and generate moving image data.

Note that FIG. 23 illustrates the main things such as the processing unit and the data flow, and not all of them are illustrated in FIG. 23. That is, in the image decoding device 200, there may be a processing unit that is not illustrated as a block in FIG. 23, or there may be a processing or data flow that is not illustrated as an arrow or the like in FIG. 23.

In FIG. 23, the image decoding device 200 includes an accumulation buffer 211, a decoding unit 212, an inverse quantization unit 213, an inverse orthogonal transform unit 214, a calculation unit 215, an in-loop filter unit 216, a rearrangement buffer 217, a frame memory 218, and a prediction unit 219. Note that the prediction unit 219 includes an intra-prediction unit and an inter-prediction unit, which are not illustrated.

<Accumulation Buffer>

The accumulation buffer 211 acquires and holds (stores) the bitstream input to the image decoding devices 200. The accumulation buffer 211 supplies the stored bitstream to the decoding unit 212 at a predetermined timing or, for example, in a case where a predetermined condition is satisfied.

<Decoding Unit>

The decoding unit 212 performs processing related to image decoding. For example, the decoding unit 212 takes the bitstream supplied from the accumulation buffer 211 as an input, performs variable length decoding on the syntax value of each syntax element from the bit string according to the definition of a syntax table, and derives parameters.

The syntax element and the parameters derived from the syntax value of the syntax element include, for example, information such as the header information Hinfo, the prediction mode information Pinfo, the transform information Tinfo, the residual information Rinfo, and the filter information Finfo. That is, the decoding unit 212 parses (analyzes and acquires) these pieces of information from the bitstream. These pieces of information will be described below.

<Header Information Hinfo>

The header information Hinfo includes, for example, header information such as video parameter set (VPS)/sequence parameter set (SPS)/picture parameter set (PPS)/slice header (SH). The header information Hinfo includes, for example, information that specifies image size (width PicWidth, height PicHeight), bit depth (luminance bitDepthY, chrominance bitDepthC), chrominance array type ChromaArrayType, maximum value MaxCUSize/minimum value MinCUSize of CU size, maximum depth MaxQTDepth/minimum depth MinQTDepth of quad-tree division (also referred to as Quad-tree division), maximum depth MaxBTDepth/minimum depth MinBTDepth of binary-tree division (Binary-tree division), maximum value MaxTSSize of transform skip block (also referred to as maximum transform skip block size), on/off flag (also referred to as enabled flag) of each encoding tool.

For example, the on/off flag of the encoding tool included in the header information Hinfo include on/off flags related to the transform and quantization processing illustrated below. Note that the on/off flag of the encoding tool can also be interpreted as a flag indicating whether or not the syntax related to the encoding tool exists in the coded data. Furthermore, in a case where the value of the on/off flag is 1 (true), it indicates that the encoding tool can be used, and in a case where the value of the on/off flag is 0 (false), it indicates that the encoding tool cannot be used. Note that the interpretation of the flag values may be reversed.

An inter-component prediction enabled flag (ccp_enabled_flag) is flag information indicating whether or not inter-component prediction (cross-component prediction (CCP), also referred to as CC prediction) is available. For example, in a case where this flag information is "1" (true), it indicates that it can be used, and in a case where it is "0" (false), it indicates that it cannot be used.

Note that this CCP is also referred to as inter-component linear prediction (CCLM or CCLMP).

<Prediction Mode Information Pinfo>

The prediction mode information Pinfo includes, for example, information such as size information PBSize (prediction block size) of processing target PB (prediction block), intra-prediction mode information IPinfo, motion prediction information MVinfo, and the like.

The intra-prediction mode information IPinfo includes, for example, prev_intra_luma_pred_flag, mpm_idx, rem_intra_pred_mode in JCTVC-W1005, 7.3.8.5 Coding Unit syntax, and luminance intra-prediction mode IntraPredModeY derived from the syntaxes.

Furthermore, the intra-prediction mode information IPinfo includes, for example, an inter-component prediction flag (ccp_flag (cclmp_flag)), a multi-class linear prediction mode flag (mclm_flag), a chrominance sample location type identifier (chroma_sample_loc_type_idx), a chrominance MPM identifier (chroma_mpm_idx), and, a luminance intra-prediction mode (IntraPredModeC) derived from these syntaxes, and the like.

The inter-component prediction flag (ccp_flag (cclmp_flag)) is flag information indicating whether or not to apply inter-component linear prediction. For example, ccp_flag==1 indicates that inter-component prediction is applied, and ccp_flag==0 indicates that the inter-component prediction is not applied.

The multi-class linear prediction mode flag (mclm_flag) is information regarding the mode of linear prediction (linear prediction mode information). More specifically, the multi-class linear prediction mode flag (mclm_flag) is flag information indicating whether or not to set the multi-class linear prediction mode. For example, in the case of "0", it indicates 1-class mode (single class mode) (for example, CCLMP), and in the case of "1", it indicates 2-class mode (multi-class mode) (for example, MCLMP).

The chrominance sample location type identifier (chroma_sample_loc_type_idx) is an identifier that identifies the type of pixel position of the chrominance component (also referred to as the chrominance sample position type). For example, in a case where the color difference array type (ChromaArrayType), which is information regarding a color format, indicates 420 format, the chrominance sample location type identifier is allocated as illustrated in the formulae below.

chroma_sample_loc_type_idx==0:Type2 chroma_sample_loc_type_idx==1: Type3 chroma_sample_loc_type_idx==2: Type0 chroma_sample_loc_type_idx==3:Type1

Note that the chrominance sample location type identifier (chroma_sample_loc_type_idx) is (stored in) transmitted as information (chroma_sample_loc_info ( )) regarding the pixel position of the chrominance component.

The chrominance MPM identifier (chroma_mpm_idx) is an identifier indicating which prediction mode candidate in a chrominance intra-prediction mode candidate list (intraPredModeCandListC) is designated as the chrominance intra-prediction mode.

The motion prediction information MVinfo includes, for example, information such as merge_idx, merge_flag, inter_pred_idc, ref_idx_LX, mvp_1X_flag, X={0, 1}, mvd (see, for example, JCTVC-W1005, 7.3.8.6 Prediction Unit Syntax).

Of course, the information included in the prediction mode information Pinfo is arbitrary, and information other than these pieces of information may be included.

<Transform Information Tinfo>

The transform information Tinfo includes, for example, the information described below. Of course, the information included in the transform information Tinfo is arbitrary, and information other than these pieces of information may be included.

Width size TBWSize and height TBHSize of a processing target transform block (or may be logarithmic values log2TBWSize and log2TBHSize of respective TBWSize and TBHSize to base 2).

Transform skip flag (transform_skip_flag): A flag indicating whether or not to skip (inverse) primary transform and (inverse) secondary transform.

Scan identifier (scanIdx)

Secondary transform identifier (st_idx)

Adaptive orthogonal transform identifier (mts_idx)

Quantization parameter (qp)

Quantization matrix (scaling_matrix (e.g., JCTVC-W1005, 7.3.4 Scaling list data syntax))

<Residual Information Rinfo>

The residual information Rinfo (see, for example, 7.3.8.11 Residual Coding syntax of JCTVC-W1005) includes, for example, the syntaxes described below.

cbf (coded_block_flag): Residual data presence/absence flag last_sig_coeff_x_pos: Last nonzero transform coefficient X coordinate last_sig_coeff_y_pos: Last nonzero transform coefficient Y coordinate coded_sub_block_flag: Subblock nonzero transform coefficient presence/absence flag sig_coeff_flag: Nonzero transform coefficient presence/absence flag gr1_flag: Flag indicating whether the level of nonzero transform coefficient is greater than 1 (also referred to as GR1 flag)

gr2_flag: Flag indicating whether the level of nonzero transform coefficient is greater than 2 (also referred to as GR2 flag)

sign_flag: Code indicating positive or negative of nonzero transform coefficient (also referred to as a sign code)

coeff_abs_level_remaining: Remaining level of nonzero transform coefficient (also referred to as nonzero transform coefficient remaining level)

Of course, the information included in the residual information Rinfo is arbitrary, and information other than these pieces of information may be included.

<Filter Information Finfo>

The filter information Finfo includes, for example, control information related to each filter processing described below.

Control information related to deblocking filter (DBF)

Control information related to pixel adaptive offset (SAO)

Control information related to adaptive loop filter (ALF)

Control information related to other linear and nonlinear filters

More specifically, for example, information for specifying a picture to which each filter is applied and an area in the picture, filter On/Off control information in CU units, filter On/Off control information related to slice and tile boundaries, and the like are included. Of course, the information included in the filter information Finfo is arbitrary, and information other than these pieces of information may be included.

Referring back to the description of the decoding unit 212, the decoding unit 212 derives the quantized transform coefficient level "level" of each coefficient position in each transform block with reference to the residual information Rinfo. The decoding unit 212 supplies the quantized transform coefficient level "level" to the inverse quantization unit 213.

Furthermore, the decoding unit 212 supplies the parsed header information Hinfo, prediction mode information Pinfo, quantized transform coefficient level "level", transform information Tinfo, and filter information Finfo to each block. Specifically, it is as described below.

The header information Hinfo is supplied to the inverse quantization unit 213, the inverse orthogonal transform unit 214, the prediction unit 219, and the in-loop filter unit 216.

The prediction mode information Pinfo is supplied to the inverse quantization unit 213 and the prediction unit 219.

The transform information Tinfo is supplied to the inverse quantization unit 213 and the inverse orthogonal transform unit 214.

The filter information Finfo is supplied to the in-loop filter unit 216.

Of course, the above-mentioned example is an example and is not limited to this example. For example, each encoding parameter may be supplied to an arbitrary processing unit. Furthermore, other information may be supplied to an arbitrary processing unit.

<Inverse Quantization Unit>

The inverse quantization unit 213 has at least a configuration necessary for performing processing related to the inverse quantization. For example, the inverse quantization unit 213 takes the transform information Tinfo and the quantized transform coefficient level "level" supplied from the decoding unit 212 as inputs, scales (inversely quantizes) the value of the quantized transform coefficient level "level" on the basis of the transform information Tinfo, and derives the transform coefficient Coeff_IQ after the inverse quantization.

Note that this inverse quantization is performed as inverse processing of the quantization by the quantization unit 114 of the image encoding device 100. Furthermore, this inverse quantization is processing similar to the inverse quantization by the inverse quantization unit 117 of the image encoding device 100. That is, the inverse quantization unit 117 of the image encoding device 100 performs processing (inverse quantization) similar to that by the inverse quantization unit 213.

The inverse quantization unit 213 supplies the derived transform coefficient Coeff_IQ to the inverse orthogonal transform unit 214.

<Inverse Orthogonal Transform Unit>

The inverse orthogonal transform unit 214 performs processing related to the inverse orthogonal transform. For example, the inverse orthogonal transform unit 214 takes the transform coefficient Coeff_IQ supplied from the inverse quantization unit 213 and the transform information Tinfo supplied from the decoding unit 212 as inputs, and performs inverse orthogonal transform processing with respect to the transform coefficient Coeff_IQ on the basis of the transform information Tinfo to derive the prediction residual D'.

Note that this inverse orthogonal transform is performed as inverse processing of the orthogonal transform by the orthogonal transform unit 113 of the image encoding device 100. Furthermore, this inverse orthogonal transform is processing similar to the inverse orthogonal transform by the inverse orthogonal transform unit 118 of the image encoding device 100. That is, the inverse orthogonal transform unit 118 of the image encoding device 100 performs processing (inverse orthogonal transform) similar to that by the inverse orthogonal transform unit 214.

The inverse orthogonal transform unit 214 supplies the derived prediction residual D' to the calculation unit 215.

<Calculation Unit>

The calculation unit 215 performs processing related to addition of information regarding images. For example, the calculation unit 215 takes the prediction residual D' supplied from the inverse orthogonal transform unit 214 and the prediction image P supplied from the prediction unit 219 as inputs. As illustrated in the formula below, the calculation unit 215 adds the prediction residual D' and the prediction image P (prediction signal) corresponding to the prediction residual D' to derive the locally decoded image Rlocal.

$$Rlocal = D' + P$$

The calculation unit 215 supplies the derived locally decoded image Rlocal to the in-loop filter unit 216 and the frame memory 218.

<In-Loop Filter Unit>

The in-loop filter unit 216 performs processing related to in-loop filter processing. For example, the in-loop filter unit 216 takes the locally decoded image Rlocal supplied from the calculation unit 215 and the filter information Finfo supplied from the decoding unit 212 as inputs. Note that the information input to the in-loop filter unit 216 is arbitrary, and information other than such information may be input.

The in-loop filter unit 216 appropriately performs filter processing with respect to the locally decoded image Rlocal on the basis of the filter information Finfo.

For example, the in-loop filter unit 216 applies four in-loop filters: a bilateral filter, a deblocking filter (DBF), an adaptive offset filter (sample adaptive offset (SAO)), and an adaptive loop filter (ALF) in this order. Note that which filter to apply and in what order to apply are arbitrary and can be appropriately selected.

The in-loop filter unit 216 performs filter processing corresponding to the filter processing performed by the encoding side (for example, the in-loop filter unit 120 of the image encoding device 100). Of course, the filter processing performed by the in-loop filter unit 216 is arbitrary and is not limited to the above example. For example, the in-loop filter unit 216 may apply a Wiener filter or the like.

The in-loop filter unit 216 supplies the locally decoded image Rlocal that has been subjected to the filter processing to the rearrangement buffer 217 and the frame memory 218.

<Rearrangement Buffer>

The rearrangement buffer 217 takes the locally decoded image Rlocal supplied from the in-loop filter unit 216 as an input and holds (stores) it. The rearrangement buffer 217 reconstructs a decoded image R for each picture unit using the locally decoded image Rlocal and holds it (stores it in the buffer). The rearrangement buffer 217 rearranges the obtained decoded image R from the decoding order to the reproduction order. The rearrangement buffer 217 outputs a rearranged decoded image R group as moving image data to the outside of the image decoding device 200.

<Frame Memory>

The frame memory 218 performs processing related to storage of data related to images. For example, the frame memory 218 takes the locally decoded image Rlocal supplied by the calculation unit 215 as an input, reconstructs the decoded image R for each picture unit, and stores it in the buffer in the frame memory 218.

Furthermore, the frame memory 218 takes the locally decoded image Rlocal that has been subjected to the in-loop filter processing and supplied from the in-loop filter unit 216 as an input, reconstructs the decoded image R for each picture unit, and stores it in the buffer in the frame memory 218. The frame memory 218 appropriately supplies the stored decoded image R (or a part thereof) to the prediction unit 219 as a reference image.

Note that the frame memory 218 may store the header information Hinfo, the prediction mode information Pinfo, the transform information Tinfo, the filter information Finfo, and the like related to the generation of the decoded image.

<Prediction Unit>

The prediction unit 219 performs processing related to the generation of a prediction image. For example, the prediction unit 219 takes the prediction mode information Pinfo supplied from the decoding unit 212 as an input, makes a prediction using a prediction method specified by the prediction mode information Pinfo, and derives the prediction image P. At the time of derivation, the prediction unit 219 uses the decoded image R (or a part thereof) before filtering or after filtering stored in the frame memory 218 specified by the prediction mode information Pinfo as a reference image. The prediction unit 219 supplies the derived prediction image P to the calculation unit 215.

Note that these processing units (the accumulation buffer 211 to the prediction unit 219) have an arbitrary configuration. For example, each processing unit may include a logic circuit that realizes the above-mentioned processing. Furthermore, each processing unit may include, for example, a CPU, ROM, RAM, and the like, and execute a program using them to realize the above-mentioned processing. Of course, each processing unit may have both configurations, and a part of the above-mentioned processing may be realized by the logic circuit, and the rest may be realized by executing the program. The configurations of the respective processing units may be independent of each other. For example, some processing units may realize a part of the above-mentioned processing by the logic circuit, and some other processing units may execute the program to realize the above-mentioned processing, and yet other processing units may realize the above-mentioned processing by both the logic circuit and execution of the program.

The image decoding device 200 decodes the coded data by applying the various methods described in <2-1. Signaling of secondary transform identifier>. Thus, as described above, an increase in load of the decoding processing can be suppressed.

<Decoding Unit>

Figure 24:
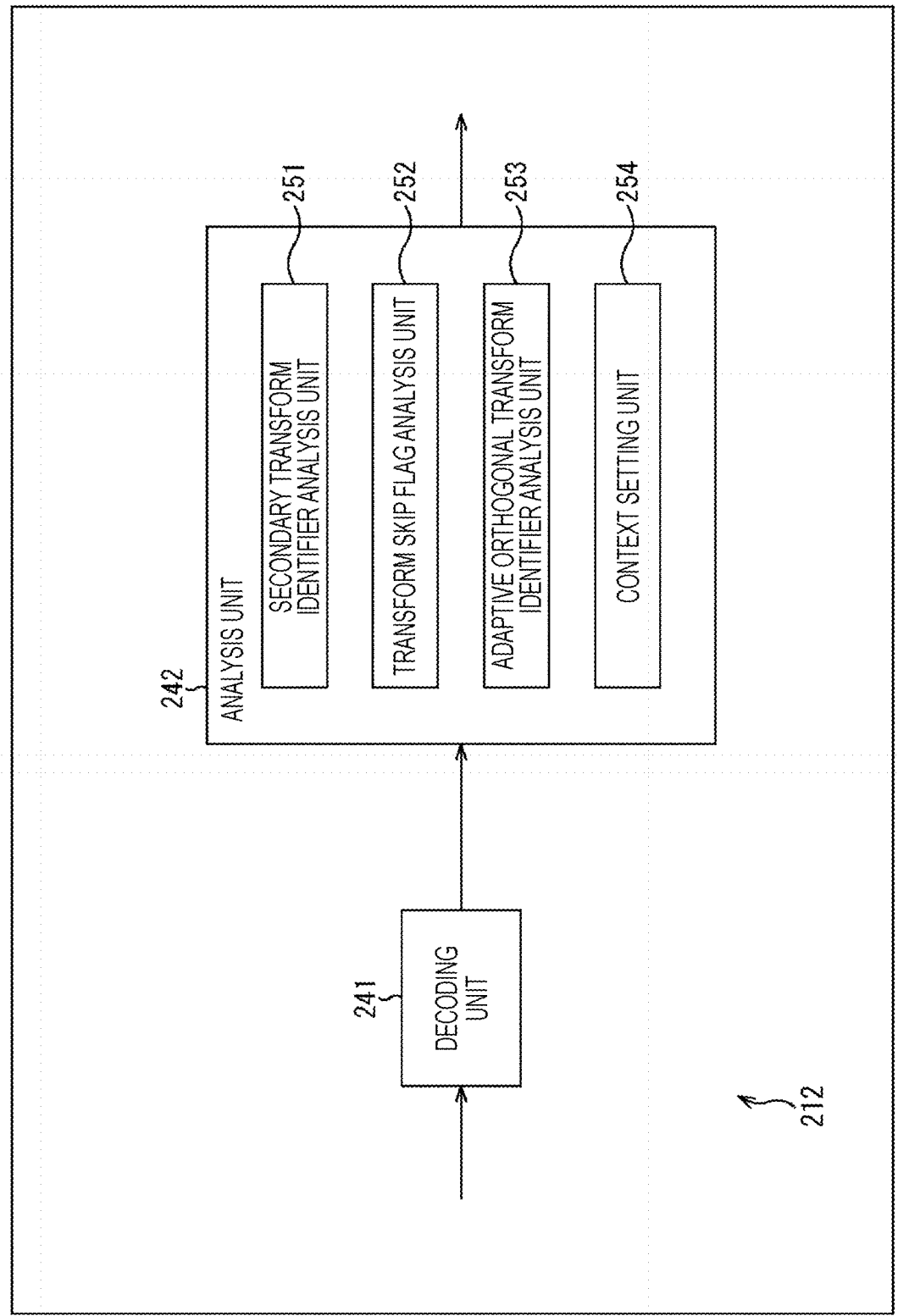
FIG. 24 is a block diagram illustrating a main configuration example of a decoding unit.

FIG. 24 is a block diagram illustrating a main configuration example of the decoding unit 212. As illustrated in FIG. 24, the decoding unit 212 includes a decoding unit 241 and an analysis unit 242.

The decoding unit 241 performs processing related to decoding of the coded data (bitstream). For example, the decoding unit 241 acquires the bitstream supplied from the accumulation buffer 211. Furthermore, the decoding unit 241 performs variable length decoding on the syntax value of each syntax element from the bit string according to the definition of the syntax table. The decoding unit 241 supplies the decoding result to the analysis unit 242.

The analysis unit 242 performs processing related to parameter analysis. For example, the analysis unit 242 acquires the decoding result supplied from the decoding unit 241. Furthermore, the analysis unit 242 parses (analyzes and acquires), for example, information such as the header information Hinfo, the prediction mode information Pinfo, the transform information Tinfo, the residual information Rinfo, and the filter information Finfo, from the decoding result.

Furthermore, the analysis unit 242 derives the quantized transform coefficient level "level" of each coefficient position in each transform block with reference to the residual information Rinfo and supplies the quantization transform coefficient level "level" to the inverse quantization unit 213.

The analysis unit 242 includes a secondary transform identifier analysis unit 251, a transform skip flag analysis unit 252, an adaptive orthogonal transform identifier analysis unit 253, and a context setting unit 254.

The secondary transform identifier analysis unit 251 performs processing related to analysis of the secondary transform identifier st_idx. For example, the secondary transform identifier analysis unit 251 parses the signaled secondary transform identifier from the decoding result supplied from the decoding unit 241. At that time, the secondary transform identifier analysis unit 251 applies the various methods described in <2-1. Signaling of secondary transform identifier>.

For example, the secondary transform identifier analysis unit 251 parses the secondary transform identifier stored in the CU header (that is, signaled before each TU). Therefore, as described above, it is possible to suppress an increase in delay and memory use amount in the decoding processing, and it is possible to suppress an increase in load of the decoding processing.

Furthermore, the secondary transform identifier analysis unit 251 can parse the secondary transform identifier regardless of the number of nonzero transform coefficients in the CU. Thus, the complicated counting of the nonzero transform coefficients can be omitted, and an increase in load of the decoding processing can be suppressed.

Moreover, the secondary transform identifier analysis unit 251 can parse the secondary transform identifier signaled only in a case where the residual PCM coding mode is not applied. That is, for example, in a case where bdpcm_flag=1, the secondary transform identifier analysis unit 251 determines that secondary transform is not performed on the basis of that fact. Thus, the secondary transform identifier can be more easily analyzed, and an increase in load of the decoding processing can be suppressed.

The secondary transform identifier st_idx parsed by the secondary transform identifier analysis unit 251 as described above is supplied to the inverse quantization unit 213 and the inverse orthogonal transform unit 214 as Tinfo.

The transform skip flag analysis unit 252 performs processing related to analysis of the transform skip flag transform_skip_flag. For example, the transform skip flag analysis unit 252 parses the transform skip flag regarding the processing target TU as the encoding parameter. At that time, the transform skip flag analysis unit 252 can apply the methods described in <2-1. Signaling of secondary transform identifier>.

For example, the transform skip flag analysis unit 252 parses the transform skip flag on the basis of whether or not to perform secondary transform. For example, in a case where the secondary transform is performed, the transform skip flag analysis unit 252 determines that the transform skip is not performed. Thus, the transform skip flag can be easily analyzed according to the secondary transform identifier. Thus, an increase in load of the decoding processing can be suppressed.

The transform skip flag transform_skip_flag parsed by the transform skip flag analysis unit 252 as described above is supplied to the inverse quantization unit 213 and the inverse orthogonal transform unit 214 as Tinfo.

The adaptive orthogonal transform identifier analysis unit 253 performs processing related to analysis of the adaptive orthogonal transform identifier tu_mts_idx. For example, the adaptive orthogonal transform identifier analysis unit 253 parses the adaptive orthogonal transform identifier regarding the processing target TU as the encoding parameter. At that time, the adaptive orthogonal transform identifier analysis unit 253 can apply the methods described in <2-1. Signaling of secondary transform identifier>.

For example, the adaptive orthogonal transform identifier analysis unit 253 parses the adaptive orthogonal transform identifier on the basis of whether or not to perform secondary transform. For example, in a case where the secondary transform is performed, the adaptive orthogonal transform identifier analysis unit 253 determines that the adaptive orthogonal transform is not applied. Thus, the adaptive orthogonal transform identifier can be easily analyzed according to the secondary transform identifier. Thus, an increase in load of the decoding processing can be suppressed.

The adaptive orthogonal transform identifier tu_mts_idx set by the adaptive orthogonal transform identifier analysis unit 253 as described above is supplied to the inverse quantization unit 213 and the inverse orthogonal transform unit 214 as Tinfo.

The context setting unit 254 performs processing related to context setting. For example, the context setting unit 254 derives the context initial value (offset) ctxInc used for setting the secondary transform identifier for the processing target CU. At that time, the context setting unit 254 can apply the methods described in <2-1. Signaling of secondary transform identifier>.

For example, the context setting unit 254 may derive the context ctxInc on the basis of only the tree type (treeType) without depending on the adaptive orthogonal transform identifier tu_mts_idx. Thus, it is possible to derive the context index of the first bin of the secondary transform identifier st_idx without requiring complicated processing (more easily). Thus, an increase in load of the decoding processing can be suppressed.

Note that the analysis unit 242 can also parse other encoding parameters. Furthermore, the analysis unit 242 can also perform arbitrary processing other than analysis of encoding parameters. Description thereof will be omitted.

<Inverse Orthogonal Transform Unit>

Figure 25:
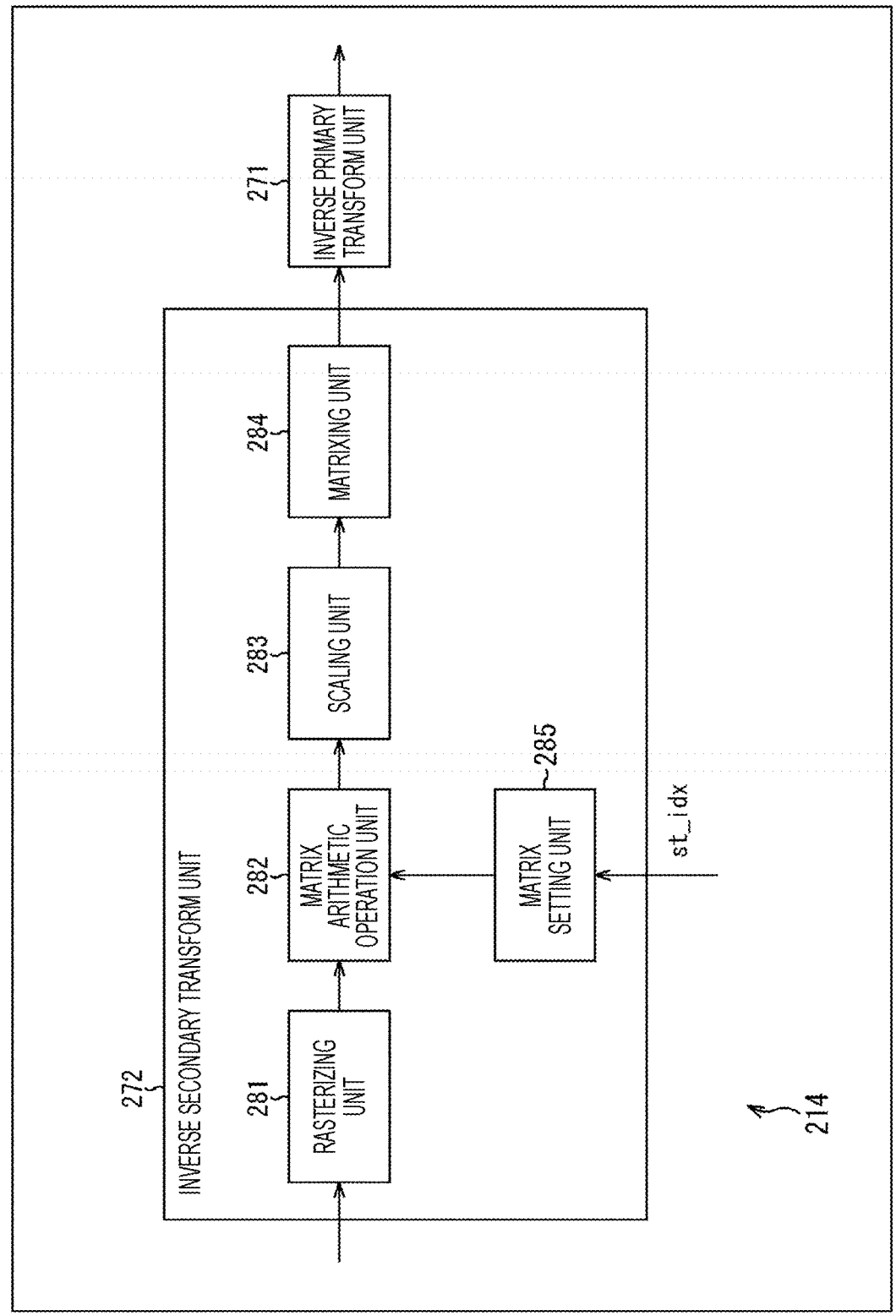
FIG. 25 is a block diagram illustrating a main configuration example of an inverse orthogonal transform unit.

FIG. 25 is a block diagram illustrating a main configuration example of the inverse orthogonal transform unit 214 of FIG. 23. As illustrated in FIG. 25, the inverse orthogonal transform unit 214 includes an inverse secondary transform unit 271 and an inverse primary transform unit 272.

The inverse secondary transform unit 271 performs processing related to inverse secondary transform that is inverse processing of the secondary transform. For example, the inverse secondary transform unit 271 acquires the transform coefficient Coeff_IQ supplied from the inverse quantization unit 213. Furthermore, the inverse secondary transform unit 271 performs predetermined matrix arithmetic operation or the like on the transform coefficient Coeff_IQ to derive the transform coefficient Coeff_IS (also referred to as a primary transform coefficient) after inverse secondary transform. That is, the inverse secondary transform unit 271 performs inverse secondary transform on the transform coefficient Coeff_IQ.

Note that the inverse secondary transform unit 271 performs the inverse secondary transform on the basis of the encoding parameters (encoding parameters signaled in bitstream and parsed by the decoding unit 212) such as Tinfo supplied from the decoding unit 212. That is, the inverse secondary transform unit 271 performs inverse secondary transform under the control of the decoding unit 212. The inverse secondary transform unit 271 supplies the primary transform coefficient Coeff_IS derived in this manner to the inverse primary transform unit 272.

Note that the inverse secondary transform unit 271 can skip (omit) the inverse secondary transform under the control of the decoding unit 212 (according to the encoding parameter supplied from the decoding unit 212). In that case, the inverse secondary transform unit 271 supplies the transform coefficient Coeff_IQ to the inverse primary transform unit 272 as the primary transform coefficient Coeff_IS.

The inverse primary transform unit 272 performs processing related to inverse primary transform that is inverse processing of the primary transform. For example, the inverse primary transform unit 272 acquires the primary transform coefficient Coeff_IS supplied from the inverse secondary transform unit 271. Furthermore, the inverse primary transform unit 272 performs predetermined matrix arithmetic operation or the like on the primary transform coefficient Coeff_IS and derives the prediction residual D'.

Note that the inverse primary transform unit 272 performs the inverse primary transform on the basis of the encoding parameters (encoding parameters signaled in bitstream and parsed by the decoding unit 212) such as Tinfo supplied from the decoding unit 212. That is, the inverse primary transform unit 272 performs inverse primary transform under the control of the decoding unit 212. The inverse primary transform unit 272 supplies the prediction residual D' derived in this manner to the calculation unit 215.

Note that the inverse primary transform unit 272 can skip (omit) the inverse primary transform under the control of the decoding unit 212 (according to the encoding parameter supplied from the decoding unit 212). In that case, the inverse primary transform unit 272 supplies the primary transform coefficient Coeff_IS as the prediction residual D' to the calculation unit 215.

The inverse secondary transform unit 271 includes a rasterizing unit 281, a matrix arithmetic operation unit 282, a scaling unit 283, a matrixing unit 284, and a matrix setting unit 285.

The rasterizing unit 281 transforms the transform coefficient Coeff_IQ supplied from the inverse quantization unit 213 into a one-dimensional vector (coefficient group of 1×16) for each subblock unit (4×4 subblocks). The rasterizing unit 281 supplies the obtained one-dimensional vector to the matrix arithmetic operation unit 282.

The matrix arithmetic operation unit 282 performs processing related to a matrix arithmetic operation. For example, the matrix arithmetic operation unit 282 acquires the one-dimensional vector supplied from the rasterizing unit 281. Furthermore, the matrix arithmetic operation unit 282 acquires an inverse secondary transform matrix IR (=RT) supplied from the matrix setting unit 285. The matrix arithmetic operation unit 282 performs a matrix arithmetic operation (matrix multiplication) using the one-dimensional vector and the inverse secondary transform matrix IR. The matrix arithmetic operation unit 282 supplies the matrix arithmetic operation result (coefficient data obtained by the matrix arithmetic operation) to the scaling unit 283.

The scaling unit 283 performs processing related to scaling of coefficient data. For example, the scaling unit 283 acquires coefficient data (matrix arithmetic operation result) supplied from the matrix arithmetic operation unit 282. The scaling unit 283 performs clip processing or the like on the coefficient data. The scaling unit 283 supplies the processed coefficient data to the matrixing unit 284.

The matrixing unit 284 performs processing related to matrixing of the one-dimensional vector. For example, the matrixing unit 284 acquires scaled 1×16 coefficient data (one-dimensional vector) supplied from the scaling unit 283. Furthermore, the matrixing unit 284 transforms the one-dimensional vector into a 4×4 matrix by a method corresponding to the method of the rasterizing unit 281. The matrixing unit 284 supplies the matrix (coefficient data group) obtained in this manner to the inverse primary transform unit 272 as the primary transform coefficient Coeff_IS.

The matrix setting unit 285 performs processing related to setting of the inverse secondary transform matrix IR used in the matrix arithmetic operation unit 282. For example, the matrix setting unit 285 acquires the secondary transform identifier st_idx supplied from the decoding unit 212. Furthermore, the matrix setting unit 285 sets the inverse secondary transform matrix IR on the basis of the secondary transform identifier st_idx. For example, the matrix setting unit 285 reads a candidate corresponding to the secondary transform identifier st_idx from candidates stored in an internal memory (not illustrated) (transposed matrix of the secondary transform matrix R corresponding to the secondary transform identifier st_idx), and supplies the candidate to the matrix arithmetic operation unit 282.

That is, the inverse secondary transform unit 271 performs inverse secondary transform according to the secondary transform identifier st_idx supplied from the decoding unit 212 (that is, under the control of the decoding unit 212).

<Flow of Image Decoding Processing>

Next, the flow of each processing executed by the image decoding device 200 having the above configuration will be described. First, an example of the flow of the image decoding processing will be described with reference to the flowchart of FIG. 26.

When the image decoding processing is started, the accumulation buffer 211 acquires the coded data (bitstream) supplied from the outside of the image decoding device 200 and holds (accumulates) it in step S201.

In step S202, the decoding unit 212 decodes the coded data (bitstream) to obtain the quantized transform coefficient level "level". Furthermore, the decoding unit 212 parses (analyzes and acquires) various encoding parameters from the coded data (bitstream) by this decoding.

In step S203, the inverse quantization unit 213 performs the inverse quantization, which is inverse processing of the quantization performed on the encoding side, with respect to the quantized transform coefficient level "level" obtained by the processing of step S202 to obtain the transform coefficient Coeff_IQ.

In step S204, the inverse orthogonal transform unit 214 performs the inverse orthogonal transform processing, which is the inverse processing of the orthogonal transform processing performed on the encoding side, with respect to the transform coefficient Coeff_IQ obtained in step S203, and obtains the prediction residual D'.

In step S205, the prediction unit 219 executes the prediction processing using a prediction method specified on the encoding side on the basis of the information parsed in step S202, refers to the reference image stored in the frame memory 218, and the like, and generates the prediction image P.

In step S206, the calculation unit 215 adds the prediction residual D' obtained in step S204 and the prediction image P obtained in step S205 to derive the locally decoded image Rlocal.

In step S207, the in-loop filter unit 216 performs the in-loop filter processing on the locally decoded image Rlocal obtained by the processing of step S206.

In step S208, the rearrangement buffer 217 derives the decoded image R using the locally decoded image Rlocal that has been subjected to the filter processing and obtained by the processing of step S207, and rearranges the decoded image R group from the decoding order to the reproduction order. The decoded image R group rearranged in the reproduction order is output as a moving image to the outside of the image decoding device 200.

Furthermore, in step S209, the frame memory 218 stores at least one of the locally decoded image Rlocal obtained by the processing of step S206 and the locally decoded image Rlocal after the filter processing obtained by the processing of step S207.

When the processing of step S209 ends, the image decoding processing ends.

<Flow of the Decoding Processing>

An example of the flow of the decoding processing executed in step S202 of FIG. 26 will be described with reference to the flowchart of FIG. 27. The decoding unit 212 executes this decoding processing by applying the various methods described in <2-1. Signaling of secondary transform identifier>.

When the decoding processing is started, the decoding unit 241 decodes the coded data (bitstream) of the accumulation buffer 211 in step S231.

In step S232, the secondary transform identifier analysis unit 251 of the analysis unit 242 analyzes the secondary transform identifier (signaled before the TU) of the CU header from the decoding result.

Thus, the secondary transform identifier can be obtained before all TUs in the CU are decoded. That is, inverse quantization and inverse transform processing of each TU can be started before all the TUs in the CU are decoded. That is, the period of buffering of the information necessary for starting the inverse quantization and the inverse transform processing of the transform block can be made shorter than the case of signaling in the footer of the CU. Therefore, it is possible to suppress an increase in delay and memory use amount. That is, an increase in load of decoding can be suppressed.

Note that the secondary transform identifier may be set regardless of the number of nonzero transform coefficients in the CU. In that case, the secondary transform identifier analysis unit 251 can analyze the secondary transform identifier regardless of the number of nonzero transform coefficients in the CU. Thus, the complicated counting of the nonzero transform coefficients can be omitted, and an increase in load of the decoding processing can be suppressed.

Moreover, it may be a secondary transform identifier signaled only in a case where the residual PCM coding mode is not applied. In that case, the secondary transform identifier analysis unit 251 can analyze the secondary transform identifier on the basis of whether or not the residual PCM coding mode is applied. For example, in a case where the residual PCM coding mode is applied, the secondary transform identifier analysis unit 251 can determine that the secondary transform identifier is not signaled (that is, the secondary transform is skipped). Thus, the secondary transform identifier can be easily analyzed, and an increase in load of the decoding processing can be suppressed.

In step S233, the transform skip flag analysis unit 252 analyzes the transform skip flag. This transform skip flag may be set on the basis of the secondary transform identifier. In that case, the transform skip flag analysis unit 252 can analyze the transform skip flag on the basis of whether or not to perform secondary transform. For example, in a case where secondary transform is performed, the transform skip flag analysis unit 252 can determine that the transform skip flag is not signaled (that is, the transform skip is not performed). Thus, the transform skip flag can be easily analyzed, and an increase in load of the decoding processing can be suppressed.

In step S234, the adaptive orthogonal transform identifier analysis unit 253 analyzes the adaptive orthogonal transform identifier. This adaptive orthogonal transform identifier may be set on the basis of the secondary transform identifier. In that case, the adaptive orthogonal transform identifier analysis unit 253 can analyze the adaptive orthogonal transform identifier on the basis of whether or not to perform secondary transform. For example, in a case where secondary transform is performed, the adaptive orthogonal transform identifier analysis unit 253 can determine that the adaptive orthogonal transform identifier is not signaled (that is, the adaptive orthogonal transform is not performed). Thus, the adaptive orthogonal transform identifier can be easily analyzed, and an increase in load of the decoding processing can be suppressed.

In step S235, the context setting unit 254 sets the context without using the adaptive orthogonal transform identifier. That is, the context setting unit 254 derives the context ctxInc on the basis of only the tree type (treeType) without depending on the adaptive orthogonal transform identifier tu_mts_idx. Thus, it is possible to derive the context index of the first bin of the secondary transform identifier st_idx without requiring complicated processing (more easily). Thus, an increase in load of the decoding processing can be suppressed.

Figure 26:
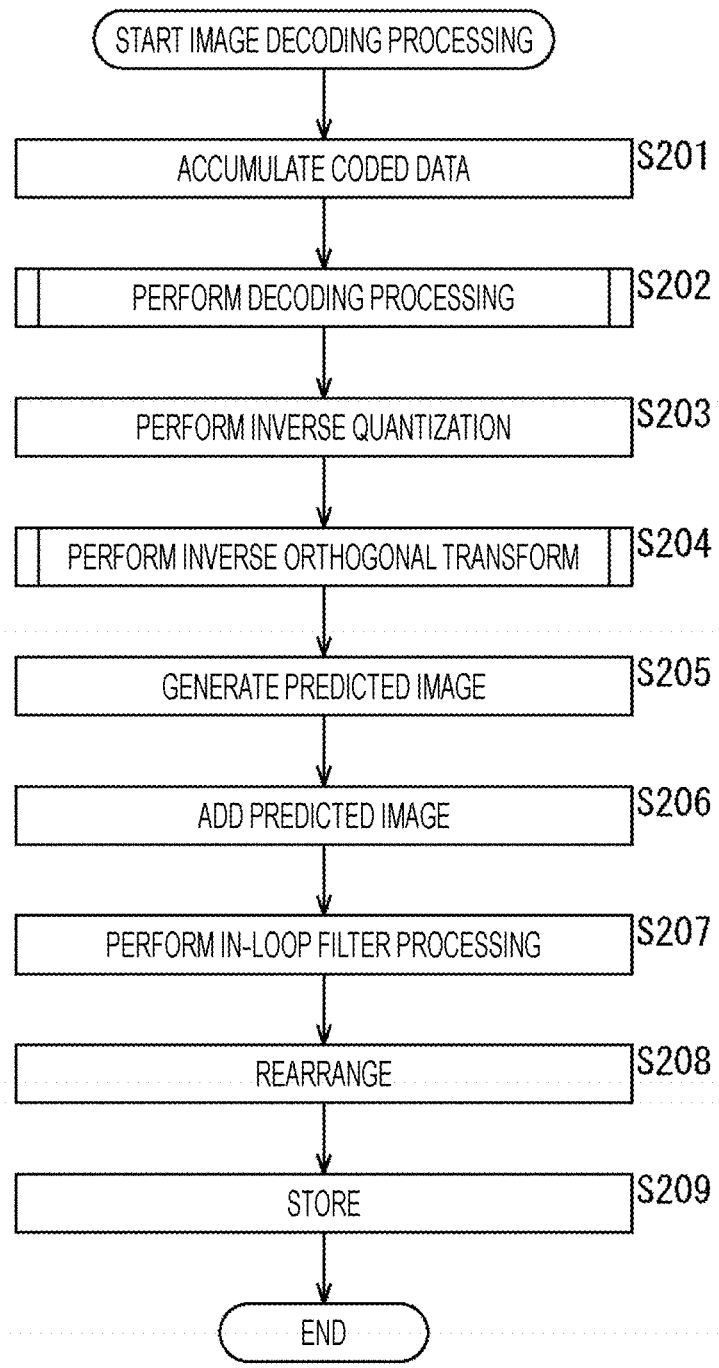
FIG. 26 is a flowchart illustrating an example of a flow of image decoding processing.
Figure 27:
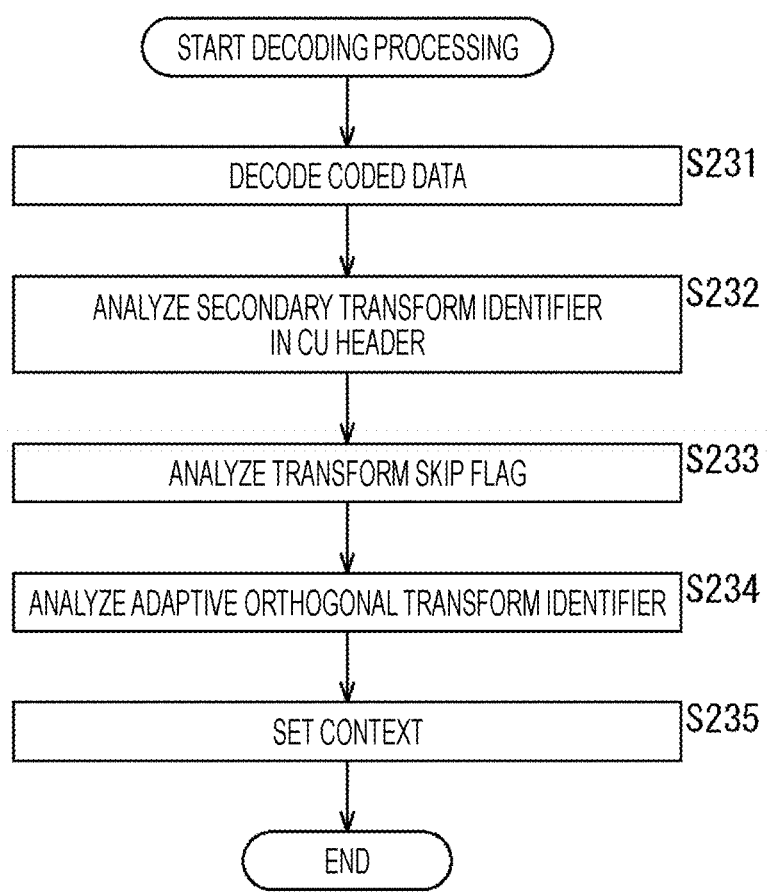
FIG. 27 is a flowchart illustrating an example of a flow of decoding processing.

When the processing in step S235 ends, the decoding processing ends, and the processing returns to FIG. 26.

Note that, in step S233, the transform skip flag analysis unit 252 may analyze the transform skip flag without using the secondary transform identifier. Furthermore, in step S234, the adaptive orthogonal transform identifier analysis unit 253 may analyze the adaptive orthogonal transform identifier without using the secondary transform identifier. Moreover, in step S235, the context setting unit 254 may set the context on the basis of the adaptive orthogonal transform identifier and the tree type. Furthermore, in this decoding processing, a step of analyzing another arbitrary encoding parameter may be added.

<Flow of Inverse Orthogonal Transform Processing>

Figure 28:
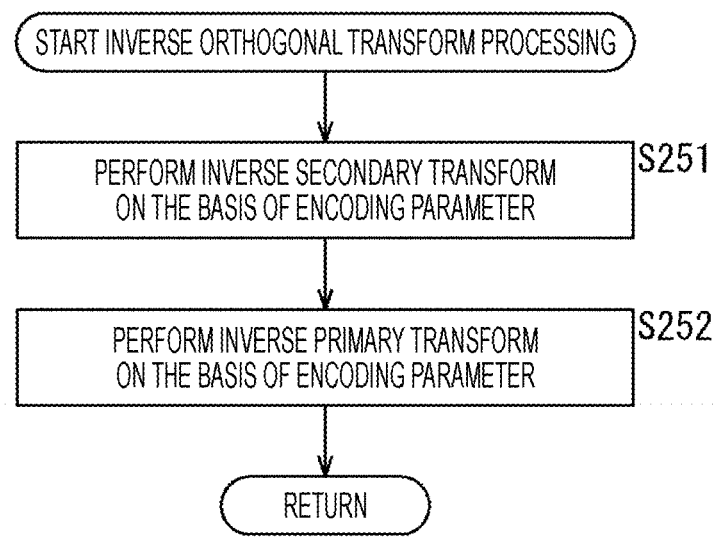
FIG. 28 is a flowchart illustrating an example of a flow of inverse orthogonal transform processing.

An example of the flow of the inverse orthogonal transform processing executed in step S204 of FIG. 26 will be described with reference to the flowchart of FIG. 28.

When the inverse orthogonal transform processing is started, in step S251, the inverse secondary transform unit 271 of the inverse orthogonal transform unit 214 performs inverse secondary transform on the basis of the encoding parameter decoded in the processing in step S202 in FIG. 26. For example, the inverse secondary transform unit 271 performs inverse secondary transform using various encoding parameters analyzed as described with reference to the flowchart of FIG. 27. Note that, in a case where the skip of the inverse secondary transform is specified by the secondary transform identifier or the like, the inverse secondary transform unit 271 skips the inverse secondary transform.

In step S252, the inverse primary transform unit 272 performs inverse primary transform on the basis of the encoding parameter decoded in the processing in step S202 in FIG. 26. For example, the inverse primary transform unit 272 performs inverse primary transform by a method specified by the encoding parameter. Note that, in a case where skip of inverse primary transform is specified by the encoding parameter, the inverse primary transform unit 272 skips the inverse primary transform.

When the processing in step S252 ends, the inverse orthogonal transform processing ends, and the processing returns to FIG. 26.

3. Second Embodiment

<3-1. Signaling of Secondary Transform Identifier>
<Signaling in TU Footer>

The secondary transform identifier st_idx is signaled in the TU footer. That is, the secondary transform identifier is stored in each TU and signaled for each TU. For example, at the time of encoding, the secondary transform identifier is set so as to be stored in the TU footer. In other words, the secondary transform identifier for each TU is set to be signaled after transform coefficient in each TU. Furthermore, for example, at the time of decoding, the secondary transform identifier stored in the TU footer is analyzed. In other words, the secondary transform identifier for each TU signaled after transform coefficient in each TU is analyzed.

Figure 29:
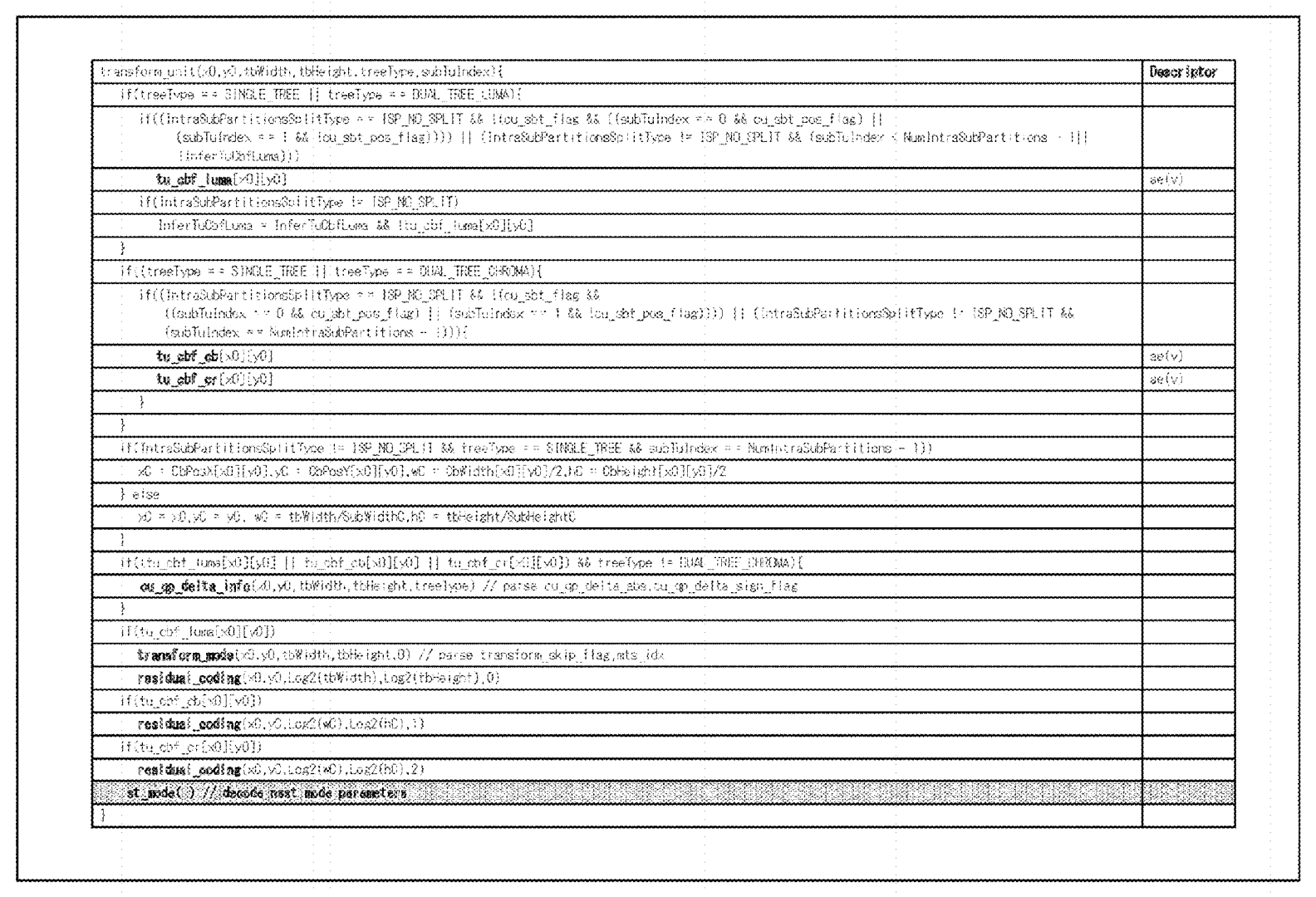

An example of syntax regarding a transform unit (transform unit) in that case is illustrated in FIG. 29. In the case of the example of FIG. 29, st_mode (that is, st_idx) is signaled in the second row (gray row) from the bottom. That is, in this case, the secondary transform identifier is set for each TU, and each secondary transform identifier is signaled after the transform coefficient (residual_coding) of the TU to which it corresponds.

Thus, the secondary transform identifier can be decoded before all TUs in the CU are decoded. That is, when the secondary transform identifier corresponding to a certain TU is decoded, inverse quantization and inverse transform processing of the TU can be started. Therefore, inverse quantization and inverse transform processing of each TU can be started before all the TUs in the CU are decoded.

Therefore, the period of buffering of the information necessary for starting the inverse quantization and the inverse transform processing of each TU can be made shorter than the case of signaling in the footer of the CU. Therefore, it is possible to suppress an increase in delay and memory use amount. That is, an increase in load of decoding can be suppressed.

Note that when the secondary transform identifier is signaled for each TU, the counting of the nonzero transform coefficient is closed to the processing target TU. That is, since it is only required to count the nonzero transform coefficient in the TU, the counting processing of the nonzero transform coefficient at the time of encoding or decoding can be simplified. Therefore, an increase in load of the encoding processing and the decoding processing can be suppressed.

<Signaling Control of Secondary Transform Identifier>

Furthermore, in this case, since the secondary transform identifier is signaled for each TU, whether or not to signal the secondary transform identifier may be performed on the basis of the transform block size (transform block size in horizontal direction (tbWidth) and transform block size in vertical direction (tbHeight)). Thus, it is possible to control whether or not to signal the secondary transform identifier for each TU.

An example of syntax regarding st_mode in that case is illustrated in FIG. 30. In this case, as illustrated in the second row (gray row) from the top, in order to set stAllowed to be true, a smaller one of the transform block size in the horizontal direction (tbWidth) and the transform block size in the vertical direction (tbHeight) needs to be equal to or larger than a predetermined threshold value (minstSize). That is, the secondary transform identifier is not signaled for a transform block having a transform block size smaller than the threshold value. As described above, instead of setting the secondary transform identifier on the basis of the encoded block size, the secondary transform identifier may be set on the basis of the transform block size.

<Separation of Luminance and Chrominance>

The TU includes a luminance (Y) transform block (TB) and a chrominance (Cb, Cr) transform block. Therefore, the secondary transform identifier for luminance and the secondary transform identifier for chrominance may be signaled separately. That is, in the footer of each TU, the secondary transform identifier corresponding to the luminance TB and the secondary transform identifier corresponding to the chrominance TB included in the TU may be signaled.

For example, at the time of encoding, in each TU, the secondary transform identifier corresponding to the luminance TB and the secondary transform identifier corresponding to the chrominance TB included in the TU are set so as to be stored in the footer (so as to be signaled after the transform coefficient). Furthermore, for example, at the time of decoding, the secondary transform identifier corresponding to the luminance TB and the secondary transform identifier corresponding to the chrominance TB included in the TU stored in the TU footer (signaled after the transform coefficient) are analyzed.

Also in this case, the period of buffering of the information necessary for starting the inverse quantization and the inverse transform processing of each TU can be made shorter than the case of signaling in the footer of the CU. Therefore, it is possible to suppress an increase in delay and memory use amount. That is, an increase in load of decoding can be suppressed.

<3-2. Encoding Side>
<Configuration>

Next, the encoding side will be described. The configuration of the encoding side in this case is similar to the case of the first embodiment. That is, the image encoding device 100 in this case has a configuration similar to the configuration described with reference to FIG. 17. Furthermore, the control unit 101 in this case has a configuration similar to the configuration described with reference to FIG. 18. Moreover, the orthogonal transform unit 113 in this case has a configuration similar to the configuration described with reference to FIG. 19.

<Flow of Encoding Parameter Setting Processing>

Furthermore, the image encoding device 100 in this case performs processing basically similar to the case of the first embodiment. That is, the image encoding processing executed by the image encoding device 100 in this case is performed by a flow similar to the case described with reference to the flowchart of FIG. 20. Furthermore, the orthogonal transform processing executed by the orthogonal transform unit 113 in this case is performed by a flow similar to the case described with reference to the flowchart of FIG. 22.

Figure 31:
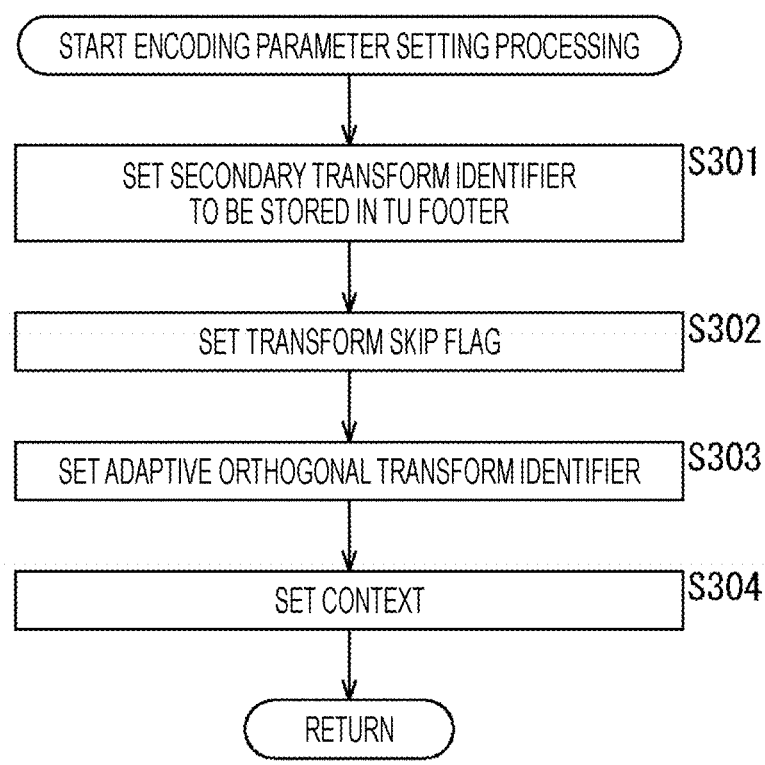
FIG. 31 is a flowchart illustrating an example of a flow of encoding parameter setting processing.

An example of the flow of the encoding parameter setting processing executed by the control unit 101 in this case in step S103 of FIG. 20 will be described with reference to the flowchart of FIG. 31. In this case, the control unit 101 executes this encoding parameter setting processing by applying the various methods described in <3-1. Signaling of secondary transform identifier>.

When the encoding parameter setting processing is started, the secondary transform identifier setting unit 151 of the control unit 101 sets the secondary transform identifier st_idx to be stored in the TU footer in step S301. That is, the secondary transform identifier setting unit 151 sets the secondary transform identifier to be signaled after the transform coefficient of the TU for each TU. Therefore, as described above, it is possible to suppress an increase in delay and memory use amount in the decoding processing, and it is possible to suppress an increase in load of the decoding processing.

Note that when the secondary transform identifier is signaled for each TU, the counting of the nonzero transform coefficient is closed to the processing target TU. That is, since it is only required to count the nonzero transform coefficient in the TU, the counting processing of the nonzero transform coefficient at the time of encoding or decoding can be simplified. Thus, an increase in load of the encoding processing can be suppressed.

Furthermore, the secondary transform identifier setting unit 151 may perform whether or not to signal the secondary transform identifier on the basis of the transform block size (the transform block size in horizontal direction (tbWidth) and the transform block size in vertical direction (tbHeight)). Thus, it is possible to control whether or not to signal the secondary transform identifier for each TU.

Moreover, the secondary transform identifier setting unit 151 may set, in each TU, the secondary transform identifier corresponding to the luminance TB and the secondary transform identifier corresponding to the chrominance TB included in the TU so as to be stored in the footer (so as to be signaled after the transform coefficient).

In step S302, the transform skip flag setting unit 152 sets the transform skip flag. In step S303, the adaptive orthogonal transform identifier setting unit 153 step S304, the context setting unit 154 sets the context. When the processing of step S304 ends, the encoding parameter setting processing ends, and the processing returns to FIG. 20.

Note that, in this encoding parameter setting processing, a step of generating another arbitrary encoding parameter may be added.

<3-3. Decoding Side>
<Configuration>

Next, the decoding side will be described. The configuration of the decoding side in this case is similar to the case of the first embodiment. That is, the image decoding device 200 in this case has a configuration similar to the configuration described with reference to FIG. 23. Furthermore, the decoding unit 212 in this case has a configuration similar to the configuration described with reference to FIG. 24. Moreover, the inverse orthogonal transform unit 214 in this case has a configuration similar to the configuration described with reference to FIG. 25.

<Flow of the Decoding Processing>

Furthermore, the image decoding device 200 in this case performs processing basically similar to the case of the first embodiment. That is, the image decoding processing executed by the image decoding device 200 in this case is performed by a flow similar to the case described with reference to the flowchart of FIG. 26. Furthermore, the inverse orthogonal transform processing executed by the inverse orthogonal transform unit 214 in this case is performed by a flow similar to the case described with reference to the flowchart of FIG. 28.

Figure 32:
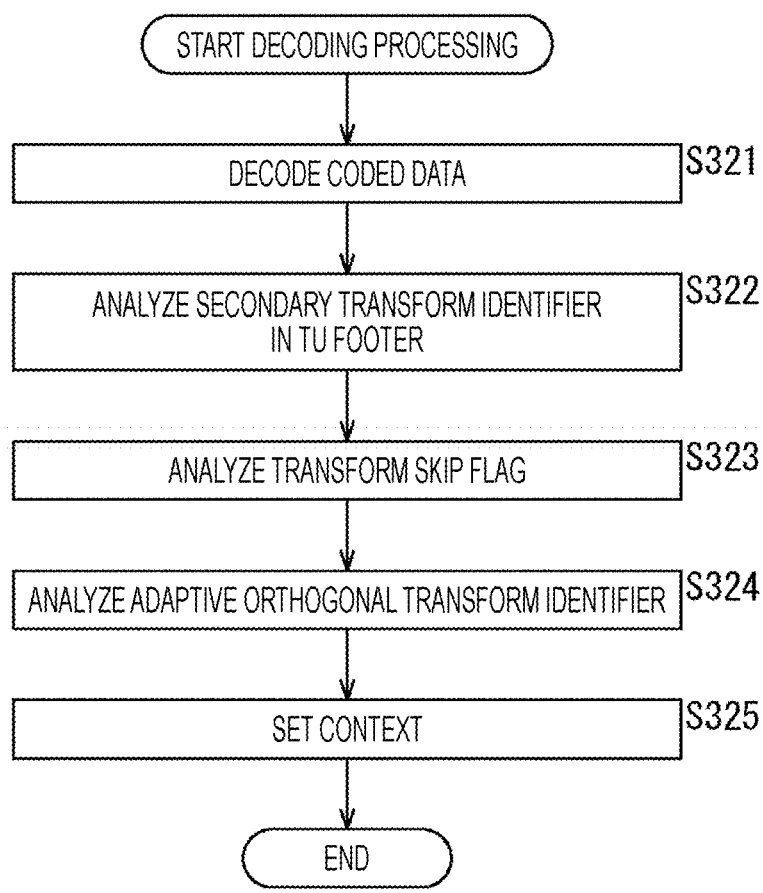
FIG. 32 is a flowchart illustrating an example of a flow of decoding processing.

An example of the flow of the decoding processing executed by the decoding unit 212 in this case in step S202 of FIG. 26 will be described with reference to the flowchart of FIG. 32. In this case, the decoding unit 212 executes this decoding processing by applying the various methods described in <3-1. Signaling of secondary transform identifier>.

When the decoding processing is started, the decoding unit 241 decodes the coded data (bitstream) of the accumulation buffer 211 in step S321.

In step S322, the secondary transform identifier analysis unit 251 of the analysis unit 242 analyzes the secondary transform identifier (signaled after the transform coefficient of the TU for each TU) of the TU footer from the decoding result.

Thus, the secondary transform identifier can be decoded before all TUs in the CU are decoded. That is, when the secondary transform identifier corresponding to a certain TU is decoded, inverse quantization and inverse transform processing of the TU can be started. Therefore, inverse quantization and inverse transform processing of each TU can be started before all the TUs in the CU are decoded.

Therefore, the period of buffering of the information necessary for starting the inverse quantization and the inverse transform processing of each TU can be made shorter than the case of signaling in the footer of the CU. Therefore, it is possible to suppress an increase in delay and memory use amount. That is, an increase in load of decoding can be suppressed.

Note that when the secondary transform identifier is signaled for each TU, the counting of the nonzero transform coefficient is closed to the processing target TU. That is, since it is only required to count the nonzero transform coefficient in the TU, the counting processing of the nonzero transform coefficient at the time of decoding can be simplified. Thus, an increase in load of the decoding processing can be suppressed.

Furthermore, the secondary transform identifier analysis unit 251 may perform determination as to whether or not the secondary transform identifier has been signaled on the basis of the transform block size (the transform block size in horizontal direction (tbWidth) and the transform block size in vertical direction (tbHeight)). Thus, it is possible to perform determination as to whether or not the secondary transform identifier has been signaled for each TU.

Moreover, the secondary transform identifier may include the secondary transform identifier for luminance and the secondary transform identifier for chrominance that are signaled separately. In that case, the secondary transform identifier analysis unit 251 analyzes the secondary transform identifier for luminance and the secondary transform identifier for chrominance (signaled after the transform coefficient of the TU for each TU) of the TU footer.

In step S323, the transform skip flag analysis unit 252 analyzes the transform skip flag. In step S324, the adaptive orthogonal transform identifier analysis unit 253 analyzes the adaptive orthogonal transform identifier. In step S325, the context setting unit 254 sets the context. When the processing in step S325 ends, the decoding processing ends, and the processing returns to FIG. 26.

Note that, in this decoding processing, a step of analyzing another arbitrary encoding parameter may be added.

4. Third Embodiment

<4-1. Signaling of Secondary Transform Identifier>
<Signaling in TU Header>

The secondary transform identifier st_idx is signaled in the TU header. That is, the secondary transform identifier is stored in each TU and signaled for each TU. For example, at the time of encoding, the secondary transform identifier is set so as to be stored in the TU header. In other words, the secondary transform identifier for each TU is set to be signaled before transform coefficient in each TU. Furthermore, for example, at the time of decoding, the secondary transform identifier stored in the TU header is analyzed. In other words, the secondary transform identifier for each TU signaled before transform coefficient in each TU is analyzed.

Figure 33:
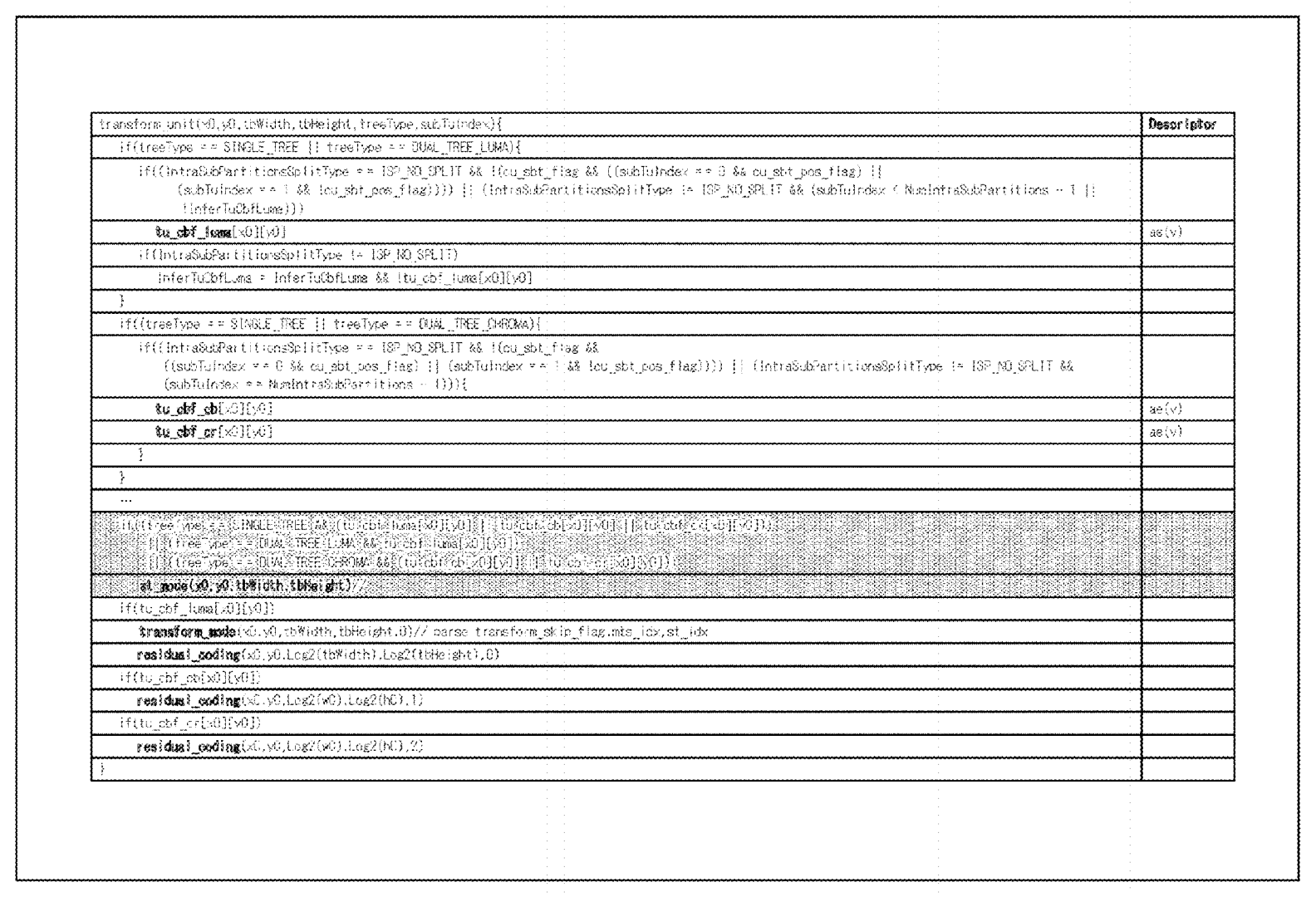

An example of syntax regarding a transform unit (transform_unit) in that case is illustrated in FIG. 33. In the case of the example of FIG. 33, st_mode (that is, st_idx) is signaled in the fifteenth and sixteenth rows (gray rows) from the top. That is, in this case, the secondary transform identifier is set for each TU, and each secondary transform identifier is signaled before the transform coefficient (residual_coding) of the TU to which it corresponds.

Thus, the secondary transform identifier can be decoded before all TUs in the CU are decoded. That is, when the secondary transform identifier corresponding to a certain TU is decoded, inverse quantization and inverse transform processing of the TU can be started. Therefore, inverse quantization and inverse transform processing of each TU can be started before all the TUs in the CU are decoded.

Therefore, the period of buffering of the information necessary for starting the inverse quantization and the inverse transform processing of each TU can be made shorter than the case of signaling in the footer of the CU. Therefore, it is possible to suppress an increase in delay and memory use amount. That is, an increase in load of decoding can be suppressed.

Note that when the secondary transform identifier is signaled for each TU, the counting of the nonzero transform coefficient is closed to the processing target TU. That is, since it is only required to count the nonzero transform coefficient in the TU, the counting processing of the nonzero transform coefficient at the time of encoding or decoding can be simplified. Therefore, an increase in load of the encoding processing and the decoding processing can be suppressed.

<Signaling Control of Secondary Transform Identifier>

Furthermore, similar to the case of the second embodiment, in this case, since the secondary transform identifier is signaled for each TU, whether or not to signal the secondary transform identifier may be performed on the basis of the transform block size (transform block size in horizontal direction (tbWidth) and transform block size in vertical direction (tbHeight)). Thus, it is possible to control whether or not to signal the secondary transform identifier for each TU.

An example of syntax regarding st_mode in that case is illustrated in FIG. 34. In this case, as illustrated in the second row (gray row) from the top, in order to set stAllowed to be true, a smaller one of the transform block size in the horizontal direction (tbWidth) and the transform block size in the vertical direction (tbHeight) needs to be equal to or larger than a predetermined threshold value (minstSize). That is, the secondary transform identifier is not signaled for a transform block having a transform block size smaller than the threshold value. As described above, instead of setting the secondary transform identifier on the basis of the encoded block size, the secondary transform identifier may be set on the basis of the transform block size.

<Omission of Counting of Nonzero Transform Coefficient>

Moreover, similar to the case of the first embodiment, in this case, a conditional expression referring to the number of nonzero transform coefficients may be deleted from a decoding/encoding condition of the secondary transform identifier. For example, the secondary transform identifier may be set regardless of the number of nonzero transform coefficients. Further, for example, the secondary transform identifier may be analyzed regardless of the number of nonzero transform coefficients.

Thus, when the secondary transform identifier is derived in the encoding processing, the complicated counting of the nonzero transform coefficients can be omitted, so that an increase in load of the encoding processing can be suppressed. Furthermore, when the secondary transform identifier is analyzed in the decoding processing, the complicated counting of the nonzero transform coefficients can be omitted, so that an increase in load of the decoding processing can be suppressed.

<Setting of Secondary Transform Identifier Based on Residual PCM Mode>

Furthermore, similar to the case of the first embodiment, in this case, the secondary transform identifier may be signaled only in a case where the residual PCM coding mode is not applied (that is, the secondary transform identifier may not be signaled in a case where the residual PCM coding mode is applied).

Thus, the secondary transform identifier can be easily set according to the residual PCM coding mode. Furthermore, at the time of decoding, the secondary transform identifier can be easily analyzed according to the residual PCM coding mode. Thus, an increase in load of the decoding processing can be suppressed.

In the case of the example of FIG. 34, as illustrated in the second row (gray row) from the top, bdpcm_flag=0 needs to be set in order for stAllowed to be true. That is, in a case where the residual PCM coding mode is applied, the secondary transform identifier is not signaled. As described above, instead of setting the secondary transform identifier on the basis of the number of nonzero transform coefficients, the secondary transform identifier may be set on the basis of a flag indicating whether or not to apply the residual PCM coding mode.

Of course, the condition when this bdpcm_flag is not applied (bdpcm_flag==0) may be excluded from the determination as to whether or not to perform secondary transform (derivation of stAllowed).

<Derivation of Context>

Furthermore, similar to the case of the first embodiment, in this case, for example, the context initial value (offset) ctxInc may be derived on the basis of only the tree type (treeType) without depending on the adaptive orthogonal transform identifier tu_mts_idx (FIG. 16).

Thus, it is possible to derive the context index of the first bin of the secondary transform identifier st_idx without requiring complicated processing (more easily). Similarly, at the time of decoding, it is possible to derive the context index of the first bin of the secondary transform identifier st_idx more easily. Thus, an increase in load of the decoding processing can be suppressed.

<Separation of Luminance and Chrominance>

The TU includes a luminance (Y) transform block (TB) and a chrominance (Cb, Cr) transform block. Therefore, the secondary transform identifier for luminance and the secondary transform identifier for chrominance may be signaled separately. That is, in the header of each TU, the secondary transform identifier corresponding to the luminance TB and the secondary transform identifier corresponding to the chrominance TB included in the TU may be signaled.

For example, at the time of encoding, in each TU, the secondary transform identifier corresponding to the luminance TB and the secondary transform identifier corresponding to the chrominance TB included in the TU are set so as to be stored in the header (so as to be signaled before the transform coefficient). Furthermore, for example, at the time of decoding, the secondary transform identifier corresponding to the luminance TB and the secondary transform identifier corresponding to the chrominance TB included in the TU stored in the TU header (signaled before the transform coefficient) are analyzed.

Also in this case, the period of buffering of the information necessary for starting the inverse quantization and the inverse transform processing of each TU can be made shorter than the case of signaling in the footer of the CU. Therefore, it is possible to suppress an increase in delay and memory use amount. That is, an increase in load of decoding can be suppressed.

<4-2. Encoding Side>

<Configuration>

Next, the encoding side will be described. The configuration of the encoding side in this case is similar to the case of the first embodiment. That is, the image encoding device 100 in this case has a configuration similar to the configuration described with reference to FIG. 17. Furthermore, the control unit 101 in this case has a configuration similar to the configuration described with reference to FIG. 18. Moreover, the orthogonal transform unit 113 in this case has a configuration similar to the configuration described with reference to FIG. 19.

<Flow of Encoding Parameter Setting Processing>

Furthermore, the image encoding device 100 in this case performs processing basically similar to the case of the first embodiment. That is, the image encoding processing executed by the image encoding device 100 in this case is performed by a flow similar to the case described with reference to the flowchart of FIG. 20. Furthermore, the orthogonal transform processing executed by the orthogonal transform unit 113 in this case is performed by a flow similar to the case described with reference to the flowchart of FIG. 22.

Figure 35:
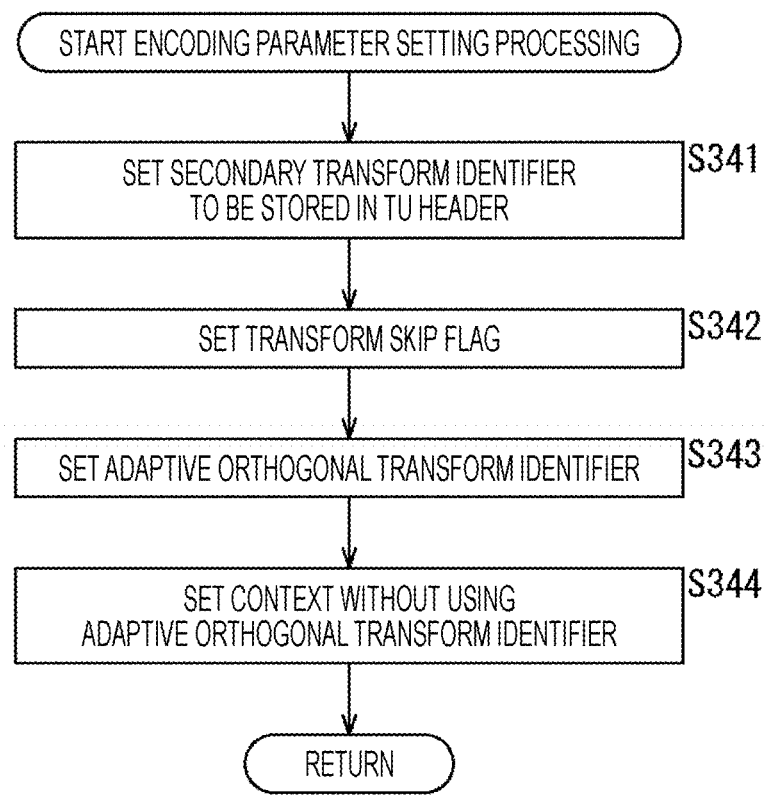
FIG. 35 is a flowchart illustrating an example of a flow of encoding parameter setting processing.

An example of the flow of the encoding parameter setting processing executed by the control unit 101 in this case in step S103 of FIG. 20 will be described with reference to the flowchart of FIG. 35. In this case, the control unit 101 executes this encoding parameter setting processing by applying the various methods described in <4-1. Signaling of secondary transform identifier>.

When the encoding parameter setting processing is started, the secondary transform identifier setting unit 151 of the control unit 101 sets the secondary transform identifier st_idx to be stored in the TU header in step S341. That is, the secondary transform identifier setting unit 151 sets the secondary transform identifier to be signaled before the transform coefficient of the TU for each TU. Therefore, as described above, it is possible to suppress an increase in delay and memory use amount in the decoding processing, and it is possible to suppress an increase in load of the decoding processing.

Note that when the secondary transform identifier is signaled for each TU, the counting of the nonzero transform coefficient is closed to the processing target TU. That is, since it is only required to count the nonzero transform coefficient in the TU, the counting processing of the nonzero transform coefficient at the time of encoding or decoding can be simplified. Thus, an increase in load of the encoding processing can be suppressed.

Furthermore, the secondary transform identifier setting unit 151 may perform whether or not to signal the secondary transform identifier on the basis of the transform block size (the transform block size in horizontal direction (tbWidth) and the transform block size in vertical direction (tbHeight)). Thus, it is possible to control whether or not to signal the secondary transform identifier for each TU.

Moreover, the secondary transform identifier setting unit 151 may set the secondary transform identifier regardless of the number of nonzero transform coefficients. Thus, the complicated counting of the nonzero transform coefficients can be omitted, and an increase in load of the encoding processing can be suppressed. Furthermore, in the decoding processing also, the complicated counting of the nonzero transform coefficients can be omitted, and an increase in load of the decoding processing can be suppressed.

Furthermore, the secondary transform identifier setting unit 151 may signal the secondary transform identifier only in a case where the residual PCM coding mode is not applied. Thus, at the time of decoding, the secondary transform identifier can be easily analyzed according to the residual PCM coding mode, and an increase in load of the decoding processing can be suppressed.

Moreover, the secondary transform identifier setting unit 151 may set, in each TU, the secondary transform identifier corresponding to the luminance TB and the secondary transform identifier corresponding to the chrominance TB included in the TU so as to be stored in the header (so as to be signaled before the transform coefficient).

In step S342, the transform skip flag setting unit 152 sets the transform skip flag. In step S343, the adaptive orthogonal transform identifier setting unit 153 sets the adaptive orthogonal transform identifier.

In step S344, the context setting unit 154 sets the context without using the adaptive orthogonal transform identifier. That is, the context setting unit 154 derives the context ctxInc on the basis of only the tree type (treeType) without depending on the adaptive orthogonal transform identifier tu_mts_idx. Thus, it is possible to derive the context index of the first bin of the secondary transform identifier st_idx without requiring complicated processing (more easily).

When the processing of step S344 ends, the encoding parameter setting processing ends, and the processing returns to FIG. 20.

Note that, in step S344, the context setting unit 154 may set the context on the basis of the adaptive orthogonal transform identifier and the tree type. Furthermore, in this encoding parameter setting processing, a step of generating another arbitrary encoding parameter may be added.

<4-3. Decoding Side>
<Configuration>

Next, the decoding side will be described. The configuration of the decoding side in this case is similar to the case of the first embodiment. That is, the image decoding device 200 in this case has a configuration similar to the configuration described with reference to FIG. 23. Furthermore, the decoding unit 212 in this case has a configuration similar to the configuration described with reference to FIG. 24. Moreover, the inverse orthogonal transform unit 214 in this case has a configuration similar to the configuration described with reference to FIG. 25.

<Flow of the Decoding Processing>

Furthermore, the image decoding device 200 in this case performs processing basically similar to the case of the first embodiment. That is, the image decoding processing executed by the image decoding device 200 in this case is performed by a flow similar to the case described with reference to the flowchart of FIG. 26. Furthermore, the inverse orthogonal transform processing executed by the inverse orthogonal transform unit 214 in this case is performed by a flow similar to the case described with reference to the flowchart of FIG. 28.

Figure 36:
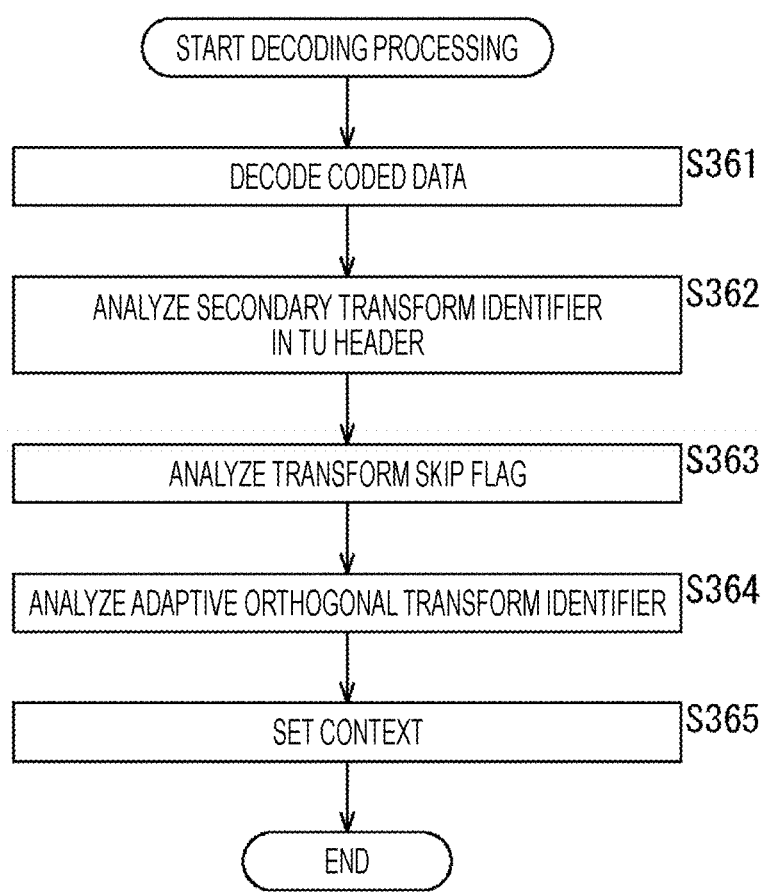
FIG. 36 is a flowchart illustrating an example of a flow of decoding processing.

An example of the flow of the decoding processing executed by the decoding unit 212 in this case in step S202 of FIG. 26 will be described with reference to the flowchart of FIG. 36. In this case, the decoding unit 212 executes this decoding processing by applying the various methods described in <4-1. Signaling of secondary transform identifier>.

When the decoding processing is started, the decoding unit 241 decodes the coded data (bitstream) of the accumulation buffer 211 in step S361.

In step S362, the secondary transform identifier analysis unit 251 of the analysis unit 242 analyzes the secondary transform identifier (signaled before the transform coefficient of the TU for each TU) of the TU header from the decoding result.

Thus, the secondary transform identifier can be decoded before all TUs in the CU are decoded. That is, when the secondary transform identifier corresponding to a certain TU is decoded, inverse quantization and inverse transform processing of the TU can be started. Therefore, inverse quantization and inverse transform processing of each TU can be started before all the TUs in the CU are decoded.

Therefore, the period of buffering of the information necessary for starting the inverse quantization and the inverse transform processing of each TU can be made shorter than the case of signaling in the footer of the CU. Therefore, it is possible to suppress an increase in delay and memory use amount. That is, an increase in load of decoding can be suppressed.

Note that when the secondary transform identifier is signaled for each TU, the counting of the nonzero transform coefficient is closed to the processing target TU. That is, since it is only required to count the nonzero transform coefficient in the TU, the counting processing of the nonzero transform coefficient at the time of decoding can be simplified. Thus, an increase in load of the decoding processing can be suppressed.

Furthermore, the secondary transform identifier analysis unit 251 may perform determination as to whether or not the secondary transform identifier has been signaled on the basis of the transform block size (the transform block size in horizontal direction (tbWidth) and the transform block size in vertical direction (tbHeight)). Thus, it is possible to perform determination as to whether or not the secondary transform identifier has been signaled for each TU.

Moreover, the secondary transform identifier may be set regardless of the number of nonzero transform coefficients. In that case, the secondary transform identifier analysis unit 251 can analyze the secondary transform identifier regardless of the number of nonzero transform coefficients. Thus, the complicated counting of the nonzero transform coefficients can be omitted, and an increase in load of the decoding processing can be suppressed.

Furthermore, it may be a secondary transform identifier signaled only in a case where the residual PCM coding mode is not applied. In that case, the secondary transform identifier analysis unit 251 can analyze the secondary transform identifier on the basis of whether or not the residual PCM coding mode is applied. For example, in a case where the residual PCM coding mode is applied, the secondary transform identifier analysis unit 251 can determine that the secondary transform identifier is not signaled (that is, the secondary transform is skipped). Thus, the secondary transform identifier can be easily analyzed, and an increase in load of the decoding processing can be suppressed.

Moreover, the secondary transform identifier may include the secondary transform identifier for luminance and the secondary transform identifier for chrominance that are signaled separately. In that case, the secondary transform identifier analysis unit 251 analyzes the secondary transform identifier for luminance and the secondary transform identifier for chrominance (signaled before the transform coefficient of the TU for each TU) of the TU header.

In step S363, the transform skip flag analysis unit 252 analyzes the transform skip flag. In step S364, the adaptive orthogonal transform identifier analysis unit 253 analyzes the adaptive orthogonal transform identifier.

In step S365, the context setting unit 254 sets the context without using the adaptive orthogonal transform identifier. That is, the context setting unit 254 derives the context ctxInc on the basis of only the tree type (treeType) without depending on the adaptive orthogonal transform identifier tu_mts_idx. Thus, it is possible to derive the context index of the first bin of the secondary transform identifier st_idx without requiring complicated processing (more easily). Thus, an increase in load of the decoding processing can be suppressed.

When the processing in step S365 ends, the decoding processing ends, and the processing returns to FIG. 26.

Note that, in step S365, the context setting unit 254 may set the context on the basis of the adaptive orthogonal transform identifier and the tree type. Furthermore, in this decoding processing, a step of analyzing another arbitrary encoding parameter may be added.

5. Fourth Embodiment

<5-1. Signaling of Secondary Transform Identifier>
<Signaling in TB Footer>

The secondary transform identifier st_idx is signaled in the TB footer. That is, the secondary transform identifier is stored in each TB and signaled for each TB. That is, in each of the luminance (Y) TB, the chrominance (Cr) TB, and the chrominance (Cb) TB, the secondary transform identifiers corresponding to the TBs are signaled.

For example, at the time of encoding, the secondary transform identifier is set so as to be stored in the TB footer. In other words, the secondary transform identifier for each TB is set to be signaled after transform coefficient in each TB. Furthermore, for example, at the time of decoding, the secondary transform identifier stored in the TB footer is analyzed. In other words, the secondary transform identifier for each TB signaled after transform coefficient in each TB is analyzed.

Figure 37:
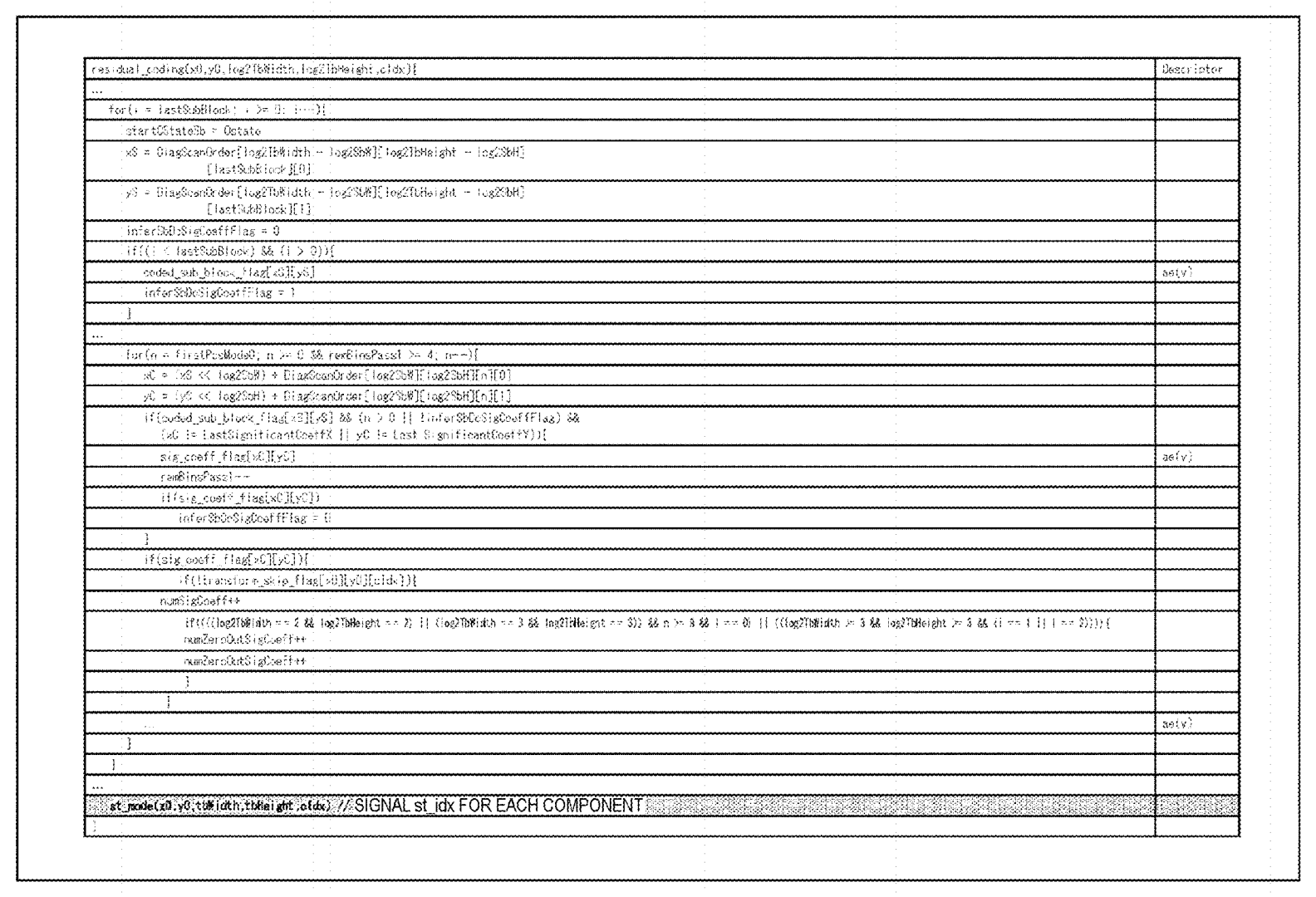

FIG. 37 illustrates an example of syntax regarding transform block (residual_coding) in that case. In the case of the example of FIG. 37, st_mode (that is, st_idx) is signaled in the second row (gray row) from the bottom. That is, in this case, the secondary transform identifier is set for each TB (for each cIdx for identifying a component). Furthermore, the secondary transform identifier is signaled after the transform coefficient of the TB to which it corresponds.

Thus, the secondary transform identifier can be decoded before all TUs in the CU are decoded. That is, when the secondary transform identifier corresponding to a certain TB is decoded, inverse quantization and inverse transform processing of the TB can be started. Therefore, inverse quantization and inverse transform processing of each TB can be started before all the TUs in the CU are decoded.

Therefore, the period of buffering of the information necessary for starting the inverse quantization and inverse transform processing of the transform block can be made shorter than the case of signaling in the footer of the CU. Therefore, it is possible to suppress an increase in delay and memory use amount. That is, an increase in load of decoding can be suppressed.

Note that when the secondary transform identifier is signaled for each TB, the counting of the nonzero transform coefficient is closed to the processing target TB. That is, since it is only required to count the nonzero transform coefficient in the TB, the counting processing of the nonzero transform coefficient at the time of encoding or decoding can be simplified. Therefore, an increase in load of the encoding processing and the decoding processing can be suppressed.

<Signaling Control of Secondary Transform Identifier>

Furthermore, in this case, since the secondary transform identifier is signaled for each TB, whether or not to signal the secondary transform identifier may be performed on the basis of the transform block size (transform block size in horizontal direction (tbWidth) and transform block size in vertical direction (tbHeight)). Thus, it is possible to control whether or not to signal the secondary transform identifier for each TB.

An example of syntax regarding st_mode in that case is illustrated in FIG. 38. In this case, as illustrated in the second row (gray row) from the top, in order to set stAllowed to be true, a smaller one of the transform block size in the horizontal direction (tbWidth) and the transform block size in the vertical direction (tbHeight) needs to be equal to or larger than a predetermined threshold value (minstSize). That is, the secondary transform identifier is not signaled for a transform block having a transform block size smaller than the threshold value. As described above, instead of setting the secondary transform identifier on the basis of the encoded block size, the secondary transform identifier may be set on the basis of the transform block size.

<Derivation of Context>

Furthermore, in this case, the context initial value (offset) ctxInc may be derived on the basis of the component (for example, on the basis of the value of the identifier cIdx for identifying the component).

For example, the context initial value (offset) ctxInc may be derived on the basis of whether the component is luminance (Y) or chrominance (Cb or Cr). Since the probability of application of the secondary transform is different between luminance and chrominance, the secondary transform identifier st_idx for each component can be encoded and decoded more efficiently in this manner.

Furthermore, the context initial value (offset) ctxInc may be derived on the basis of whether the component is luminance (Y), chrominance (Cb), or chrominance (Cr). In this way, since the context variable ctx can be set in more detail, the secondary transform identifier st_idx can be encoded and decoded more efficiently.

For example, in the case of A of FIG. 39, the context initial value (offset) ctxInc is set to 0 or 1 on the basis of whether the value of the identifier cIdx for identifying the component is luminance (Y) or chrominance (Cb or Cr). Furthermore, for example, in the case of B of FIG. 39, the value of the identifier cIdx for identifying the component is set to the context initial value (offset) ctxInc.

<5-2. Encoding Side>

<Configuration>

Next, the encoding side will be described. The configuration of the encoding side in this case is similar to the case of the first embodiment. That is, the image encoding device 100 in this case has a configuration similar to the configuration described with reference to FIG. 17. Furthermore, the control unit 101 in this case has a configuration similar to the configuration described with reference to FIG. 18. Moreover, the orthogonal transform unit 113 in this case has a configuration similar to the configuration described with reference to FIG. 19.

<Flow 1 of Encoding Parameter Setting Processing>

Furthermore, the image encoding device 100 in this case performs processing basically similar to the case of the first embodiment. That is, the image encoding processing executed by the image encoding device 100 in this case is performed by a flow similar to the case described with reference to the flowchart of FIG. 20. Furthermore, the orthogonal transform processing executed by the orthogonal transform unit 113 in this case is performed by a flow similar to the case described with reference to the flowchart of FIG. 22.

An example of the flow of the encoding parameter setting processing executed by the control unit 101 in this case in step S103 of FIG. 20 will be described with reference to the flowchart of FIG. 40. In this case, the control unit 101 executes this encoding parameter setting processing by applying the various methods described in <5-1. Signaling of secondary transform identifier>. Note that, in this example, the context initial value (offset) ctxInc is derived on the basis of whether the component is luminance (Y) or chrominance (Cb or Cr) (A of FIG. 39).

When the encoding parameter setting processing is started, the secondary transform identifier setting unit 151 of the control unit 101 sets the secondary transform identifier st_idx to be stored in the TB footer in step S401. That is, the secondary transform identifier setting unit 151 sets the secondary transform identifier to be signaled after the transform coefficient of the TB for each TB. Therefore, as described above, it is possible to suppress an increase in delay and memory use amount in the decoding processing, and it is possible to suppress an increase in load of the decoding processing.

Note that when the secondary transform identifier is signaled for each TB, the counting of the nonzero transform coefficient is closed to the processing target TB. That is, since it is only required to count the nonzero transform coefficient in the TB, the counting processing of the nonzero transform coefficient at the time of encoding or decoding can be simplified. Thus, an increase in load of the encoding processing can be suppressed.

Furthermore, the secondary transform identifier setting unit 151 may perform whether or not to signal the secondary transform identifier on the basis of the transform block size (the transform block size in horizontal direction (tbWidth) and the transform block size in vertical direction (tbHeight)). Thus, it is possible to control whether or not to signal the secondary transform identifier for each TB.

In step S402, the transform skip flag setting unit 152 sets the transform skip flag. In step S403, the adaptive orthogonal transform identifier setting unit 153 sets the adaptive orthogonal transform identifier.

In step S404, the context setting unit 154 refers to the identifier cIdx for identifying the component, and sets the context on the basis of whether the component is luminance (Y) or chrominance (Cb or Cr). When the processing of step S404 ends, the encoding parameter setting processing ends, and the processing returns to FIG. 20.

Note that, in this encoding parameter setting processing, a step of generating another arbitrary encoding parameter may be added.

<Flow 2 of Encoding Parameter Setting Processing>

Figure 41:
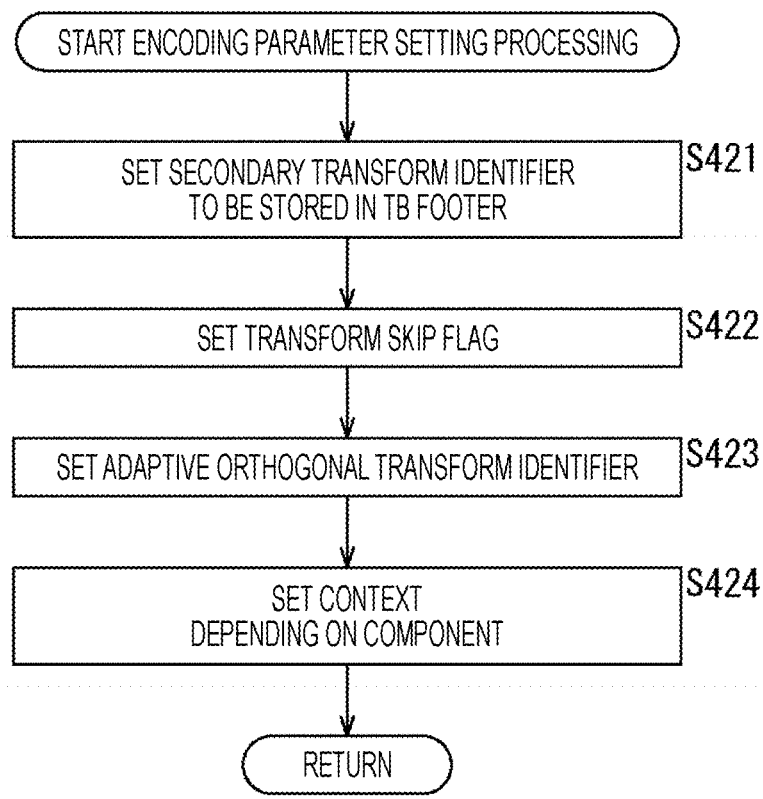
FIG. 41 is a flowchart illustrating an example of a flow of encoding parameter setting processing.

Another example of the flow of the encoding parameter setting processing executed by the control unit 101 in this case will be described with reference to the flowchart of FIG. 41. In this case, the control unit 101 executes this encoding parameter setting processing by applying the various methods described in <5-1. Signaling of secondary transform identifier>. Note that, in this example, the context initial value (offset) ctxInc is derived on the basis of whether the component is luminance (Y), chrominance (Cb), or chrominance (Cr) (B of FIG. 39).

Figure 40:
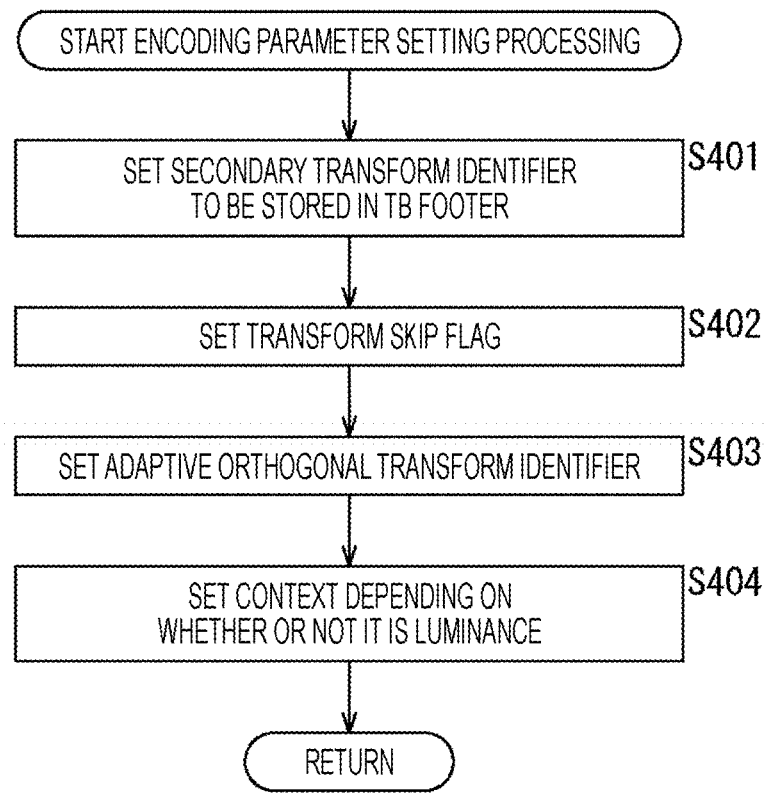
FIG. 40 is a flowchart illustrating an example of a flow of encoding parameter setting processing.

In this case, each processing of steps S421 to S423 is executed similarly to each processing of steps S401 to S403 of FIG. 40.

In step S424, the context setting unit 154 refers to the identifier cIdx for identifying the component, and sets the context on the basis of whether the component is luminance (Y), chrominance (Cb), or chrominance (Cr). When the processing of step S424 ends, the encoding parameter setting processing ends, and the processing returns to FIG. 20.

Note that, in this encoding parameter setting processing, a step of generating another arbitrary encoding parameter may be added.

<5-3. Decoding Side>

<Configuration>

Next, the decoding side will be described. The configuration of the decoding side in this case is similar to the case of the first embodiment. That is, the image decoding device 200 in this case has a configuration similar to the configuration described with reference to FIG. 23. Furthermore, the decoding unit 212 in this case has a configuration similar to the configuration described with reference to FIG. 24. Moreover, the inverse orthogonal transform unit 214 in this case has a configuration similar to the configuration described with reference to FIG. 25.

<Flow of the Decoding Processing>

Furthermore, the image decoding device 200 in this case performs processing basically similar to the case of the first embodiment. That is, the image decoding processing executed by the image decoding device 200 in this case is performed by a flow similar to the case described with reference to the flowchart of FIG. 26. Furthermore, the inverse orthogonal transform processing executed by the inverse orthogonal transform unit 214 in this case is performed by a flow similar to the case described with reference to the flowchart of FIG. 28.

Figure 42:
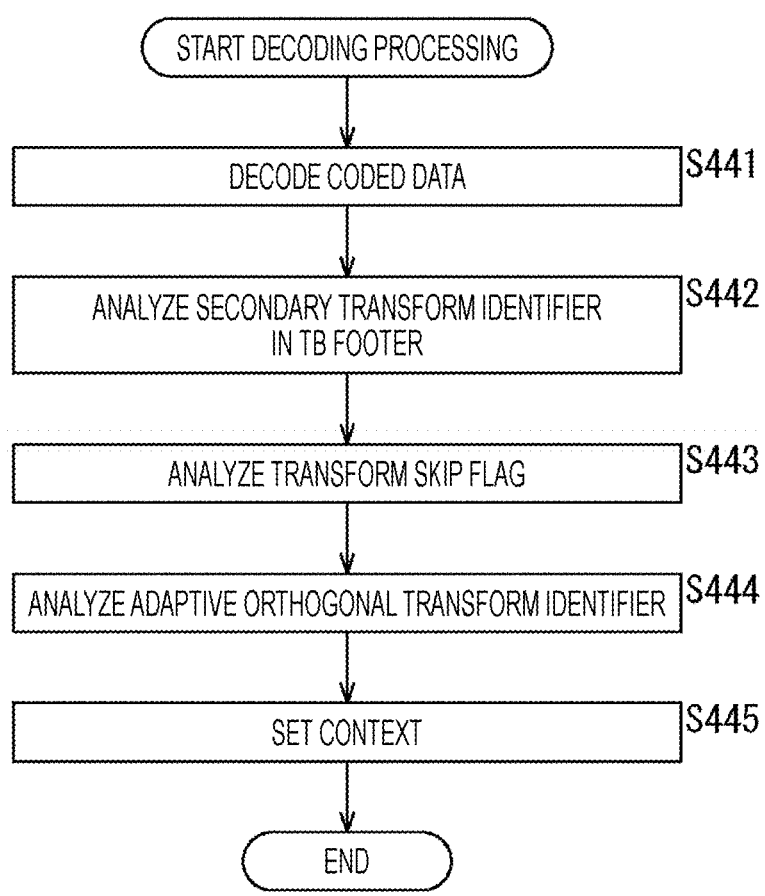
FIG. 42 is a flowchart illustrating an example of a flow of decoding processing.

An example of the flow of the decoding processing executed by the decoding unit 212 in this case in step S202 of FIG. 26 will be described with reference to the flowchart of FIG. 42. In this case, the decoding unit 212 executes this decoding processing by applying the various methods described in <5-1. Signaling of secondary transform identifier>.

When the decoding processing is started, the decoding unit 241 decodes the coded data (bitstream) of the accumulation buffer 211 in step S441.

In step S442, the secondary transform identifier analysis unit 251 of the analysis unit 242 analyzes the secondary transform identifier (signaled after the transform coefficient of the TB for each TB) of the TB footer from the decoding result.

Thus, the secondary transform identifier can be decoded before all TUs in the CU are decoded. That is, when the secondary transform identifier corresponding to a certain TB is decoded, inverse quantization and inverse transform processing of the TB can be started. Therefore, inverse quantization and inverse transform processing of each TB can be started before all the TUs in the CU are decoded.

Therefore, the period of buffering of the information necessary for starting the inverse quantization and the inverse transform processing of each TB can be made shorter than the case of signaling in the footer of the CU. Therefore, it is possible to suppress an increase in delay and memory use amount. That is, an increase in load of decoding can be suppressed.

Note that when the secondary transform identifier is signaled for each TB, the counting of the nonzero transform coefficient is closed to the processing target TB. That is, since it is only required to count the nonzero transform coefficient in the TB, the counting processing of the nonzero transform coefficient at the time of decoding can be simplified. Thus, an increase in load of the decoding processing can be suppressed.

Furthermore, the secondary transform identifier analysis unit 251 may perform determination as to whether or not the secondary transform identifier has been signaled on the basis of the transform block size (the transform block size in horizontal direction (tbWidth) and the transform block size in vertical direction (tbHeight)). Thus, it is possible to perform determination as to whether or not the secondary transform identifier has been signaled for each TU.

In step S443, the transform skip flag analysis unit 252 analyzes the transform skip flag. In step S444, the adaptive orthogonal transform identifier analysis unit 253 analyzes the adaptive orthogonal transform identifier.

In step S445, the context setting unit 254 sets the context. In that case, similar to the processing of step S404 (FIG. 40), the context setting unit 254 may refer to the identifier cIdx for identifying the component, and set the context on the basis of whether the component is luminance (Y) or chrominance (Cb or Cr). Furthermore, similar to the processing of step S424 (FIG. 41), the context setting unit 254 may refer to the identifier cIdx for identifying the component, and set the context on the basis of whether the component is luminance (Y), chrominance (Cb), or chrominance (Cr).

With this setting, the secondary transform identifier st_idx can be decoded more efficiently.

When the processing in step $445 ends, the decoding processing ends, and the processing returns to FIG. 26.

Note that, in this decoding processing, a step of analyzing another arbitrary encoding parameter may be added.

6. Fifth Embodiment

<6-1. Signaling of Secondary Transform Identifier>
<Signaling in TB Header>

The secondary transform identifier st_idx is signaled in the TB header. That is, the secondary transform identifier is stored in each TB and signaled for each TB. For example, at the time of encoding, the secondary transform identifier is set so as to be stored in the TB header. In other words, the secondary transform identifier for each TB is set to be signaled before transform coefficient in each TB. Furthermore, for example, at the time of decoding, the secondary transform identifier stored in the TB header is analyzed. In other words, the secondary transform identifier for each TB signaled before transform coefficient in each TB is analyzed.

FIG. 43 illustrates an example of syntax regarding transform block (residual_coding) in that case. In the case of the example of FIG. 43, st_mode (that is, st_idx) is signaled in the second row (gray row) from the top. That is, in this case, the secondary transform identifier is set for each TB (for each cIdx for identifying a component). Furthermore, the secondary transform identifier is signaled before the transform coefficient of the TB to which it corresponds.

Thus, the secondary transform identifier can be decoded before all TUs in the CU are decoded. That is, when the secondary transform identifier corresponding to a certain TB is decoded, inverse quantization and inverse transform processing of the TB can be started. Therefore, inverse quantization and inverse transform processing of each TB can be started before all the TUs in the CU are decoded.

Therefore, the period of buffering of the information necessary for starting the inverse quantization and inverse transform processing of the transform block can be made shorter than the case of signaling in the footer of the CU. Therefore, it is possible to suppress an increase in delay and memory use amount. That is, an increase in load of decoding can be suppressed.

Note that when the secondary transform identifier is signaled for each TB, the counting of the nonzero transform coefficient is closed to the processing target TB. That is, since it is only required to count the nonzero transform coefficient in the TB, the counting processing of the nonzero transform coefficient at the time of encoding or decoding can be simplified. Therefore, an increase in load of the encoding processing and the decoding processing can be suppressed.

<Signaling Control of Secondary Transform Identifier>

Furthermore, in this case, since the secondary transform identifier is signaled for each TB, whether or not to signal the secondary transform identifier may be performed on the basis of the transform block size (transform block size in horizontal direction (tbWidth) and transform block size in vertical direction (tbHeight)). Thus, it is possible to control whether or not to signal the secondary transform identifier for each TB.

An example of syntax regarding st_mode in that case is illustrated in FIG. 44. In this case, as illustrated in the second row (gray row) from the top, in order to set stAllowed to be true, a smaller one of the transform block size in the horizontal direction (tbWidth) and the transform block size in the vertical direction (tbHeight) needs to be equal to or larger than a predetermined threshold value (minstSize). That is, the secondary transform identifier is not signaled for a transform block having a transform block size smaller than the threshold value. As described above, instead of setting the secondary transform identifier on the basis of the encoded block size, the secondary transform identifier may be set on the basis of the transform block size.

<Omission of Counting of Nonzero Transform Coefficient>

Moreover, similar to the case of the first embodiment, in this case, a conditional expression referring to the number of nonzero transform coefficients may be deleted from a decoding/encoding condition of the secondary transform identifier (FIG. 44). For example, the secondary transform identifier may be set regardless of the number of nonzero transform coefficients. Further, for example, the secondary transform identifier may be analyzed regardless of the number of nonzero transform coefficients.

Thus, when the secondary transform identifier is derived in the encoding processing, the complicated counting of the nonzero coefficients can be omitted, so that an increase in load of the encoding processing can be suppressed. Furthermore, when the secondary transform identifier is analyzed in the decoding processing, the complicated counting of the nonzero coefficients can be omitted, so that an increase in load of the decoding processing can be suppressed.

Note that counting of the nonzero transform coefficient can also be omitted in the syntax (residual_coding) of the TB in FIG. 43 (the sixth row (gray row) from the bottom of FIG. 43).

<Setting of Secondary Transform Identifier Based on Transform Skip Flag>

Furthermore, in this case, the secondary transform identifier may be signaled only in a case where the transform skip is not applied (that is, the secondary transform identifier is not signaled in a case where the transform skip is applied).

Thus, the secondary transform identifier can be easily set according to the transform skip flag. Furthermore, at the time of decoding, the secondary transform identifier can be easily analyzed according to the transform skip flag. Thus, an increase in load of the decoding processing can be suppressed.

For example, in the second row from the top in FIG. 44, non-application of the transform skip is included in the condition that stAllowed is true (&& ! transform_skip_flag [x0] [y0] [cIdx]). That is, in order for stAllowed to be true, it is necessary that the transform skip is not applied. As described above, instead of setting the secondary transform identifier on the basis of the number of nonzero transform coefficients, the secondary transform identifier may be set on the basis of a flag indicating whether or not to apply the transform skip.

<Derivation of Context>

Furthermore, similar to the case of the first embodiment, in this case, for example, the context initial value (offset) ctxInc may be derived on the basis of only the tree type (treeType) without depending on the adaptive orthogonal transform identifier tu_mts_idx (FIG. 16).

Thus, it is possible to derive the context index of the first bin of the secondary transform identifier st_idx without requiring complicated processing (more easily). Similarly, at the time of decoding, it is possible to derive the context index of the first bin of the secondary transform identifier st_idx more easily. Thus, an increase in load of the decoding processing can be suppressed.

Furthermore, similar to the case of the fourth embodiment, in this case, the context initial value (offset) ctxInc may be derived on the basis of the component (for example, on the basis of the value of the identifier cIdx for identifying the component) (FIG. 39).

For example, the context initial value (offset) ctxInc may be derived on the basis of whether the component is luminance (Y) or chrominance (Cb or Cr). Since the probability of application of the secondary transform is different between luminance and chrominance, the secondary transform identifier st_idx for each component can be encoded and decoded more efficiently in this manner.

Furthermore, the context initial value (offset) ctxInc may be derived on the basis of whether the component is luminance (Y), chrominance (Cb), or chrominance (Cr). In this way, since the context variable ctx can be set in more detail, the secondary transform identifier st_idx can be encoded and decoded more efficiently.

<6-2. Encoding Side>
<Configuration>

Next, the encoding side will be described. The configuration of the encoding side in this case is similar to the case of the first embodiment. That is, the image encoding device 100 in this case has a configuration similar to the configuration described with reference to FIG. 17. Furthermore, the control unit 101 in this case has a configuration similar to the configuration described with reference to FIG. 18. Moreover, the orthogonal transform unit 113 in this case has a configuration similar to the configuration described with reference to FIG. 19.

<Flow of Encoding Parameter Setting Processing>

Furthermore, the image encoding device 100 in this case performs processing basically similar to the case of the first embodiment. That is, the image encoding processing executed by the image encoding device 100 in this case is performed by a flow similar to the case described with reference to the flowchart of FIG. 20. Furthermore, the orthogonal transform processing executed by the orthogonal transform unit 113 in this case is performed by a flow similar to the case described with reference to the flowchart of FIG. 22.

Figure 45:
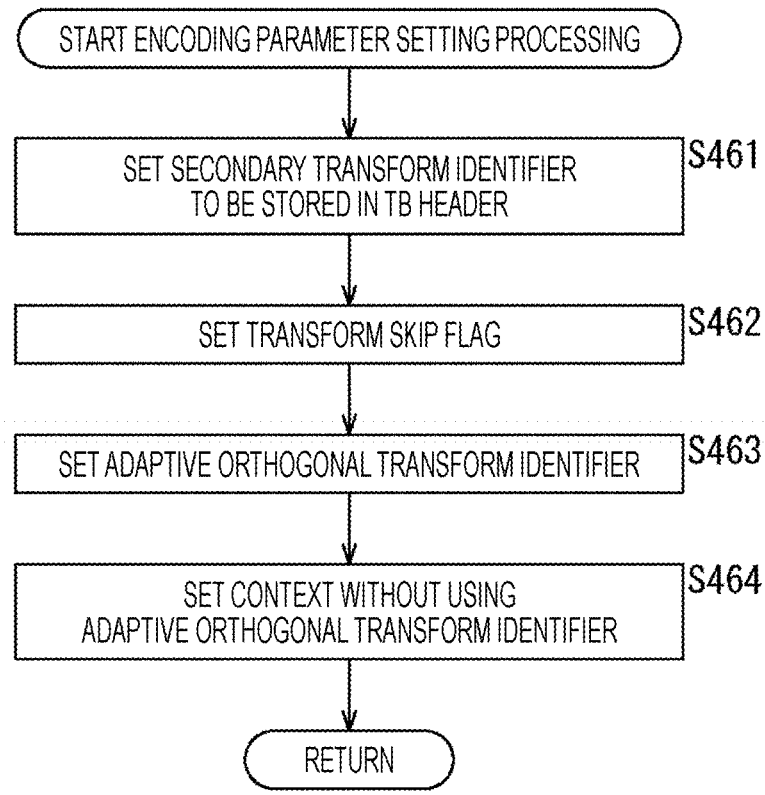
FIG. 45 is a flowchart illustrating an example of a flow of encoding parameter setting processing.

An example of the flow of the encoding parameter setting processing executed by the control unit 101 in this case in step S103 of FIG. 20 will be described with reference to the flowchart of FIG. 45. In this case, the control unit 101 executes this encoding parameter setting processing by applying the various methods described in <6-1. Signaling of secondary transform identifier>.

When the encoding parameter setting processing is started, the secondary transform identifier setting unit 151 of the control unit 101 sets the secondary transform identifier st_idx to be stored in the TB header in step S461. That is, the secondary transform identifier setting unit 151 sets the secondary transform identifier to be signaled before the transform coefficient of the TB for each TB. Therefore, as described above, it is possible to suppress an increase in delay and memory use amount in the decoding processing, and it is possible to suppress an increase in load of the decoding processing.

Note that when the secondary transform identifier is signaled for each TB, the counting of the nonzero transform coefficient is closed to the processing target TU. That is, since it is only required to count the nonzero transform coefficient in the TB, the counting processing of the nonzero transform coefficient at the time of encoding or decoding can be simplified. Thus, an increase in load of the encoding processing can be suppressed.

Furthermore, the secondary transform identifier setting unit 151 may perform whether or not to signal the secondary transform identifier on the basis of the transform block size (the transform block size in horizontal direction (tbWidth) and the transform block size in vertical direction (tbHeight)). Thus, it is possible to control whether or not to signal the secondary transform identifier for each TB.

Moreover, the secondary transform identifier setting unit 151 may set the secondary transform identifier regardless of the number of nonzero transform coefficients. Thus, the complicated counting of the nonzero transform coefficients can be omitted, and an increase in load of the encoding processing can be suppressed. Furthermore, in the decoding processing also, the complicated counting of the nonzero transform coefficients can be omitted, and an increase in load of the decoding processing can be suppressed.

Furthermore, the secondary transform identifier setting unit 151 may signal the secondary transform identifier only in a case where the transform skip is not applied. Thus, at the time of decoding, the secondary transform identifier can be easily analyzed according to the transform skip flag, and an increase in load of the decoding processing can be suppressed.

In step S462, the transform skip flag setting unit 152 sets the transform skip flag. In step S463, the adaptive orthogonal transform identifier setting unit 153 sets the adaptive orthogonal transform identifier.

In step S464, the context setting unit 154 sets the context. In that case, for example, the context setting unit 154 may set the context without using the adaptive orthogonal transform identifier. That is, in this case, the context setting unit 154 derives the context ctxInc on the basis of only the tree type (treeType) without depending on the adaptive orthogonal transform identifier tu_mts_idx. Thus, it is possible to derive the context index of the first bin of the secondary transform identifier st_idx without requiring complicated processing (more easily).

Note that the context setting unit 154 may refer to the identifier cIdx for identifying the component, and set the context on the basis of whether the component is luminance (Y) or chrominance (Cb or Cr). Moreover, the context setting unit 154 may refer to the identifier cIdx for identifying the component, and set the context on the basis of whether the component is luminance (Y), chrominance (Cb), or chrominance (Cr). The secondary transform identifier st_idx for each component can be encoded more efficiently in this manner.

When the processing of step S464 ends, the encoding parameter setting processing ends, and the processing returns to FIG. 20.

Note that, in step S464, the context setting unit 154 may set the context on the basis of the adaptive orthogonal transform identifier and the tree type. Furthermore, in this encoding parameter setting processing, a step of generating another arbitrary encoding parameter may be added.

<6-3. Decoding Side>
<Configuration>

Next, the decoding side will be described. The configuration of the decoding side in this case is similar to the case of the first embodiment. That is, the image decoding device 200 in this case has a configuration similar to the configuration described with reference to FIG. 23. Furthermore, the decoding unit 212 in this case has a configuration similar to the configuration described with reference to FIG. 24. Moreover, the inverse orthogonal transform unit 214 in this case has a configuration similar to the configuration described with reference to FIG. 25.

<Flow of the Decoding Processing>

Furthermore, the image decoding device 200 in this case performs processing basically similar to the case of the first embodiment. That is, the image decoding processing executed by the image decoding device 200 in this case is performed by a flow similar to the case described with reference to the flowchart of FIG. 26. Furthermore, the inverse orthogonal transform processing executed by the inverse orthogonal transform unit 214 in this case is performed by a flow similar to the case described with reference to the flowchart of FIG. 28.

Figure 46:
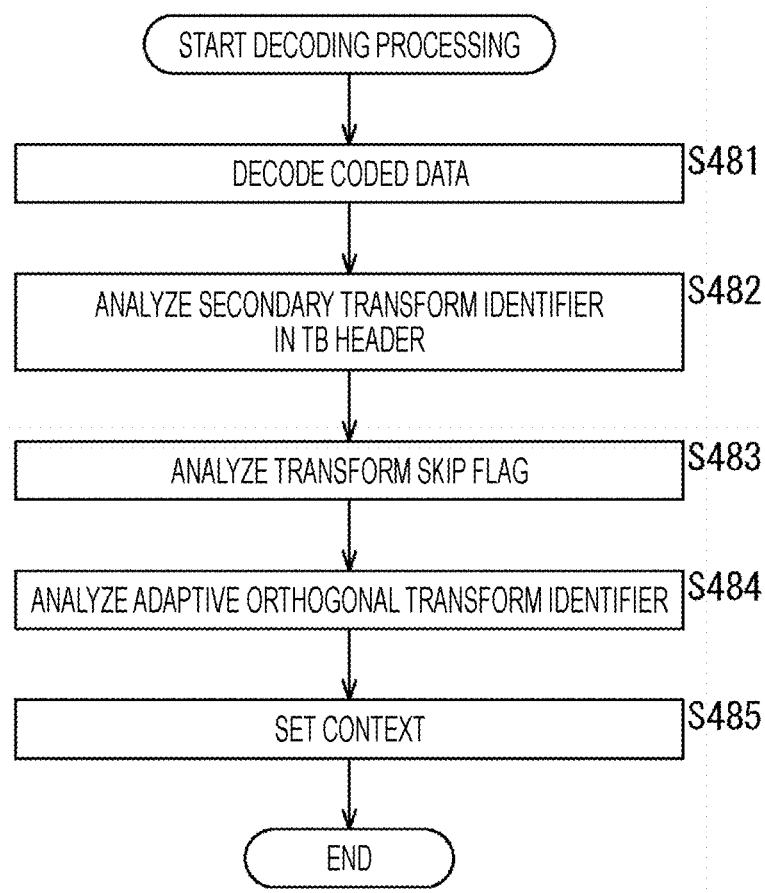
FIG. 46 is a flowchart illustrating an example of a flow of decoding processing.

An example of the flow of the decoding processing executed by the decoding unit 212 in this case in step S202 of FIG. 26 will be described with reference to the flowchart of FIG. 46. In this case, the decoding unit 212 executes this decoding processing by applying the various methods described in <6-1. Signaling of secondary transform identifier>.

When the decoding processing is started, the decoding unit 241 decodes the coded data (bitstream) of the accumulation buffer 211 in step S481.

In step S482, the secondary transform identifier analysis unit 251 of the analysis unit 242 analyzes the secondary transform identifier (signaled before the transform coefficient of the TB for each TB) of the TB header from the decoding result.

Thus, the secondary transform identifier can be decoded before all TUs in the CU are decoded. That is, when the secondary transform identifier corresponding to a certain TB is decoded, inverse quantization and inverse transform processing of the TB can be started. Therefore, inverse quantization and inverse transform processing of each TB can be started before all the TUs in the CU are decoded.

Therefore, the period of buffering of the information necessary for starting the inverse quantization and the inverse transform processing of each TB can be made shorter than the case of signaling in the footer of the CU. Therefore, it is possible to suppress an increase in delay and memory use amount. That is, an increase in load of decoding can be suppressed.

Note that when the secondary transform identifier is signaled for each TB, the counting of the nonzero transform coefficient is closed to the processing target TB. That is, since it is only required to count the nonzero transform coefficient in the TB, the counting processing of the nonzero transform coefficient at the time of decoding can be simplified. Thus, an increase in load of the decoding processing can be suppressed.

Furthermore, the secondary transform identifier analysis unit 251 may perform determination as to whether or not the secondary transform identifier has been signaled on the basis of the transform block size (the transform block size in horizontal direction (tbWidth) and the transform block size in vertical direction (tbHeight)). Thus, it is possible to perform determination as to whether or not the secondary transform identifier has been signaled for each TB.

Moreover, the secondary transform identifier may be set regardless of the number of nonzero transform coefficients. In that case, the secondary transform identifier analysis unit 251 can analyze the secondary transform identifier regardless of the number of nonzero transform coefficients. Thus, the complicated counting of the nonzero transform coefficients can be omitted, and an increase in load of the decoding processing can be suppressed.

Furthermore, it may be a secondary transform identifier signaled only in a case where the transform skip is not applied. In that case, the secondary transform identifier analysis unit 251 can analyze the secondary transform identifier on the basis of whether or not the transform skip is applied. For example, in a case where the transform skip is applied, the secondary transform identifier analysis unit 251 can determine that the secondary transform identifier is not signaled (that is, the secondary transform is skipped). Thus, the secondary transform identifier can be easily analyzed, and an increase in load of the decoding processing can be suppressed.

In step S483, the transform skip flag analysis unit 252 analyzes the transform skip flag. In step S484, the adaptive orthogonal transform identifier analysis unit 253 analyzes the adaptive orthogonal transform identifier.

In step S485, the context setting unit 254 sets the context. In that case, the context setting unit 254 may set the context without using the adaptive orthogonal transform identifier. That is, the context setting unit 254 may derive the context ctxInc on the basis of only the tree type (treeType) without depending on the adaptive orthogonal transform identifier tu_mts_idx. Thus, it is possible to derive the context index of the first bin of the secondary transform identifier st_idx without requiring complicated processing (more easily). Thus, an increase in load of the decoding processing can be suppressed.

Note that the context setting unit 254 may refer to the identifier cIdx for identifying the component, and set the context on the basis of whether the component is luminance (Y) or chrominance (Cb or Cr). Moreover, the context setting unit 254 may refer to the identifier cIdx for identifying the component, and set the context on the basis of whether the component is luminance (Y), chrominance (Cb), or chrominance (Cr). The secondary transform identifier st_idx for each component can be encoded more efficiently in this manner.

When the processing in step S485 ends, the decoding processing ends, and the processing returns to FIG. 26.

Note that, in step S485, the context setting unit 254 may set the context on the basis of the adaptive orthogonal transform identifier and the tree type. Furthermore, in this decoding processing, a step of analyzing another arbitrary encoding parameter may be added.

7. Sixth Embodiment

<7-1. Signaling of Secondary Transform Identifier>
<Restrictions on Block Size>

The secondary transform identifier is signaled only in a case where the information regarding the block size is equal to or less than a threshold value. In other words, the secondary transform identifier is set such that the secondary transform is performed only in a case where the information regarding the block size is equal to or less than a predetermined threshold value. That is, the secondary transform is performed only on a block having a predetermined size or less.

Thus, the secondary transform for an encoded block having a block size larger than a predetermined size can be skipped (omitted). That is, only an encoded block having a small delay time and a small memory use amount (that is, an encoded block having a small block size) waits for decoding of the secondary transform identifier and then starts inverse quantization and inverse transform processing of the transform block is started, and in a case of an encoded block having a large delay time and a large memory use amount (that is, an encoded block having a large block size), inverse quantization and inverse transform processing of the transform block can be started without waiting for decoding of the secondary transform identifier.

Therefore, it is possible to suppress an increase in delay and memory use amount. That is, an increase in load of decoding can be suppressed.

Note that the larger the block size, the larger the load of counting the nonzero transform coefficient. Therefore, as described above, by providing an upper limit to the block size in a case where the secondary transform is applied, it is possible to suppress an increase in load of counting the nonzero transform coefficient.

Note that a conditional expression referring to the number of nonzero transform coefficients may be deleted from a decoding/encoding condition of the secondary transform identifier. For example, the secondary transform identifier may be set regardless of the number of nonzero transform coefficients in the encoded block. Further, for example, the secondary transform identifier may be analyzed regardless of the number of nonzero transform coefficients in the encoded block. Thus, the complicated counting of the non-zero transform coefficients can be omitted, and an increase in load of the encoding processing and the decoding processing can be suppressed.

For example, the threshold value may be a maximum transform block size. For example, the secondary transform identifier may be set such that the secondary transform is performed in a case where the block size in the horizontal direction is equal to or smaller than the maximum transform block size and the block size in the vertical direction is equal to or smaller than the maximum transform block size.

Thus, the block size of the encoded block on which the secondary transform is performed can be limited to the maximum transform block size or less, and an increase in load of decoding can be suppressed as described above.

An example of syntax regarding st_mode is illustrated in FIG. 47. In this case, as illustrated in the second row (gray row) from the top, in order to set stAllowed to be true, the encoded block size in the horizontal direction (cbWidth) and the encoded block size in the vertical direction (cbHeight) need to be equal to or less than the maximum transform block size (axTbSize) (&& (cbWidth <=maxTbSize && chHeight <=maxTbSize)). That is, in a case where the encoded block size in the horizontal direction (cbWidth) or the encoded block size in the vertical direction (cbHeight) is larger than the maximum transform block size (axTbSize), the secondary transform identifier is not signaled. As described above, instead of setting the secondary transform identifier on the basis of the number of nonzero transform coefficients, the secondary transform identifier may be set on the basis of the encoded block size.

Note that the threshold value is arbitrary, and may be other than the maximum transform block size. Furthermore, the control using the threshold value may be any control as long as it is for limiting the block size subjected to the secondary transform, and a specific method for comparison with the threshold value for that purpose is arbitrary and is not limited to the example of FIG. 47. For example, the block size in the longitudinal direction (longer one of the horizontal direction and the vertical direction) of the encoded block may be compared with the maximum transform block size. Furthermore, comparison with a threshold value (for example, the square of the maximum transform block size) may be performed using an area (that is, the product of the block size in the horizontal direction and the block size in the vertical direction). Moreover, comparison may be performed using a logarithmic value (log value).

Note that, in this case, the secondary transform identifier may be stored in the CU footer (that is, st_idx is signaled after all TUs in the CU are signaled).

<7-2. Encoding Side>
<Configuration>

Next, the encoding side will be described. The configuration of the encoding side in this case is similar to the case of the first embodiment. That is, the image encoding device 100 in this case has a configuration similar to the configuration described with reference to FIG. 17. Furthermore, the control unit 101 in this case has a configuration similar to the configuration described with reference to FIG. 18. Moreover, the orthogonal transform unit 113 in this case has a configuration similar to the configuration described with reference to FIG. 19.

<Flow of Encoding Parameter Setting Processing>

Furthermore, the image encoding device 100 in this case performs processing basically similar to the case of the first embodiment. That is, the image encoding processing executed by the image encoding device 100 in this case is performed by a flow similar to the case described with reference to the flowchart of FIG. 20. Furthermore, the orthogonal transform processing executed by the orthogonal transform unit 113 in this case is performed by a flow similar to the case described with reference to the flowchart of FIG. 22.

Figure 48:
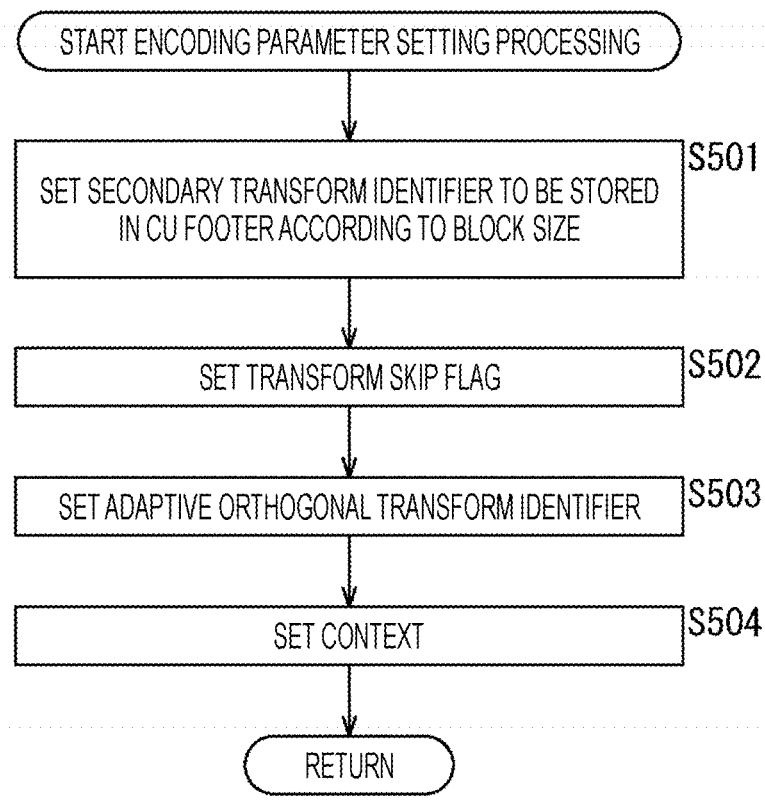
FIG. 48 is a flowchart illustrating an example of a flow of encoding parameter setting processing.

An example of the flow of the encoding parameter setting processing executed by the control unit 101 in this case in step S103 of FIG. 20 will be described with reference to the flowchart of FIG. 48. In this case, the control unit 101 executes this encoding parameter setting processing by applying the various methods described in <7-1. Signaling of secondary transform identifier>.

When the encoding parameter setting processing is started, the secondary transform identifier setting unit 151 of the control unit 101 sets the secondary transform identifier st_idx to be stored in the CU footer according to the block size in step S501. That is, the secondary transform identifier setting unit 151 sets the secondary transform identifier so as to signal the secondary transform identifier only for a CU having a predetermined block size or less (so as to skip the secondary transform for a CU larger than the predetermined block size). Therefore, as described above, it is possible to suppress an increase in delay and memory use amount in the decoding processing. Furthermore, it is possible to suppress an increase in load of counting the nonzero transform coefficient. Thus, an increase in load of the decoding processing can be suppressed.

Note that, in that case, the secondary transform identifier setting unit 151 can set the secondary transform identifier regardless of the number of nonzero transform coefficients in the CU. Thus, the complicated counting of the nonzero transform coefficients can be omitted, and an increase in load of the encoding processing can be suppressed.

In step S502, the transform skip flag setting unit 152 sets the transform skip flag. In step S503, the adaptive orthogonal transform identifier setting unit 153 step S504, the context setting unit 154 sets the context. When the processing of step S504 ends, the encoding parameter setting processing ends, and the processing returns to FIG. 20.

Note that, in this encoding parameter setting processing, a step of generating another arbitrary encoding parameter may be added.

<7-3. Decoding Side>
<Configuration>

Next, the decoding side will be described. The configuration of the decoding side in this case is similar to the case of the first embodiment. That is, the image decoding device 200 in this case has a configuration similar to the configuration described with reference to FIG. 23. Furthermore, the decoding unit 212 in this case has a configuration similar to the configuration described with reference to FIG. 24. Moreover, the inverse orthogonal transform unit 214 in this case has a configuration similar to the configuration described with reference to FIG. 25.

<Flow of the Decoding Processing>

Furthermore, the image decoding device 200 in this case performs processing basically similar to the case of the first embodiment. That is, the image decoding processing executed by the image decoding device 200 in this case is performed by a flow similar to the case described with reference to the flowchart of FIG. 26. Furthermore, the inverse orthogonal transform processing executed by the inverse orthogonal transform unit 214 in this case is performed by a flow similar to the case described with reference to the flowchart of FIG. 28.

Figure 49:
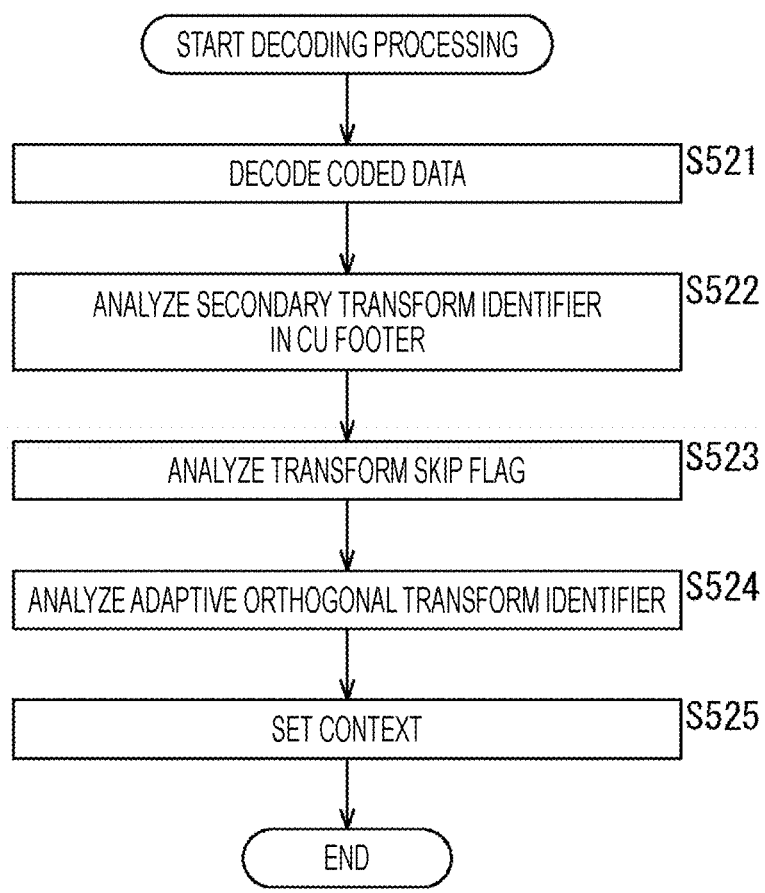
FIG. 49 is a flowchart illustrating an example of a flow of decoding processing.

An example of the flow of the decoding processing executed by the decoding unit 212 in this case in step S202 of FIG. 26 will be described with reference to the flowchart of FIG. 49. In this case, the decoding unit 212 executes this decoding processing by applying the various methods described in <7-1. Signaling of secondary transform identifier>.

When the decoding processing is started, the decoding unit 241 decodes the coded data (bitstream) of the accumulation buffer 211 in step S521.

In step S522, the secondary transform identifier analysis unit 251 of the analysis unit 242 analyzes the secondary transform identifier (signaled after the transform coefficient of the CU) of the CU footer from the decoding result.

The secondary transform identifier in this case is signaled only in the case of an encoded block that is less than or equal to a threshold value (e.g., maximum transform block size). Therefore, only an encoded block having a small delay time and a small memory use amount (that is, an encoded block having a small block size) waits for decoding of the secondary transform identifier and then inverse quantization and inverse transform processing of the transform block is started, and in a case of an encoded block having a large delay time and a large memory use amount (that is, an encoded block having a large block size), inverse quantization and inverse transform processing of the transform block can be started without waiting for decoding of the secondary transform identifier.

Therefore, it is possible to suppress an increase in delay and memory use amount. Furthermore, as described above, by providing an upper limit to the block size in a case where the secondary transform is applied, it is possible to suppress an increase in load of counting the nonzero transform coefficient. That is, an increase in load of decoding can be suppressed.

Note that the secondary transform identifier may be analyzed regardless of the number of nonzero transform coefficients in the encoded block. Thus, the complicated counting of the nonzero transform coefficients can be omitted, and an increase in load of the decoding processing can be suppressed.

In step S523, the transform skip flag analysis unit 252 analyzes the transform skip flag. In step S524, the adaptive orthogonal transform identifier analysis unit 253 analyzes the adaptive orthogonal transform identifier. In step S525, the context setting unit 254 sets the context. When the processing in step S525 ends, the decoding processing ends, and the processing returns to FIG. 26.

Note that, in this decoding processing, a step of analyzing another arbitrary encoding parameter may be added.

8. Seventh Embodiment

<8-1. Simplification of Secondary Transform>
<Control of Effective Transform Area Size>

In a case where the secondary transform for zeroing a high-frequency primary transform coefficient as described in Non-Patent Document 9 is applied, in other words, in a case where the primary transform coefficient (primary transform coefficient other than the LFNST corner) that is not changed by the RST transform matrix is zeroed, the effective transform area size is derived on the basis of the value of the secondary transform identifier. For example, in a case where the transform block size is larger than 4×4, the effective transform area size is set to 4×4.

Thus, the effective transform area size can be derived by a method corresponding to the secondary transform, and the prefix portion of the last coefficient can be obtained using the effective transform area size. Therefore, an increase in code length can be suppressed. That is, an increase in bin length of the last coefficient can be suppressed (typically, the bin length can be reduced). That is, it is possible to suppress an increase in code amount (suppress a reduction in encoding efficiency). Therefore, an increase in load of the decoding processing can be suppressed.

FIG. 50 illustrates an example of syntax regarding transform block (residual_coding) in that case. In the example of FIG. 50, in a case where the secondary transform is performed in the fourth and fifth rows from the top (gray rows) and the logarithmic values of the transform block sizes in the horizontal direction and the vertical direction are larger than 2 (that is, in a case where the transform block is larger than 4×4), the logarithmic value (log2ZoTbWidth) of the effective transform area size in the horizontal direction is set to 2.

Similarly, in a case where the secondary transform is performed in the tenth and eleventh rows from the top (gray rows) and the logarithmic values of the transform block sizes in the horizontal direction and the vertical direction are larger than 2 (that is, in a case where the transform block is larger than 4×4), the logarithmic value (log2ZoTbHeight) of the effective transform area size in the vertical direction is set to 2.

Thus, it is possible to suppress an increase in length of the bin sequence bins of the prefix portion.

For example, it is assumed that the last coefficient position (lastX, lastY) of the DC subblock is (3, 3). In the case of a 16×16 TB illustrated in FIG. 9, the bin sequence of each prefix portion (last_sig_coeff_x_prefix, last_sig_coeff_y_prefix) of the last coefficient position derived using FIGS. 10 to 12 is "1110". That is, the length of the bin is four bins.

On the other hand, in a case where the effective transform area size is 4×4, the bin sequence of the prefix portion is "111". That is, the length of the bin is three bins.

In this way, in a case where the transform block size is larger than 4×4, by setting the effective transform area size to 4×4, it can be shorter by one bin than in the above example. Considering the X direction and the Y direction, it is possible to reduce up to two bins. Thus, a reduction in encoding efficiency can be suppressed. Furthermore, by suppressing an increase in code amount, an increase in load of the decoding processing can be suppressed.

<8-2. Encoding Side>
<Configuration>

Next, the encoding side will be described. The configuration of the encoding side in this case is basically similar to the case of the first embodiment. That is, the image encoding device 100 in this case has a configuration similar to the configuration described with reference to FIG. 17. Furthermore, the orthogonal transform unit 113 in this case has a configuration similar to the configuration described with reference to FIG. 19.

<Control Unit>

Figure 51:
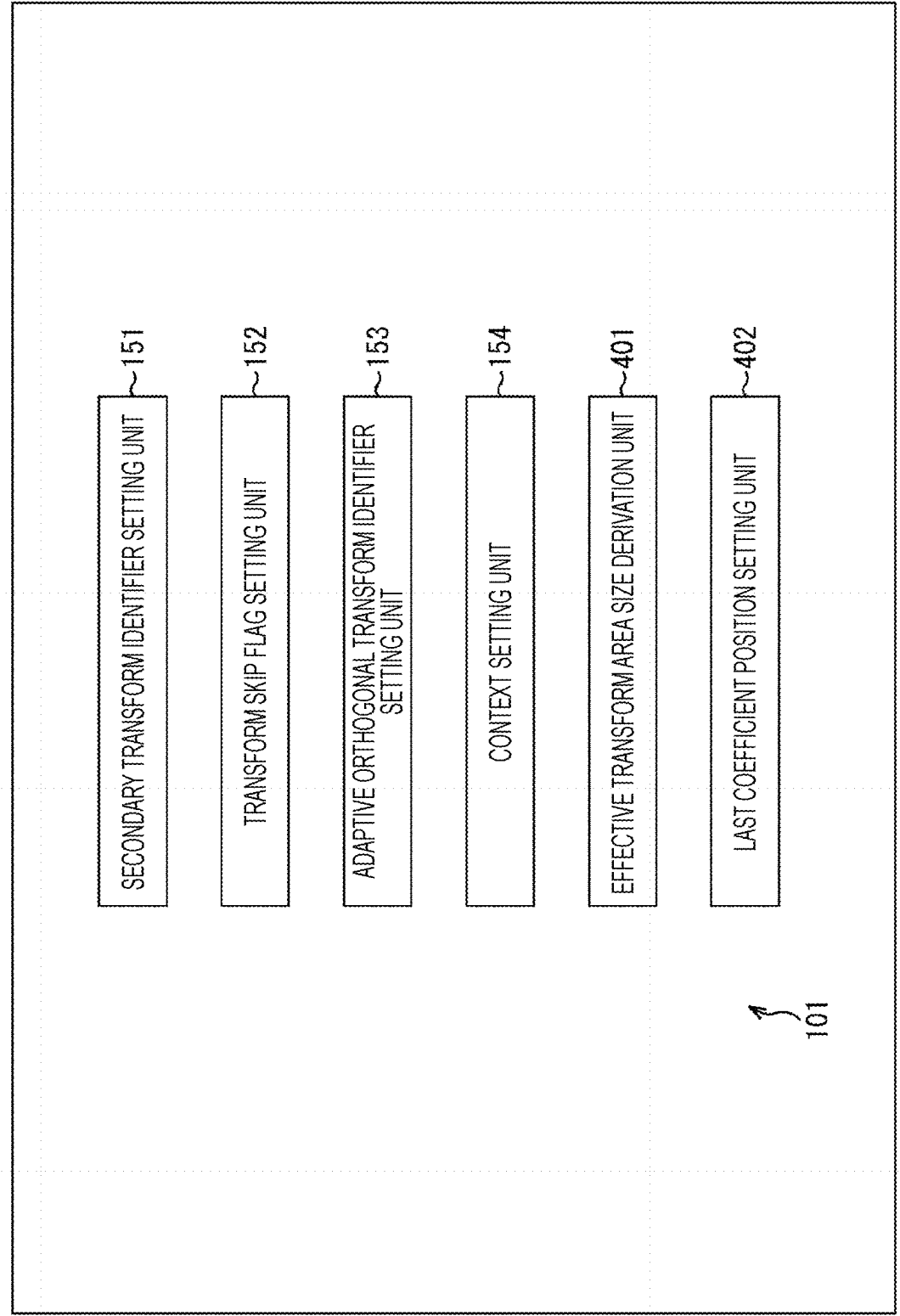
FIG. 51 is a block diagram illustrating a main configuration example of a control unit.

A main configuration example of the control unit 101 in this case is illustrated in FIG. 51. As illustrated in FIG. 51, the control unit 101 in this case further includes an effective transform area size derivation unit 401 and a last coefficient position setting unit 402 in addition to the secondary transform identifier setting unit 151 to the context setting unit 154.

The effective transform area size derivation unit 401 performs processing related to derivation of the effective transform area size. For example, the effective transform area size derivation unit 401 derives, as the encoding parameter, an effective transform area size (log2ZoTbWidth, log2ZoHeight) that is an area in which a nonzero transform coefficient remains even after zeroing by the secondary transform for zeroing a high-frequency primary transform coefficient. At that time, the effective transform area size derivation unit 401 applies the method described in <8-1. Simplification of secondary transform>.

For example, in a case where the transform block size is larger than 4×4, the effective transform area size derivation unit 401 sets the effective transform area size to 4×4. Thus, an increase in bin length of the prefix portion of the last coefficient can be suppressed, and a reduction in encoding efficiency can be suppressed. Therefore, an increase in load of the decoding processing can be suppressed.

The last coefficient position setting unit 402 performs processing related to setting of the last coefficient position. For example, the last coefficient position setting unit 402 uses the effective transform area size (log2ZoTbWidth, log2ZoHeight), binarizes each prefix portion (last_sig_coeff_x_prefix, last_sig_coeff_y_prefix) of the last coefficient position (lastX, lastY) according to the table illustrated in FIG. 11, and generates the bin sequence according to the table illustrated in FIG. 12. The last coefficient position setting unit 402 supplies the bin sequence to the encoding unit 115 and causes the encoding unit 115 to encode the bin sequence.

<Flow of Encoding Parameter Setting Processing>

The image encoding device 100 in this case performs processing basically similar to the case of the first embodiment. That is, the image encoding processing executed by the image encoding device 100 in this case is performed by a flow similar to the case described with reference to the flowchart of FIG. 20. Furthermore, the orthogonal transform processing executed by the orthogonal transform unit 113 in this case is performed by a flow similar to the case described with reference to the flowchart of FIG. 22.

Figure 52:
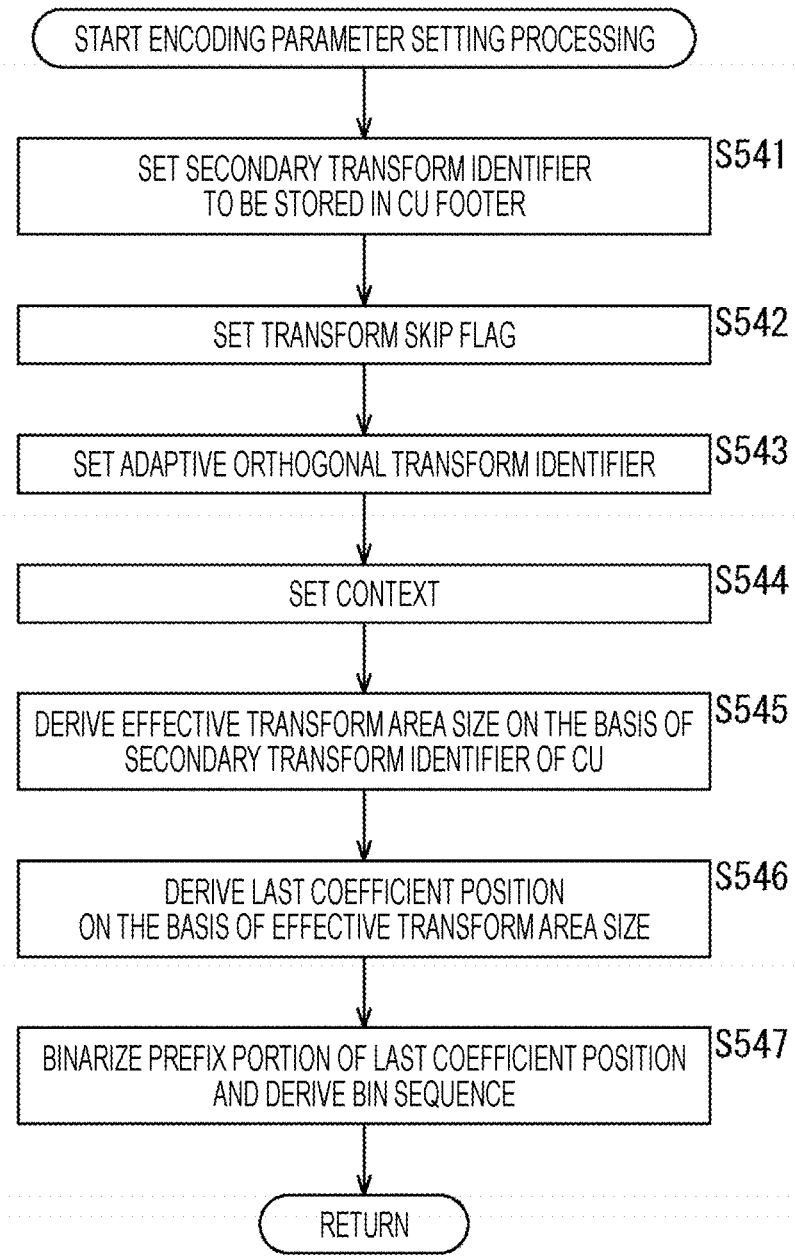
FIG. 52 is a flowchart illustrating an example of a flow of encoding parameter setting processing.

An example of the flow of the encoding parameter setting processing executed by the control unit 101 in this case in step S103 of FIG. 20 will be described with reference to the flowchart of FIG. 52. In this case, the control unit 101 executes this encoding parameter setting processing by applying the method described in <8-1. Simplification of secondary transform>.

When the encoding parameter setting processing is started, the secondary transform identifier setting unit 151 of the control unit 101 sets the secondary transform identifier st_idx to be stored in the CU footer in step S541.

In step S542, the transform skip flag setting unit 152 sets the transform skip flag. In step S543, the adaptive orthogonal transform identifier setting unit 153 sets the adaptive orthogonal transform identifier. In step S544, the context setting unit 154 sets the context.

In step S545, the effective transform area size derivation unit 401 derives the effective transform area size on the basis of the secondary transform identifier of the CU. For example, in the case of the secondary transform that zeroes a high-frequency primary transform coefficient, in a case where the transform block size is larger than 4×4, the effective transform area size derivation unit 401 sets the effective transform area size to 4×4.

In step S546, the last coefficient position setting unit 402 derives the last coefficient position on the basis of the effective transform area size.

In step S547, the last coefficient position setting unit 402 binarizes the prefix portion of the last coefficient position and derives a bin sequence.

When the processing of step S547 ends, the encoding parameter setting processing ends, and the processing returns to FIG. 20.

Note that, in this encoding parameter setting processing, a step of generating another arbitrary encoding parameter may be added.

By executing the encoding parameter setting processing in this manner, it is possible to suppress a reduction in encoding efficiency.

<8-3. Decoding Side>
<Configuration>

Next, the decoding side will be described. The configuration of the decoding side in this case is basically similar to the case of the first embodiment. That is, the image decoding device 200 in this case has a configuration similar to the configuration described with reference to FIG. 23. Furthermore, the inverse orthogonal transform unit 214 in this case has a configuration similar to the configuration described with reference to FIG. 25.

<Decoding Unit>

Figure 53:
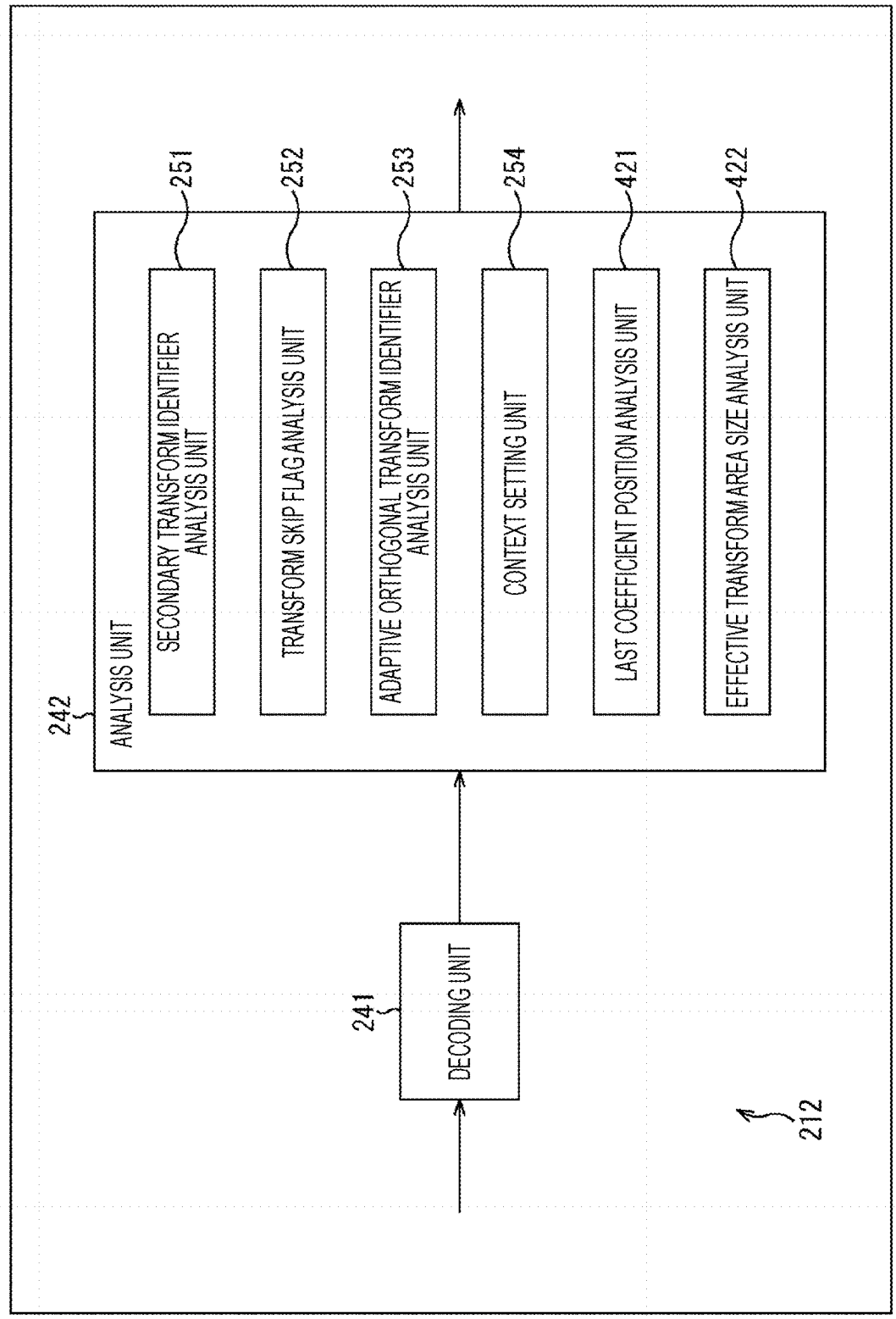
FIG. 53 is a block diagram illustrating a main configuration example of a decoding unit.

A main configuration example of the decoding unit 212 in this case is illustrated in FIG. 53. As illustrated in FIG. 53, the decoding unit 212 in this case includes the decoding unit 241 and the analysis unit 242 as in the case of the first embodiment.

Furthermore, in addition to the secondary transform identifier analysis unit 251 to the context setting unit 254, the analysis unit 242 further includes a last coefficient position analysis unit 421 and an effective transform area size analysis unit 422.

The last coefficient position analysis unit 421 performs processing related to analysis of the last coefficient position. For example, the last coefficient position analysis unit 421 performs inverse binarization (multivalue conversion) on the bin sequence of the prefix portion of the last coefficient position.

The effective transform area size analysis unit 422 performs processing related to analysis of the effective transform area size. For example, the effective transform area size analysis unit 422 obtains the effective transform area size on the basis of the last coefficient position obtained by the last coefficient position analysis unit 421. The effective transform area size analysis unit 422 supplies the obtained effective transform area size to the inverse orthogonal transform unit 214. The inverse secondary transform unit 271 of the inverse orthogonal transform unit 214 uses the effective transform area size and performs inverse secondary transform corresponding to the secondary transform for zeroing the high-frequency primary transform coefficient (FIG. 9).

<Flow of the Decoding Processing>

Furthermore, the image decoding device 200 in this case performs processing basically similar to the case of the first embodiment. That is, the image decoding processing executed by the image decoding device 200 in this case is performed by a flow similar to the case described with reference to the flowchart of FIG. 26. Furthermore, the inverse orthogonal transform processing executed by the inverse orthogonal transform unit 214 in this case is performed by a flow similar to the case described with reference to the flowchart of FIG. 28.

Figure 54:
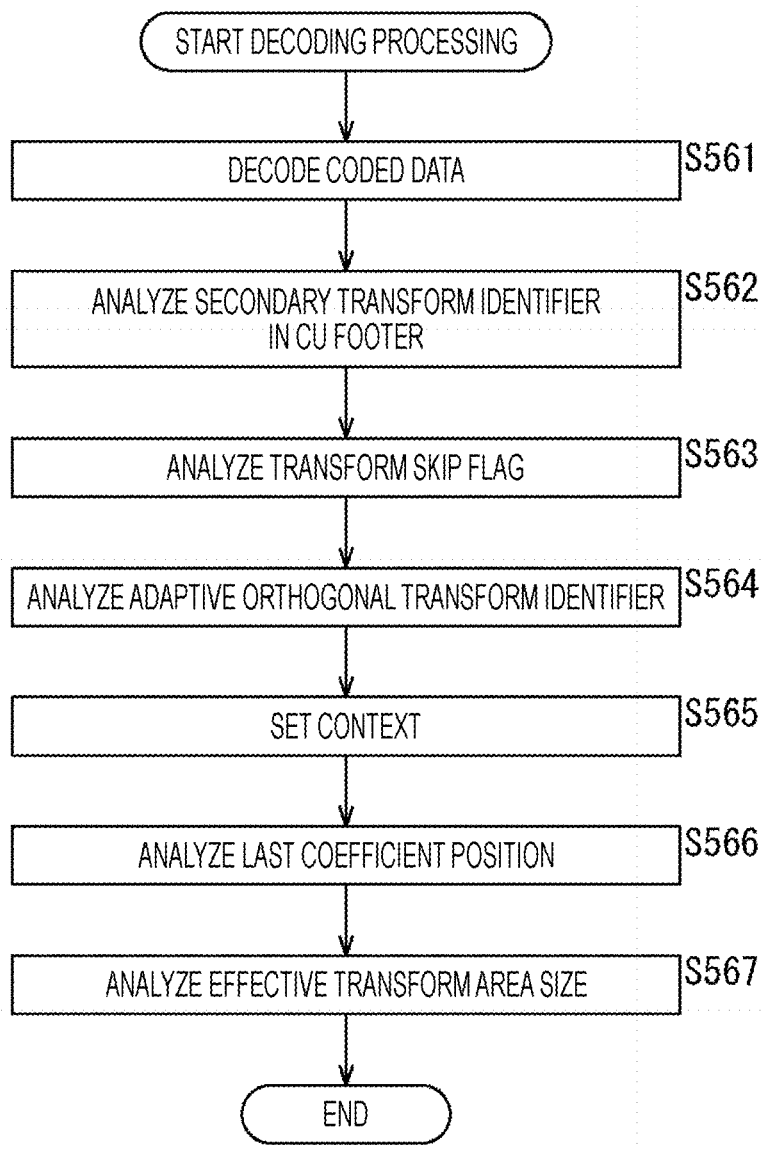
FIG. 54 is a flowchart illustrating an example of a flow of decoding processing.

An example of the flow of the decoding processing executed by the decoding unit 212 in this case in step S202 of FIG. 26 will be described with reference to the flowchart of FIG. 54.

When the decoding processing is started, the decoding unit 241 decodes the coded data (bitstream) of the accumulation buffer 211 in step S561.

In step S562, the secondary transform identifier analysis unit 251 of the analysis unit 242 analyzes the secondary transform identifier (signaled after the transform coefficient of the CU) of the CU footer from the decoding result.

In step S563, the transform skip flag analysis unit 252 analyzes the transform skip flag. In step S564, the adaptive orthogonal transform identifier analysis unit 253 analyzes the adaptive orthogonal transform identifier. In step S565, the context setting unit 254 sets the context.

In step S566, the last coefficient position analysis unit 421 performs inverse binarization (multivalue conversion) on the bin sequence of the prefix portion of the last coefficient position.

In step S567, the effective transform area size analysis unit 422 obtains the effective transform area size on the basis of the obtained last coefficient position.

When the processing in step S567 ends, the decoding processing ends, and the processing returns to FIG. 26.

Note that, in this decoding processing, a step of analyzing another arbitrary encoding parameter may be added.

9. Eighth Embodiment

<9-1. Simplification of Secondary Transform>
<Control of Effective Transform Area Size>

The present technology described in the seventh embodiment may be combined with the second embodiment. That is, the secondary transform identifier may be signaled for each TU. In other words, also in a case where the present technology described in the seventh embodiment is applied to the second embodiment, in the secondary transform for zeroing the high-frequency primary transform coefficient, in a case where the transform block size is larger than 4×4, the effective transform area size may be 4×4.

Thus, similar to the case of the seventh embodiment, an increase in bin length of the last coefficient can be suppressed, and a reduction in encoding efficiency can be suppressed. Therefore, an increase in load of the decoding processing can be suppressed.

<9-2. Encoding Side>
<Configuration>

Next, the encoding side will be described. The configuration of the encoding side in this case is similar to the case of the seventh embodiment. That is, the image encoding device 100 in this case has a configuration similar to the configuration described with reference to FIG. 17. Furthermore, the control unit 101 in this case has a configuration similar to the configuration described with reference to FIG. 51. Moreover, the orthogonal transform unit 113 in this case has a configuration similar to the configuration described with reference to FIG. 19.

<Flow of encoding parameter setting processing>

The image encoding device 100 in this case performs processing basically similar to the case of the seventh embodiment. That is, the image encoding processing executed by the image encoding device 100 in this case is performed by a flow similar to the case described with reference to the flowchart of FIG. 20. Furthermore, the orthogonal transform processing executed by the orthogonal transform unit 113 in this case is performed by a flow similar to the case described with reference to the flowchart of FIG. 22.

Figure 55:
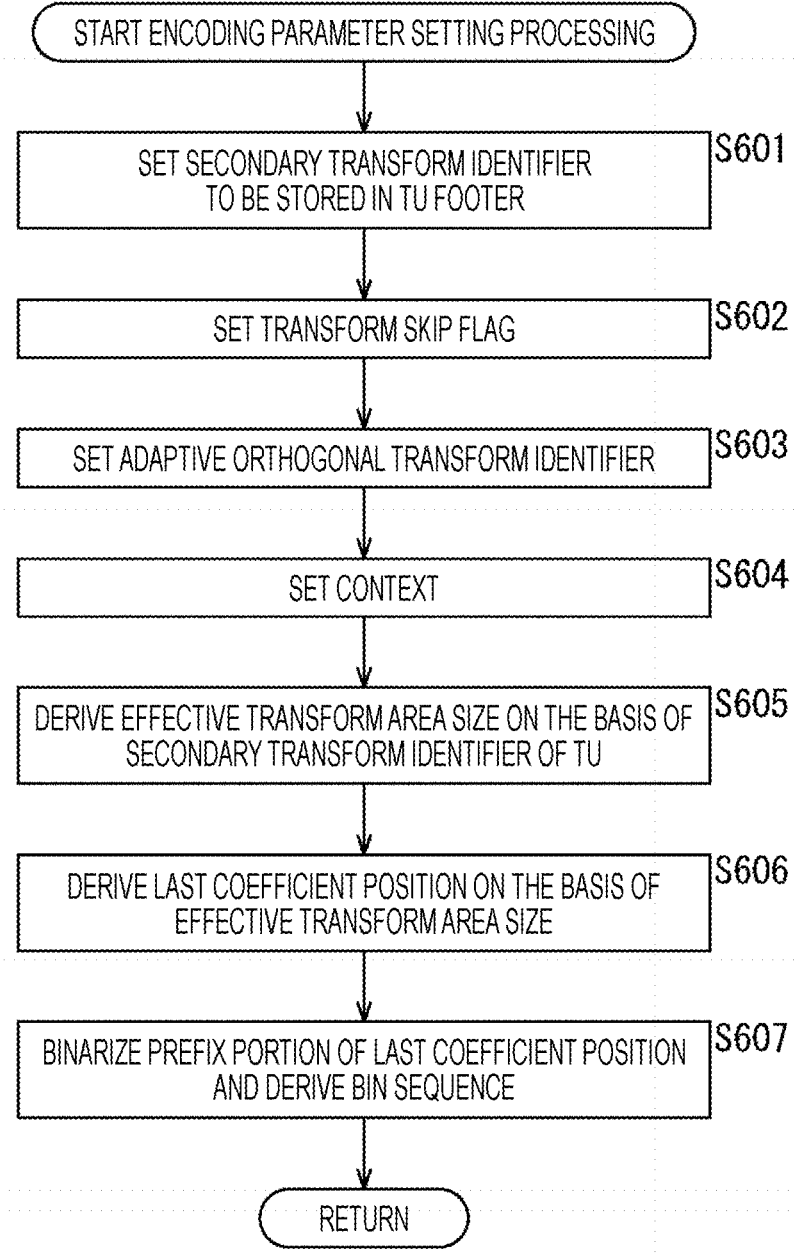
FIG. 55 is a flowchart illustrating an example of a flow of encoding parameter setting processing.

An example of the flow of the encoding parameter setting processing executed by the control unit 101 in this case in step S103 of FIG. 20 will be described with reference to the flowchart of FIG. 55. In this case, the control unit 101 executes this encoding parameter setting processing by applying the method described in <9-1. Simplification of secondary transform>.

When the encoding parameter setting processing is started, the secondary transform identifier setting unit 151 of the control unit 101 sets the secondary transform identifier st_idx to be stored in the TU footer in step S601.

In step S602, the transform skip flag setting unit 152 sets the transform skip flag. In step S603, the adaptive orthogonal transform identifier setting unit 153 sets the adaptive orthogonal transform identifier. In step S604, the context setting unit 154 sets the context.

In step S605, the effective transform area size derivation unit 401 derives the effective transform area size on the basis of the secondary transform identifier of the TU. For example, in the case of the secondary transform that zeroes a high-frequency primary transform coefficient, in a case where the transform block size is larger than 4×4, the effective transform area size derivation unit 401 sets the effective transform area size to 4×4.

In step S606, the last coefficient position setting unit 402 derives the last coefficient position on the basis of the effective transform area size. In step S607, the last coefficient position setting unit 402 binarizes the prefix portion of the last coefficient position and derives a bin sequence. When the processing of step S607 ends, the encoding parameter setting processing ends, and the processing returns to FIG. 20.

Note that, in this encoding parameter setting processing, a step of generating another arbitrary encoding parameter may be added.

By executing the encoding parameter setting processing in this manner, it is possible to suppress a reduction in encoding efficiency.

<9-3. Decoding Side>
<Configuration>

Next, the decoding side will be described. The configuration of the decoding side in this case is similar to the case of the seventh embodiment. That is, the image decoding device 200 in this case has a configuration similar to the configuration described with reference to FIG. 23. Furthermore, the decoding unit 212 in this case has a configuration similar to the configuration described with reference to FIG. 53. Moreover, the inverse orthogonal transform unit 214 in this case has a configuration similar to the configuration described with reference to FIG. 25.

<Flow of the Decoding Processing>

Furthermore, the image decoding device 200 in this case performs processing basically similar to the case of the seventh embodiment. That is, the image decoding processing executed by the image decoding device 200 in this case is performed by a flow similar to the case described with reference to the flowchart of FIG. 26. Furthermore, the inverse orthogonal transform processing executed by the inverse orthogonal transform unit 214 in this case is performed by a flow similar to the case described with reference to the flowchart of FIG. 28.

Figure 56:
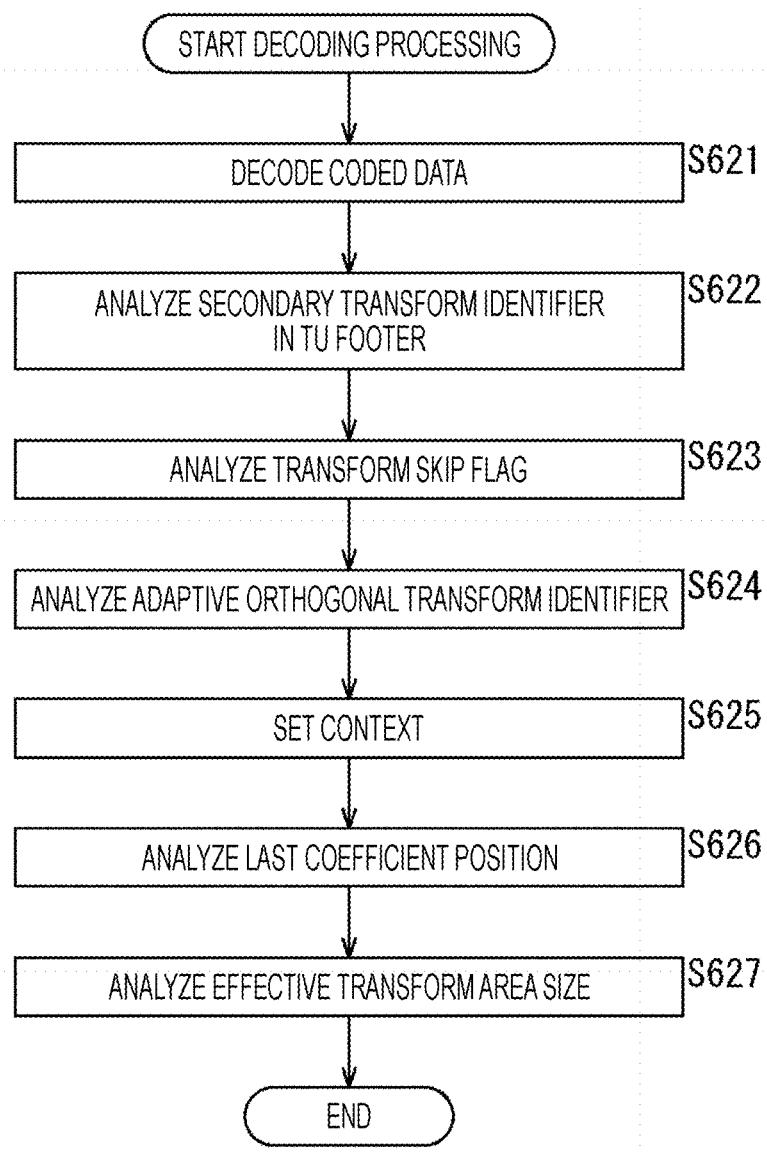
FIG. 56 is a flowchart illustrating an example of a flow of decoding processing.

An example of the flow of the decoding processing executed by the decoding unit 212 in this case in step S202 of FIG. 26 will be described with reference to the flowchart of FIG. 56.

When the decoding processing is started, the decoding unit 241 decodes the coded data (bitstream) of the accumulation buffer 211 in step S621.

In step S622, the secondary transform identifier analysis unit 251 of the analysis unit 242 analyzes the secondary transform identifier (signaled after the transform coefficient of the TU) of the TU footer from the decoding result.

In step S623, the transform skip flag analysis unit 252 analyzes the transform skip flag. In step S624, the adaptive orthogonal transform identifier analysis unit 253 analyzes the adaptive orthogonal transform identifier. In step S625, the context setting unit 254 sets the context.

In step S626, the last coefficient position analysis unit 421 performs inverse binarization (multivalue conversion) on the bin sequence of the prefix portion of the last coefficient position. In step S627, the effective transform area size analysis unit 422 obtains the effective transform area size on the basis of the obtained last coefficient position. When the processing in step S627 ends, the decoding processing ends, and the processing returns to FIG. 26.

Note that, in this decoding processing, a step of analyzing another arbitrary encoding parameter may be added.

10. Ninth Embodiment

<10-1. Simplification of Secondary Transform>
<Control of Effective Transform Area Size>

The present technology described in the seventh embodiment may be combined with the fourth embodiment. That is, the secondary transform identifier may be signaled for each TB. In other words, also in a case where the present technology described in the seventh embodiment is applied to the fourth embodiment, in the secondary transform for zeroing the high-frequency primary transform coefficient, in a case where the transform block size is larger than 4×4, the effective transform area size may be 4×4.

Thus, similar to the case of the seventh embodiment, an increase in bin length of the last coefficient can be suppressed, and a reduction in encoding efficiency can be suppressed. Therefore, an increase in load of the decoding processing can be suppressed.

FIG. 57 illustrates an example of syntax regarding transform block (residual_coding) in that case. In the example of FIG. 57, in a case where the secondary transform is performed in the fourth and fifth rows (gray rows) from the top and the logarithmic values of the transform block sizes in the horizontal direction and the vertical direction are larger than 2 (that is, in a case where the transform block is larger than 4×4), the logarithmic value (log2ZoTbWidth) of the effective transform area size in the horizontal direction is set to 2. At that time, the secondary transform is determined for each component (for each cIdx), that is, for each transform block.

Similarly, in a case where the secondary transform is performed in the tenth and eleventh rows from the top (gray rows) and the logarithmic values of the transform block sizes in the horizontal direction and the vertical direction are larger than 2 (that is, in a case where the transform block is larger than 4×4), the logarithmic value (log2ZoTbHeight) of the effective transform area size in the vertical direction is set to 2. At that time, the secondary transform is determined for each component (for each cIdx), that is, for each transform block.

Thus, it is possible to suppress an increase in length of the bin sequence bins of the prefix portion.

<10-2. Encoding Side>
<Configuration>

Next, the encoding side will be described. The configuration of the encoding side in this case is similar to the case of the seventh embodiment. That is, the image encoding device 100 in this case has a configuration similar to the configuration described with reference to FIG. 17. Furthermore, the control unit 101 in this case has a configuration similar to the configuration described with reference to FIG.

51. Moreover, the orthogonal transform unit 113 in this case has a configuration similar to the configuration described with reference to FIG. 19.

<Flow of Encoding Parameter Setting Processing>

The image encoding device 100 in this case performs processing basically similar to the case of the seventh embodiment. That is, the image encoding processing executed by the image encoding device 100 in this case is performed by a flow similar to the case described with reference to the flowchart of FIG. 20. Furthermore, the orthogonal transform processing executed by the orthogonal transform unit 113 in this case is performed by a flow similar to the case described with reference to the flowchart of FIG. 22.

Figure 58:
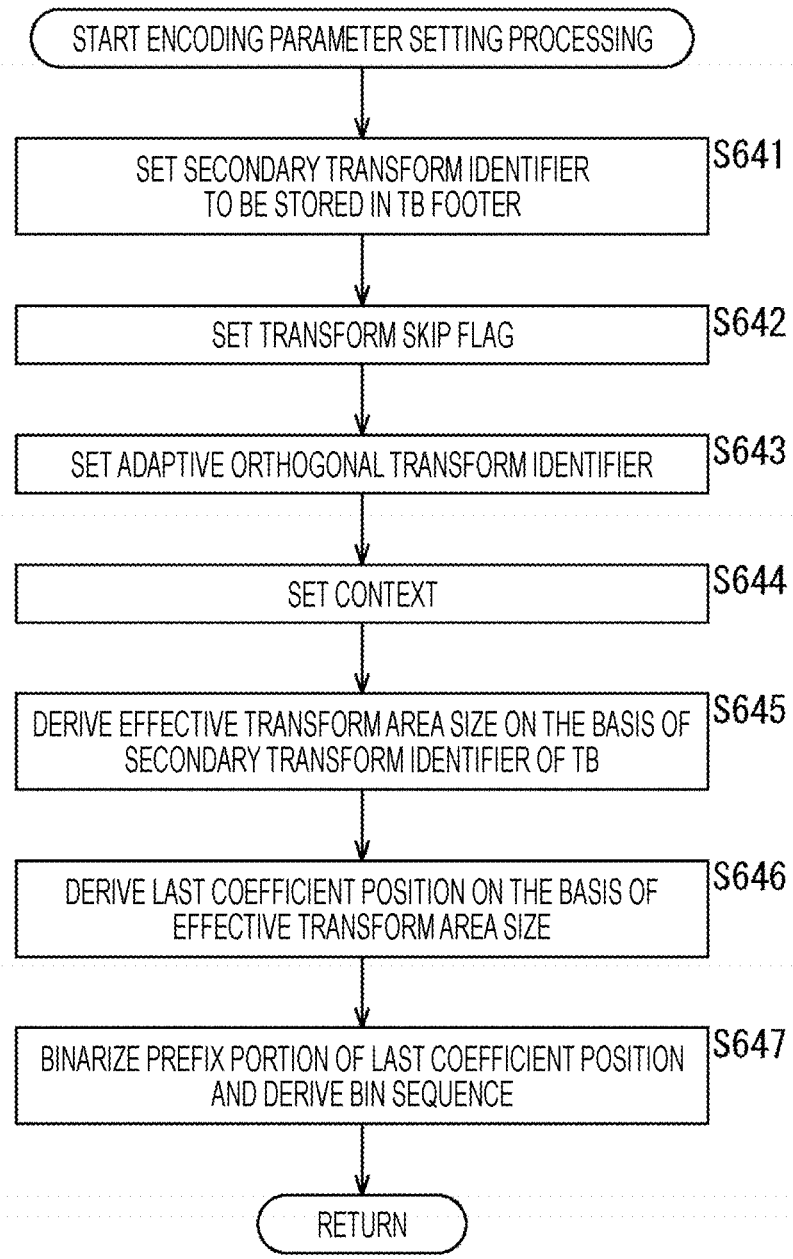
FIG. 58 is a flowchart illustrating an example of a flow of encoding parameter setting processing.

An example of the flow of the encoding parameter setting processing executed by the control unit 101 in this case in step S103 of FIG. 20 will be described with reference to the flowchart of FIG. 58. In this case, the control unit 101 executes this encoding parameter setting processing by applying the method described in <10-1. Simplification of secondary transform>.

When the encoding parameter setting processing is started, the secondary transform identifier setting unit 151 of the control unit 101 sets the secondary transform identifier st_idx to be stored in the TB footer in step S641.

In step S642, the transform skip flag setting unit 152 sets the transform skip flag. In step S643, the adaptive orthogonal transform identifier setting unit 153 sets the adaptive orthogonal transform identifier. In step S644, the context setting unit 154 sets the context.

In step S645, the effective transform area size derivation unit 401 derives the effective transform area size on the basis of the secondary transform identifier of the TB. For example, in the case of the secondary transform that zeroes a high-frequency primary transform coefficient, in a case where the transform block size is larger than 4×4, the effective transform area size derivation unit 401 sets the effective transform area size to 4×4.

In step S646, the last coefficient position setting unit 402 derives the last coefficient position on the basis of the effective transform area size. In step S647, the last coefficient position setting unit 402 binarizes the prefix portion of the last coefficient position and derives a bin sequence. When the processing of step S647 ends, the encoding parameter setting processing ends, and the processing returns to FIG. 20.

Note that, in this encoding parameter setting processing, a step of generating another arbitrary encoding parameter may be added.

By executing the encoding parameter setting processing in this manner, it is possible to suppress a reduction in encoding efficiency.

<10-3. Decoding Side>
<Configuration>

Next, the decoding side will be described. The configuration of the decoding side in this case is similar to the case of the seventh embodiment. That is, the image decoding device 200 in this case has a configuration similar to the configuration described with reference to FIG. 23. Furthermore, the decoding unit 212 in this case has a configuration similar to the configuration described with reference to FIG. 53. Moreover, the inverse orthogonal transform unit 214 in this case has a configuration similar to the configuration described with reference to FIG. 25.

<Flow of the Decoding Processing>

Furthermore, the image decoding device 200 in this case performs processing basically similar to the case of the seventh embodiment. That is, the image decoding processing executed by the image decoding device 200 in this case is performed by a flow similar to the case described with reference to the flowchart of FIG. 26. Furthermore, the inverse orthogonal transform processing executed by the inverse orthogonal transform unit 214 in this case is performed by a flow similar to the case described with reference to the flowchart of FIG. 28.

Figure 59:
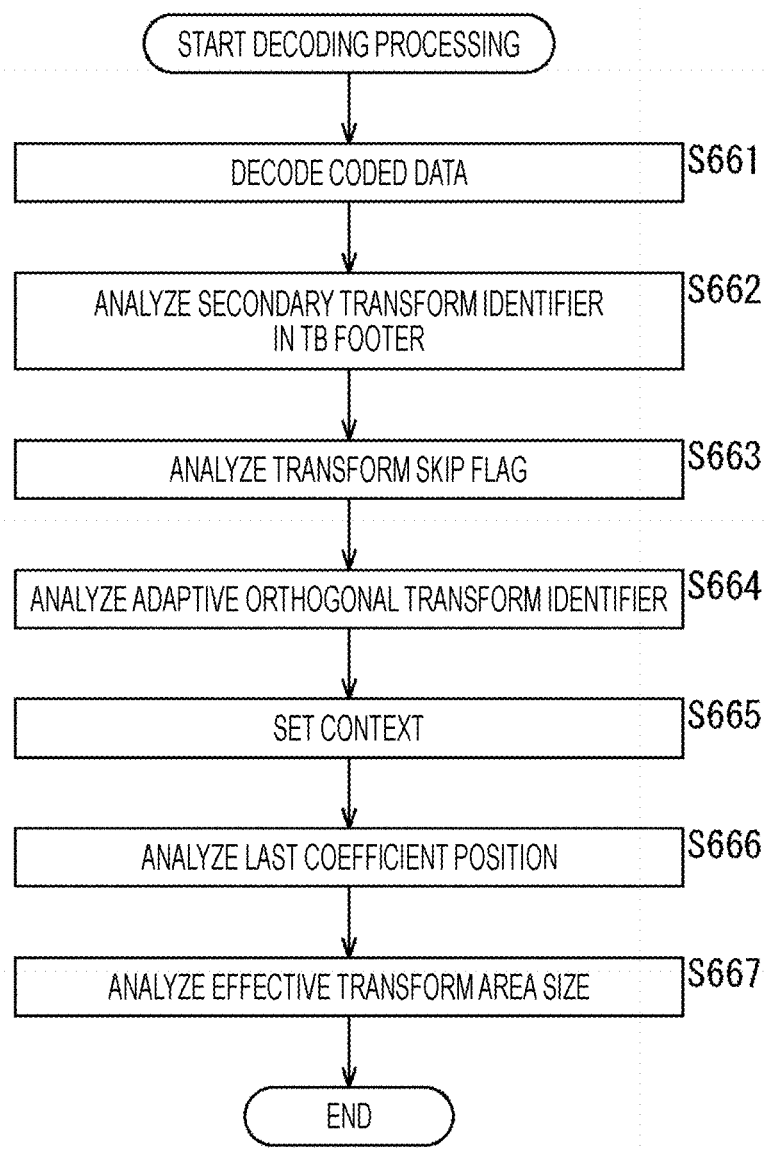
FIG. 59 is a flowchart illustrating an example of a flow of decoding processing.

An example of the flow of the decoding processing executed by the decoding unit 212 in this case in step S202 of FIG. 26 will be described with reference to the flowchart of FIG. 59.

When the decoding processing is started, the decoding unit 241 decodes the coded data (bitstream) of the accumulation buffer 211 in step S661.

In step S662, the secondary transform identifier analysis unit 251 of the analysis unit 242 analyzes the secondary transform identifier (signaled after the transform coefficient of the TB) of the TB footer from the decoding result.

In step S663, the transform skip flag analysis unit 252 analyzes the transform skip flag. In step S664, the adaptive orthogonal transform identifier analysis unit 253 analyzes the adaptive orthogonal transform identifier. In step S665, the context setting unit 254 sets the context.

In step S666, the last coefficient position analysis unit 421 performs inverse binarization (multivalue conversion) on the bin sequence of the prefix portion of the last coefficient position. In step S667, the effective transform area size analysis unit 422 obtains the effective transform area size on the basis of the obtained last coefficient position. When the processing in step S667 ends, the decoding processing ends, and the processing returns to FIG. 26.

Note that, in this decoding processing, a step of analyzing another arbitrary encoding parameter may be added.

11. Appendix

<Combination>

The present technology described in each of the above embodiments can be applied in combination with the present technology described in any other embodiment as long as there is no contradiction.

<Computer>

The series of processing described above can be executed by hardware and can also be executed by software. In a case where the series of processing is executed by software, a program constituting the software is installed in a computer. Here, the computer includes a computer mounted in dedicated hardware, for example, a general-purpose a personal computer that can execute various functions by installing the various programs, or the like.

FIG. 60 is a block diagram illustrating a configuration example of hardware of a computer in which the series of processing described above is executed by a program.

In a computer 800 illustrated in FIG. 60, a central processing unit (CPU) 801, a read only memory (ROM) 802, a random access memory (RAM) 803 are interconnected by a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a non-volatile memory, and the like. The communication unit 814 includes, for example, a network interface and the like. The drive 815 drives a removable medium 821 such as a magnetic disk, an optical disk, a magneto-optical disk, or a semiconductor memory.

In a computer configured in the aforementioned manner, for example, the CPU 801 loads a program stored in the storage unit 813 on the RAM 803 via the input/output interface 810 and the bus 804 and executes the program, and thus the aforementioned series of processing is performed. Data or the like required for the CPU 801 to execute various processing is also stored in the RAM 803 as appropriate.

The program to be executed by the computer can be applied by being recorded on the removable medium 821, for example, as a package medium or the like. In that case, the program can be installed on the storage unit 813 via the input/output interface 810 such that the removable medium 821 is mounted on the drive 815.

Furthermore, this program can also be provided via a wired or wireless transmission medium such as a local area network, the Internet, or digital satellite broadcasting. In that case, the program can be received by the communication unit 814 and installed in the storage unit 813.

In addition, the program can be pre-installed in the ROM 802 or the storage unit 813.

<Unit of Information and Processing>

The unit of data in which the various information described above is set and the unit of data targeted by various processing are arbitrary and are not limited to the above-mentioned examples. For example, these information and processing may be set for each Transform Unit (TU), Transform Block (TB), Prediction Unit (PU), Prediction Block (PB), Coding Unit (CU), Largest Coding Unit (LCU), and subblock, block, tile, slice, picture, sequence, or component, or data in those units of data may be a target. Of course, this unit of data can be set for each information or processing, and it is not necessary that the unit of data of all the information or processing is consistent. Note that the storage location of these pieces of information is arbitrary, and the information may be stored in the header, parameter set, or the like of the above-mentioned unit of data. Furthermore, it may be stored in a plurality of locations.

<Control Information>

The control information related to the present technology described in each of the above embodiments may be transmitted from the encoding side to the decoding side. For example, control information (for example, enabled_flag) that controls whether or not to permit (or prohibit) the application of the above-mentioned present technology described above may be transmitted. Furthermore, for example, control information (for example, present_flag) indicating a target to which the above-mentioned present technology is applied (or a target to which the above-mentioned present technology is not applied) may be transmitted. For example, control information that specifies a block size (upper and lower limits, or both), a frame, a component, a layer, and the like to which the present technology is applied (or application is permitted or prohibited) may be transmitted.

<Applicable Target of the Present Technology>

The present technology can be applied to any image encoding and decoding method. That is, as long as it does not contradict the above-mentioned present technology, the specs of various processing related to image encoding and decoding such as transform (inverse transform), quantization (inverse quantization), encoding (decoding), prediction, and the like are arbitrary, and are not limited to the above-mentioned example. Furthermore, a part of the processing may be omitted as long as it does not contradict the above-mentioned present technology.

Furthermore, the present technology can be applied to a multi-viewpoint image encoding and decoding system that encodes and decodes a multi-viewpoint image including images of a plurality of viewpoints (views). In that case, it is only required to apply the present technology for encoding and decoding of each viewpoint (view).

Moreover, the present technology can be applied to a hierarchical image encoding (scalable encoding) and decoding system that encodes and decodes a hierarchical image that is multi-layered (hierarchized) so as to have a scalability function for a predetermined parameter. In that case, it is only required to apply the present technology for encoding and decoding of each hierarchy (layer).

Furthermore, in the above, the image encoding device 100 and the image decoding device 200 have been described as application examples of the present technology, but the present technology can be applied to any configuration.

For example, the present technology can be applied to various electronic devices such as a transmitter or receiver (for example, a television receiver or mobile phone) for satellite broadcasting, cable broadcasting such as cable TV, distribution on the Internet, and distribution to terminals by cellular communication, devices (for example, hard disk recorders and cameras) that record images on a medium such as an optical disk, a magnetic disk, and a flash memory, and reproduce images from these recording media, and the like.

Furthermore, for example, the present technology can be carried out as the configuration of a part of a device such as a processor as a system large scale integration (LSI) or the like (for example, a video processor), a module using a plurality of processors or the like (for example, a video module), a unit using a plurality of modules or the like (for example, a video unit), or a set in which other functions are added to the unit (for example, a video set).

Furthermore, for example, the present technology can also be applied to a network system including a plurality of devices. For example, the present technology may be carried out as cloud computing that is shared and jointly processed by a plurality of devices via a network. For example, the present technology may be carried out in a cloud service that provides services related to images (moving images) to arbitrary terminals such as computers, audio visual (AV) devices, portable information processing terminals, and internet of things (IOT) devices.

Note that, in the present description, the system means a cluster of a plurality of constituent elements (a device, a module (component), or the like), and it does not matter whether or not all the constituent elements are present in the same casing. Therefore, a plurality of devices that is housed in different casings and connected via a network, and a single device in which a plurality of modules is housed in a single casing are both the system.

<Fields and Usages to which the Present Technology can be Applied>

Systems, devices, processing units, and the like to which the present technology is applied can be used in any field such as transportation, medical care, crime prevention, agriculture, livestock industry, mining, beauty, factories, home appliances, weather, nature monitoring, and the like. Furthermore, the usage is also arbitrary.

For example, the present technology can be applied to systems and devices used for providing ornamental content and the like. Furthermore, for example, the present technology can also be applied to systems and devices provided for traffic purposes such as traffic condition supervision and automatic driving control. Moreover, for example, the present technology can also be applied to systems and devices provided for security purposes. Furthermore, for example, the present technology can be applied to systems and devices provided for purposes of automatic control of machines and the like. Moreover, for example, the present technology can also be applied to systems and devices provided for agriculture and livestock industry purposes. Furthermore, the present technology can also be applied to systems and devices for monitoring natural conditions such as volcanoes, forests, and oceans, and wildlife. Moreover, for example, the present technology can also be applied to systems and devices provided for sports purposes.

<Other>

Note that in the present specification, the "flag" is information for identifying a plurality of states, and includes not only information used for identifying two states: true (1) or false (0), but also information with which it is possible to identify three or more states. Therefore, the value that this "flag" can take may be, for example, two values: 1/0, or three or more values. That is, the number of bits constituting this "flag" is arbitrary, and may be 1 bit or a plurality of bits. Furthermore, the identification information (including the flag) is assumed to include not only the identification information in the bitstream but also the difference information of the identification information with respect to a certain reference information in the bitstream. Therefore, in the present specification, the "flag" and "identification information" include not only the information but also the difference information with respect to the reference information.

Furthermore, various information (metadata, and the like) regarding the coded data (bitstream) may be transmitted or recorded in any form as long as it is associated with the coded data. Here, the term "associating" means, for example, to make the other data available (linkable) when processing one data. That is, the data associated with each other may be combined as one data or may be separate data. For example, the information associated with the coded data (image) may be transmitted on a transmission path different from that of the coded data (image). Furthermore, for example, the information associated with the coded data (image) may be recorded on a recording medium different from that of the coded data (image) (or another recording area of the same recording medium). Note that this "association" may be with a part of the data, not the entire data. For example, an image and information corresponding to the image may be associated with each other in any unit such as a plurality of frames, one frame, or a part within a frame.

Note that in the present specification, the terms such as "synthesize", "multiplex", "add", "integrate", "include", "store", "put in", "plug in", "insert", and the like means combining a plurality of objects into one, for example, combining coded data and metadata into one data, and means one method of "associating" described above.

Furthermore, the embodiment of the present technology is not limited to the aforementioned embodiments, but various changes may be made within the scope not departing from the gist of the present technology.

For example, the configuration described as one device (or processing unit) may be divided and configured as a plurality of devices (or processing units). On the contrary, the configuration described as a plurality of devices (or processing units) above may be integrally configured as one device (or processing unit). Furthermore, of course, a configuration other than the above may be added to the configuration of each device (or each processing unit). Moreover, when the configuration and operation of the entire system are substantially the same, a part of the configuration of a device (or processing unit) may be included in the configuration of another device (or another processing unit).

Furthermore, for example, the above-mentioned program may be executed in any device. In that case, it is sufficient if the device has necessary functions (functional blocks, and the like) so that necessary information can be obtained.

Furthermore, for example, each step of one flowchart may be executed by one device, or may be shared and executed by a plurality of devices. Moreover, in a case where one step includes a plurality of pieces of processing, the plurality of pieces of processing may be executed by one device, or may be shared and executed by a plurality of devices. In other words, the plurality of pieces of processing included in one step can be executed as processing of a plurality of steps. On the contrary, the processing described as a plurality of steps can be collectively executed as one step.

Furthermore, for example, regarding the program executed by the computer, the processing of steps writing the program may be executed in chronological order along the order described in the present specification or may be executed in parallel or individually at a required timing, e.g., when call is carried out. That is, as long as there is no contradiction, the processing of each step may be executed in an order different from the above-mentioned order. Moreover, the processing of the steps writing this program may be executed in parallel with the processing of another program, or may be executed in combination with the processing of another program.

Furthermore, for example, a plurality of techniques related to the present technology can be independently carried out as long as there is no contradiction. Of course, any number of the present technologies can be used in combination. For example, a part or whole of the present technology described in any of the embodiments may be carried out in combination with a part or whole of the present technology described in another embodiment. Furthermore, it is also possible to carry out a part or whole of any of the above-mentioned present technology in combination with another technology not described above.

Note that the present technology may be configured as below.

(1) An image processing device including:

a setting unit configured to set a secondary transform identifier such that secondary transform is performed only in a case where information regarding a block size is equal to or less than a predetermined threshold value;

a transform unit configured to perform secondary transform on coefficient data derived from image data on the basis of the secondary transform identifier set by the setting unit; and an encoding unit configured to encode the secondary transform identifier set by the setting unit and generate a bitstream.

(2) The image processing device according to (1), in which the threshold value includes a maximum transform block size.

(3) The image processing device according to (2), in which the information regarding the block size includes a block size in a horizontal direction of a processing target block and a block size in a vertical direction of the processing target block, and the setting unit sets the secondary transform identifier to perform the secondary transform in a case where the block size in the horizontal direction and the block size in the vertical direction are equal to or smaller than the maximum transform block size.

(4) The image processing device according to (3), in which
the setting unit sets the secondary transform identifier to perform the secondary transform in a case where the block size in the horizontal direction and the block size in the vertical direction are equal to or smaller than the maximum transform block size instead of setting the secondary transform identifier on the basis of the number of nonzero transform coefficients.

(5) The image processing device according to (4), in which
the setting unit sets the secondary transform identifier stored in a footer of an encoded block.

(6) An image processing method including:
setting a secondary transform identifier such that secondary transform is performed only in a case where information regarding a block size is equal to or less than a predetermined threshold value;
performing secondary transform on coefficient data derived from image data on the basis of the secondary transform identifier set; and
encoding the secondary transform identifier set and generating a bitstream.

(7) An image processing device including:
a secondary transform identifier setting unit configured to set a secondary transform identifier stored in a portion other than a footer of an encoded block;
a transform unit configured to perform secondary transform on coefficient data derived from image data on the basis of the secondary transform identifier set by the secondary transform identifier setting unit; and
an encoding unit configured to encode the secondary transform identifier set by the secondary transform identifier setting unit and generate a bitstream.

(8) The image processing device according to (7), in which
the secondary transform identifier setting unit sets the secondary transform identifier stored in a header of the encoded block.

(9) The image processing device according to (7) or (8), in which
the secondary transform identifier setting unit sets the secondary transform identifier on the basis of a flag indicating whether or not to apply residual PCM coding mode instead of setting the secondary transform identifier on the basis of the number of nonzero transform coefficients.

(10) The image processing device according to any of (7) to (9), further including:
a context setting unit configured to set a context on the basis of a tree type.

(11) The image processing device according to any of (7) to (10), in which
the secondary transform identifier setting unit sets the secondary transform identifier stored in a transform unit.

(12) The image processing device according to any of (7) to (10), in which
the secondary transform identifier setting unit sets the secondary transform identifier stored in a transform block.

(13) The image processing device according to any of (7) to (12), further including:
a context setting unit configured to set a context on the basis of a component.

(14) The image processing device according to any of (7) to (13), further including:
an effective transform area size derivation unit configured to set an effective transform area size to 4×4 in a case of a transform block that applies secondary transform for zeroing a high-frequency primary transform coefficient and has a transform block size larger than 4×4.

(15) An image processing method including:
setting a secondary transform identifier stored in a portion other than a footer of an encoded block;
performing secondary transform on coefficient data derived from image data on the basis of the secondary transform identifier set; and
encoding the secondary transform identifier set and generating a bitstream.

REFERENCE SIGNS LIST

100 Image encoding device
101 Control unit
113 Orthogonal transform unit
115 Encoding unit
118 Inverse orthogonal transform unit
151 Secondary transform identifier setting unit
152 Transform skip flag setting unit
153 Adaptive orthogonal transform identifier setting unit
154 Context setting unit
172 Secondary transform unit
200 Image decoding device
212 Decoding unit
214 Inverse orthogonal transform unit
242 Analysis unit
251 Secondary transform identifier analysis unit
252 Transform skip flag analysis unit
253 Adaptive orthogonal transform identifier analysis unit
254 Context setting unit
271 Inverse secondary transform unit
401 Effective transform area size derivation unit
402 Last coefficient position setting unit
421 Last coefficient position analysis unit
422 Effective transform area size analysis unit

The invention claimed is:
1. An image processing device comprising:
circuitry configured to
set a secondary transform identifier stored in a footer of an encoded block such that secondary transform is performed only in a case where information regarding a block size is equal to or less than a predetermined threshold value; and
perform secondary transform on coefficient data derived from image data on a basis of the secondary transform identifier set by the circuitry; and
an encoder configured to encode the secondary transform identifier set by the circuitry and generate a bitstream.

2. The image processing device according to claim 1, wherein
the predetermined threshold value includes a maximum transform block size.

3. The image processing device according to claim 2, wherein
the information regarding the block size includes a block size in a horizontal direction of a processing target block and a block size in a vertical direction of the processing target block, and
the circuitry sets the secondary transform identifier to perform the secondary transform in a case where the block size in the horizontal direction and the block size in the vertical direction are equal to or smaller than the maximum transform block size.

4. The image processing device according to claim 3, wherein
the circuitry sets the secondary transform identifier to perform the secondary transform in a case where the block size in the horizontal direction and the block size in the vertical direction are equal to or smaller than the maximum transform block size instead of setting the secondary transform identifier on a basis of a number of nonzero transform coefficients.

5. An image processing method comprising:
setting a secondary transform identifier stored in a footer of an encoded block such that secondary transform is performed only in a case where information regarding a block size is equal to or less than a predetermined threshold value;
performing secondary transform on coefficient data derived from image data on a basis of the secondary transform identifier set; and
encoding the secondary transform identifier set and generating a bitstream.

\* \* \* \* \*